US012574964B2

(12) United States Patent
Rastegardoost et al.

(10) Patent No.: US 12,574,964 B2
(45) Date of Patent: Mar. 10, 2026

(54) SHARED CHANNEL OCCUPANCY IN SIDELINK UNLICENSED

(71) Applicant: Ofinno, LLC, Reston, VA (US)

(72) Inventors: Nazanin Rastegardoost, McLean, VA (US); Hyoungsuk Jeon, Centreville, VA (US); Esmael Hejazi Dinan, McLean, VA (US); Bing Hui, Nanjing (CN); Huifa Lin, Reston, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/092,697

(22) Filed: Mar. 27, 2025

(65) Prior Publication Data

US 2025/0227757 A1     Jul. 10, 2025

Related U.S. Application Data

(63) Continuation of application No. PCT/US2023/033858, filed on Sep. 27, 2023.

(Continued)

(51) Int. Cl.
*H04W 74/0808* (2024.01)
*H04B 17/318* (2015.01)
*H04W 72/25* (2023.01)

(52) U.S. Cl.
CPC ...... *H04W 74/0808* (2013.01); *H04B 17/328* (2023.05); *H04W 72/25* (2023.01)

(58) Field of Classification Search
USPC .... 370/229, 230, 230.1, 235, 236, 252, 318, 370/328, 329, 330
See application file for complete search history.

(56) References Cited

U.S. PATENT DOCUMENTS

2021/0195637 A1     6/2021   Xue et al.
2022/0095117 A1     3/2022   Liu et al.
(Continued)

FOREIGN PATENT DOCUMENTS

WO       2021/212354 A1     10/2021
WO       2021/262389 A1     12/2021
(Continued)

OTHER PUBLICATIONS

3GPP TS 37.213 V17.1.0 (Mar. 2022); Technical Specification; 3rd Generation Partnership Project; Technical Specification Group Radio Access Network; Physical layer procedures for shared spectrum channel access (Release 17).
(Continued)

*Primary Examiner* — Nguyen H Ngo
(74) *Attorney, Agent, or Firm* — Brett K. Gardner; Kavon Nasabzadeh; Jacob L. Mangan

(57) ABSTRACT

A first wireless device receives first sidelink control information comprising one or more parameters indicating a reserved resource for a second sidelink transmission. The first wireless device initiates a channel occupancy for a first sidelink transmission before the reserved resource, wherein initiating the channel occupancy is based on: a first type of channel access procedure; and an energy detection threshold for channel occupancy sharing. The first wireless device transmits a second sidelink control information indicating sharing the channel occupancy with the second wireless device for the second sidelink transmission in the channel occupancy. The first wireless device transmits, using a second type of channel access procedure and based on sharing the channel occupancy with the second wireless device, a third sidelink transmission within the channel occupancy and after the second sidelink transmission.

20 Claims, 38 Drawing Sheets

Related U.S. Application Data

(60) Provisional application No. 63/411,006, filed on Sep. 28, 2022.

(56) References Cited

U.S. PATENT DOCUMENTS

| | | | |
|---|---|---|---|
| 2022/0167402 A1 | 5/2022 | Liu et al. | |
| 2023/0146161 A1 | 5/2023 | Sun et al. | |
| 2023/0224959 A1 | 7/2023 | Wu et al. | |
| 2023/0224967 A1 | 7/2023 | Si et al. | |
| 2023/0232447 A1* | 7/2023 | Lin | H04W 74/0808 |
| | | | 370/329 |
| 2023/0354429 A1* | 11/2023 | Niu | H04W 72/40 |
| 2023/0362988 A1 | 11/2023 | Liu et al. | |
| 2023/0362995 A1* | 11/2023 | Lei | H04W 52/367 |
| 2024/0040615 A1 | 2/2024 | Liu et al. | |
| 2024/0049283 A1 | 2/2024 | Elazzouni et al. | |
| 2024/0430933 A1* | 12/2024 | Yang | H04W 72/25 |

FOREIGN PATENT DOCUMENTS

| | | |
|---|---|---|
| WO | 2022/046441 A1 | 3/2022 |
| WO | 2022/132560 A1 | 6/2022 |
| WO | 2023/205599 A1 | 10/2023 |
| WO | 2023/211597 A1 | 11/2023 |
| WO | 2024/036010 A1 | 2/2024 |

OTHER PUBLICATIONS

3GPP TS 38.212 V17.2.0 (Jun. 2022); Technical Specification; 3rd Generation Partnership Project; Technical Specification Group Radio Access Network; NR; Multiplexing and channel coding; (Release 17).

3GPP TS 38.213 V17.2.0 (Jun. 2022); Technical Specification; 3rd Generation Partnership Project; Technical Specification Group Radio Access Network; NR; Physical layer procedures for control (Release 17).

3GPP TS 38.331 V17.1.0 (Jun. 2022); Technical Specification; 3rd Generation Partnership Project; Technical Specification Group Radio Access Network; NR; Radio Resource Control (RRC) protocol specification; (Release 17).

R1-2207110; 3GPP TSG RAN WG1 Meeting #110; Toulouse, France, Aug. 22-26, 2022; Source: Johns Hopkins University APL and National Spectrum Consortium; Title: Discussion of Channel Access Mechanisms; Agenda item: 9.4.1.1; Document for: Discussion and Decision.

R1-2205744; 3GPP TSG RAN WG1 Meeting #110; Toulouse, France, Aug. 22-26, 2022; Agenda Item: 9.4.1.1; Source: FUTUREWEI; Title: Channel access mechanism for sidelink operation in unlicensed spectrum; Document for: Discussion and decision.

R1-2205839; 3GPP TSG RAN WG1 #110; Toulouse, France, Aug. 22-26, 2022; Source: Nokia, Nokia Shanghai Bell; Title: On Channel Access Mechanism and Evaluation Methodology for SL-U; Agenda item: 9.4.1.1; Document for: Discussion and Decision.

R1-2205850; 3GPP TSG RAN WG1 Meeting #110; Toulouse, France, Aug. 22-26, 2022; Agenda Item: 9.4.1.1; Source: LG Electronics; Title: Discussion on channel access mechanism for sidelink on unlicensed spectrum; Document for: Discussion and decision.

R1-2205886; 3GPP TSG RAN WG1 Meeting #110; Toulouse, France, Aug. 22-26, 2022; Agenda Item: 9.4.1.1; Source: Huawei, HiSilicon; Title: Channel access mechanism and resource allocation for sidelink operation over unlicensed spectrum; Document for: Discussion and Decision.

R1-2205991; 3GPP TSG RAN WG1 #110; Toulouse, France, Aug. 22-26, 2022; Agenda Item: 9.4.1.1; Source: Spreadtrum Communications; Title: Discussion on channel access mechanism of sidelink on unlicensed spectrum; Document for: Discussion and decision.

R1-2206041; 3GPP TSG RAN WG1 #110; Toulouse, France, Aug. 22-26, 2022; Source: vivo; Title: Channel access mechanism for sidelink on unlicensed spectrum; Agenda Item: 9.4.1.1; Document for: Discussion and Decision.

R1-2206097; 3GPP TSG RAN WG1 #110; Toulouse, France, Aug. 22-26, 2022; Title: Discussion on channel access mechanism for SL-U; Source: ZTE, Sanechips; Agenda item: 9.4.1.1; Document for: Discussion and decision.

R1-2206119; 3GPP TSG RAN WG1 #110; Toulouse, France, Aug. 22-26, 2022; Agenda Item: 9.4.1.1; Source: Sony; Title: Discussion on channel access mechanism for SL-unlicensed; Document for: Discussion.

R1-2206171; 3GPP TSG RAN WG1 #110; Toulouse, France, Aug. 22-26, 2022; Source: Fujitsu; Title: Discussion on channel access mechanism for SL-U; Agenda item: 9.4.1.1; Document for: Discussion and Decision.

R1-2206290; 3GPP TSG RAN WG1 Meeting #110; Toulouse, France, Aug. 22-26, 2022; Agenda item: 9.4.1.1; Title: Access mechanisms and resource allocation for NR sidelink in unlicensed channel; Source: OPPO; Document for: Discussion and Decision.

R1-2206400; 3GPP TSG RAN WG1 #110; Toulouse, France, Aug. 22-26, 2022; Source: CATT, Gohigh; Title: Discussion on channel access mechanism for sidelink on unlicensed spectrum; Agenda Item: 9.4.1.1; Document for: Discussion and Decision.

R1-2206438; 3GPP TSG RAN WG1 Meeting #110; Toulouse, France, Aug. 22-26, 2022; Agenda item: 9.4.1.1; Title: NR Sidelink Unlicensed Channel Access Mechanisms; Source: Fraunhofer HHI, Fraunhofer IIS; Document for: Discussion.

R1-2206448; 3GPP TSG RAN WG1 #110; Toulouse, France, Aug. 22-26, 2022; Agenda Item: 9.4.1.1; Source: Lenovo; Title: Channel access mechanism for sidelink on FR1 unlicensed spectrum; Document for: Discussion.

R1-2206469; 3GPP TSG RAN WG # 110; Toulouse, France, Aug. 22-26, 2022; Agenda Item: 9.4.1.1; Source: NEC; Title: Channel Access of Sidelink on Unlicensed Spectrum; Document for: Discussion/Decision.

R1-2206585; 3GPP TSG RAN WG1 #110; Toulouse, France, Aug. 22-Aug. 26, 2022; Source: Intel Corporation; Title: Channel Access Mechanisms for SL Operating in Unlicensed Spectrum; Agenda item: 9.4.1.1; Document for: Discussion and Decision.

R1-2206644; 3GPP TSG RAN WG1 #110; Toulouse, France, Aug. 22-26, 2022; Source: Xiaomi; Title: Discussion on channel access mechanism for sidelink-unlicensed; Agenda item: 9.4.1.1; Document for: Decision.

R1-2206669; 3GPP TSG RAN WG1#110; Toulouse, France, Aug. 22-26, 2022; Agenda Item: 9.4.1.1; Source: Transsion Holdings; Title: Discussion of channel access mechanism for sidelink in unlicensed spectrum; Document for: Discussion and decision.

R1-2206691; 3GPP TSG RAN WG1 #110; Toulouse, France, Aug. 22-26, 2022; Agenda Item: 9.4.1.1; Source: China Telecom; Title: Discussion on channel access mechanism for sidelink on unlicensed spectrum; Document for: Discussion.

R1-2206826; 3GPP TSG RAN WG1 Meeting #110; Toulouse, France, Aug. 22-26, 2022; Agenda item: 9.4.1.1; Source: Samsung; Title: On channel access mechanism for sidelink on FR1 unlicensed spectrum; Document for: Discussion and Decision.

R1-2206860; 3GPP TSG RAN WG1 #110; Toulouse, France, Aug. 22-26, 2022; Agenda Item: 9.4.1.1; Source: ITL; Title: On Channel Access Mechanism for SL-U; Document for: Discussion and decision.

R1-2206913; 3GPP TSG RAN WG1 #110; Toulouse, France, Aug. 22-26, 2022; Agenda item: 9.4.1.1; Source: CMCC; Title: Discussion on channel access mechanism for sidelink on unlicensed spectrum; Document for: Discussion and Decision.

R1-2207015; 3GPP TSG RAN WG1 #110; Toulouse, France, Aug. 22-26, 2022; Agenda item: 9.4.1.1; Source: MediaTek Inc.; Title: Discussion on channel access mechanism; Document for: Discussion/Decision.

R1-2207128; 3GPP TSG RAN WG1 #110; Toulouse, France, Aug. 22-26, 2022; Agenda Item: 9.4.1.1; Source: InterDigital, Inc.; Title: SL channel access in unlicensed spectrum; Document for: Discussion and Decision.

(56) References Cited

OTHER PUBLICATIONS

R1-2207136; 3GPP TSG RAN WG1 #110; e-Meeting, Aug. 22-26, 2022; Source: CableLabs; Title: On Evaluation Methodology for SL-U; Agenda Item: 9.4.1.1; Document for: Discussion and Decision.

R1-2207233; 3GPP TSG RAN WG1 Meeting #110; Toulouse, Aug. 22-Aug. 27, 2022; Agenda item: 9.4.1.1; Source: Qualcomm Incorporated; Title: Channel access mechanism for Sidelink on Unlicensed Spectrum; Document for: Discussion and Decision.

R1-2207279; 3GPP TSG RAN WG1 #110; Toulouse, France, Aug. 22-26, 2022; Source: Sharp; Title: Discussion on Channel access mechanism for NR sidelink evolution; Agenda Item: 9.4.1.1; Document for: Discussion and Decision.

R1-2207298; 3GPP TSG RAN WG1 #110; Toulouse, France, Aug. 22-26, 2022; Source: Panasonic; Title: Sidelink channel access on unlicensed spectrum; Agenda Item: 9.4.1.1; Item for: Discussion.

R1-2207337; 3GPP TSG-RAN WG1 Meeting #110; Toulouse, FR, Aug. 22-Aug. 26, 2022; Agenda Item: 9.4.1.1; Source: Apple Inc.; Title: On channel access mechanism for sidelink on FR1 unlicensed spectrum; Document for: Discussion/Decision.

R1-2207408; 3GPP TSG RAN WG1 #110; Toulouse, France, Aug. 22-26, 2022; Source: NTT Docomo, Inc.; Title: Discussion on channel access mechanism in SL-U; Agenda Item: 9.4.1.1; Document for: Discussion and Decision.

R1-2207504; 3GPP TSG RAN WG1 #110; Toulouse, France, Aug. 22-26, 2022; Agenda Item: 9.4.1.1; Source: ASUSTek; Title: Discussion on sidelink on unlicensed spectrum; Document for: Discussion and Decision.

R1-2207511; 3GPP TSG RAN WG1 #110; Toulouse, Aug. 22-26, 2022; Agenda item: 9.4.1.1; Source: Robert Bosch GmbH; Title: Discussions on channel access mechanism for sidelink on unlicensed spectrum; Document for: Decision.

R1-2207566; 3GPP TSG RAN WG1 #110; Toulouse, France, Aug. 22-26, 2022; Agenda Item: 9.4.1.1; Source: Ericsson; Title: Channel access mechanism for SL-U; Document for: Discussion, Decision.

R1-2207599; 3GPP TSG RAN WG1 #110; Toulouse, France, Aug. 22-26, 2022; Source: WILUS Inc.; Title: Discussion on channel access mechanism for SL on unlicensed spectrum; Agenda item: 9.4.1.1; Document for: Discussion/Decision.

R1-2207709; 3GPP TSG RAN WG1 #110; Toulouse, France, Aug. 22-26, 2022; Title: Discussion on channel access mechanism for SL-U; Source: ZTE, Sanechips; Agenda item: 9.4.1.1; Document for: Discussion and decision.

R1-2207743; 3GPP TSG RAN WG1 #110; e-Meeting, Aug. 22-26, 2022; Source: CableLabs, Broadcom, Charter Communications; Title: On Evaluation Methodology for SL-U; Agenda Item: 9.4.1.1; Document for: Discussion and Decision.

R1-2207793; 3GPP TSG RAN WG1 #110; Toulouse, France, Aug. 22-26, 2022; Source: Moderator (OPPO); Title: FL summary for AI 9.4.1.1: SL-U channel access mechanism (EOM); Agenda item: 9.4.1.1; Document for: Discussion and Decision.

International Search Report and Written Opinion of the International Searching authority mailed Jan. 9, 2024, in International Application No. PCT/US2023/033858.

* cited by examiner

Uplink

FIG. 5B

Downlink

FIG. 5A

Logical Channels

Transport Channels

Physical Channels

Physical Signals

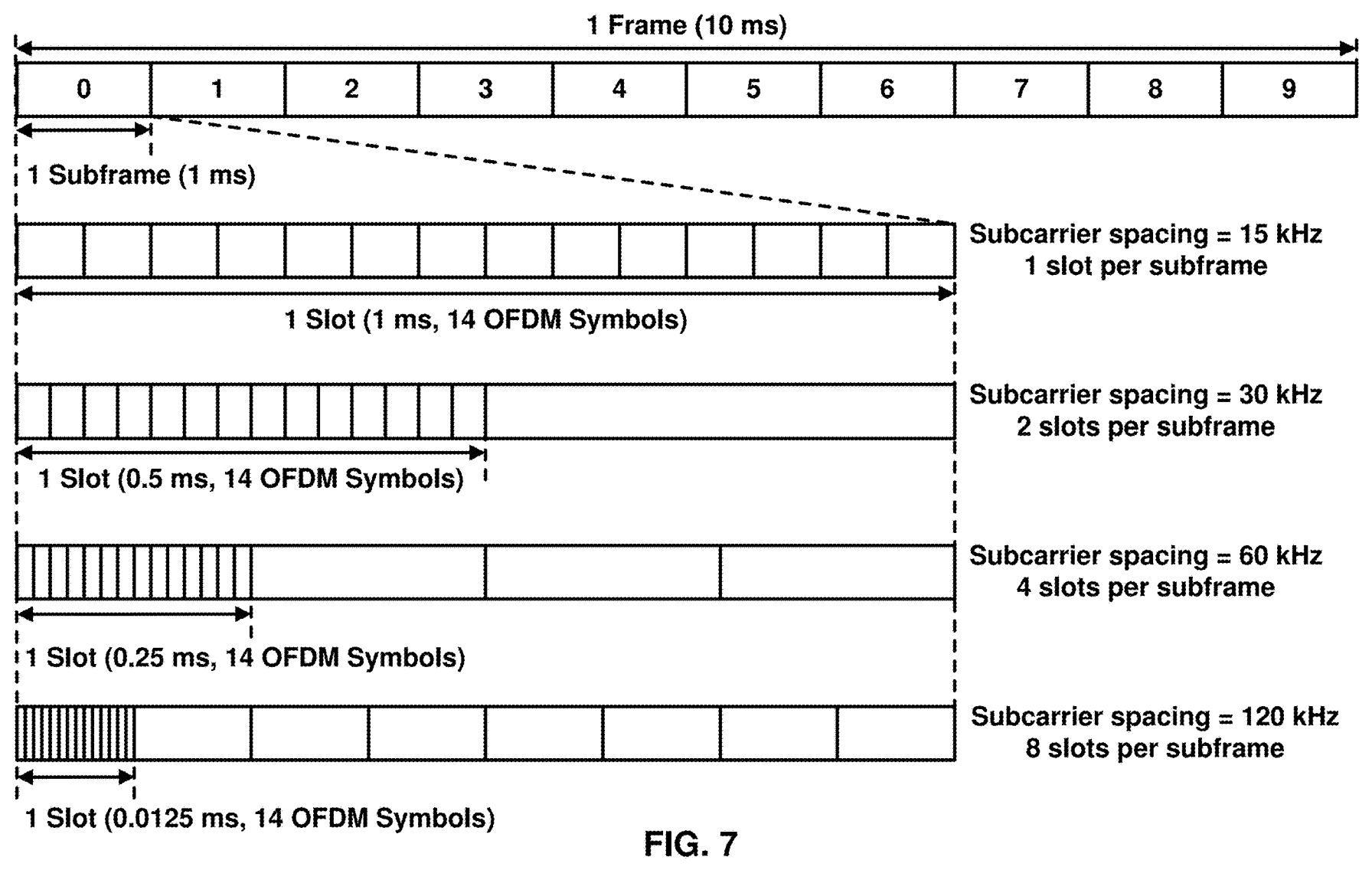

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

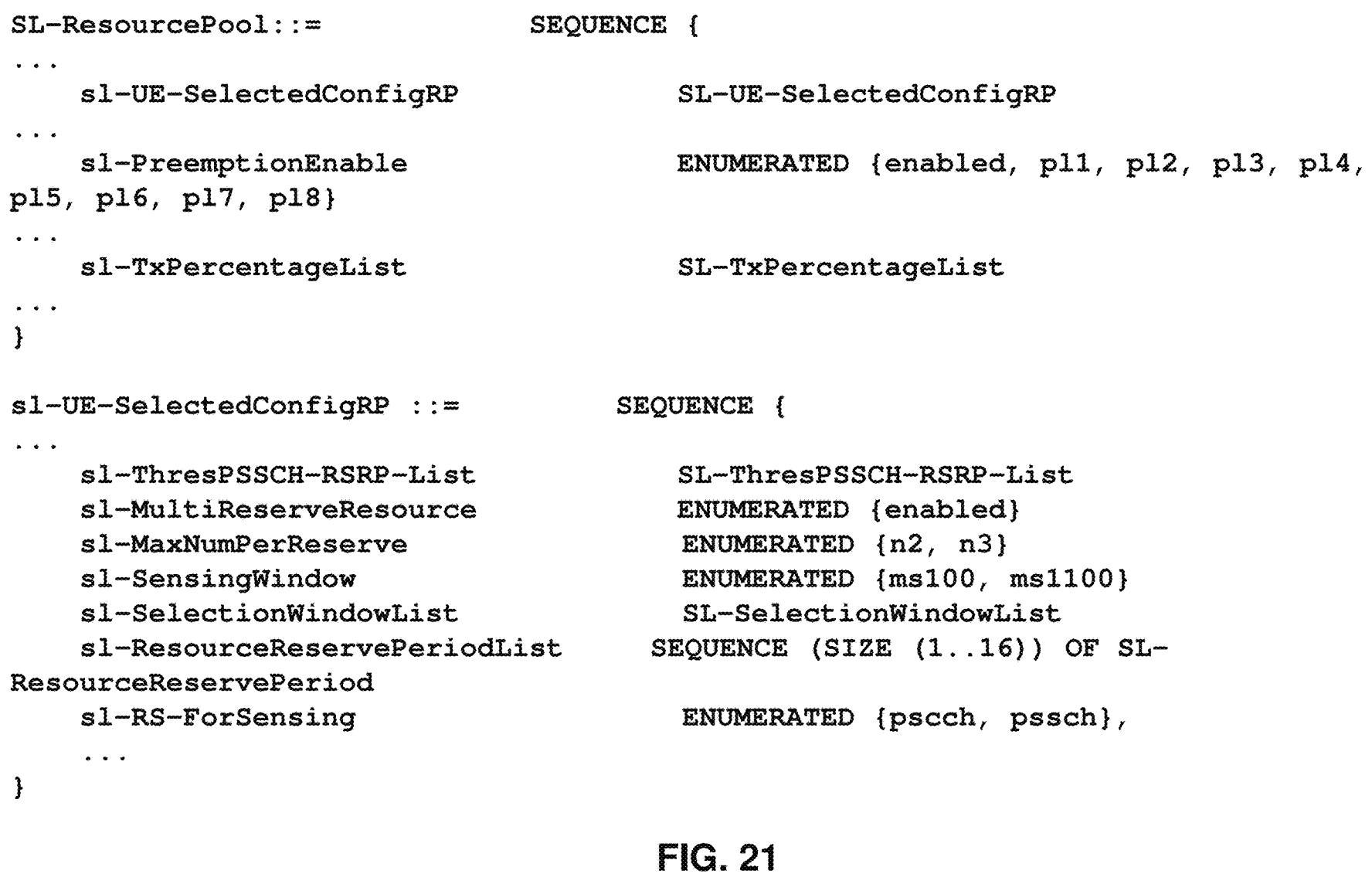

```
SL-ResourcePool::=          SEQUENCE {
    ...
    sl-UE-SelectedConfigRP      SL-UE-SelectedConfigRP
    ...
    sl-PreemptionEnable         ENUMERATED {enabled, pl1, pl2, pl3, pl4,
pl5, pl6, pl7, pl8}
    ...
    sl-TxPercentageList         SL-TxPercentageList
    ...
} sl-UE-SelectedConfigRP ::=   SEQUENCE {
    ...
    sl-ThresPSSCH-RSRP-List       SL-ThresPSSCH-RSRP-List
    sl-MultiReserveResource       ENUMERATED {enabled}
    sl-MaxNumPerReserve           ENUMERATED {n2, n3}
    sl-SensingWindow              ENUMERATED {ms100, ms1100}
    sl-SelectionWindowList        SL-SelectionWindowList
    sl-ResourceReserveReservePeriodList   SEQUENCE (SIZE (1..16)) OF SL-
ResourceReservePeriod
    sl-RS-ForSensing              ENUMERATED {pscch, pssch},
    ...
}
```

FIG. 21

```
SL-ResourceReservePeriod ::=          CHOICE {
    sl-ResourceReservePeriod1              ENUMERATED {ms0, ms100, ms200,
ms300, ms400, ms500, ms600, ms700, ms800, ms900, ms1000},
    sl-ResourceReservePeriod2              INTEGER (1..99)
}

SL-SelectionWindowList ::=            SEQUENCE (SIZE (8)) OF SL-
SelectionWindowConfig SL-SelectionWindowConfig ::=          SEQUENCE {
    sl-Priority                            INTEGER (1..8),
    sl-SelectionWindow                     ENUMERATED {n1, n5, n10, n20}
}

SL-TxPercentageList ::=               SEQUENCE (SIZE (8)) OF SL-
TxPercentageConfig SL-TxPercentageConfig ::=             SEQUENCE {
    sl-Priority                            INTEGER (1..8),
    sl-TxPercentage                        ENUMERATED {p20, p35, p50}
}
```

FIG. 22

| Channel Access Priority Class (CAPC: p) | m_p | CW_min, p | CW_max,p | T_slm cot,p | Allowed CW_p sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6 ms or 10 ms | {15,31,63,127,255,511,1023} |
| 4 | 7 | 15 | 1023 | 6 ms or 10 ms | {15,31,63,127,255,511,1023} |

FIG. 30

SHARED CHANNEL OCCUPANCY IN SIDELINK UNLICENSED

CROSS-REFERENCE TO RELATED APPLICATIONS

This application is a continuation of International Application No. PCT/US2023/033858, filed Sep. 27, 2023, which claims the benefit of U.S. Provisional Application No. 63/411,006, filed Sep. 28, 2022, all of which are hereby incorporated by reference in their entireties.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

BRIEF DESCRIPTION OF THE DRAWINGS

Examples of several of the various embodiments of the present disclosure are described herein with reference to the drawings.

FIGS. 5A and 5B respectively illustrate a mapping between logical channels, transport channels, and physical channels for the downlink and uplink.

FIG. 7 illustrates an example configuration of an NR frame into which OFDM symbols are grouped.

FIG. 21 illustrates an example of configuration information for sidelink communication as per an aspect of an example embodiment of the present disclosure.

FIG. 22 illustrates an example of configuration information for sidelink communication as per an aspect of an example embodiment of the present disclosure.

FIG. 30 shows an example of channel access priority classes for SL channel access procedure.

DETAILED DESCRIPTION

Figures 1A, 1B:
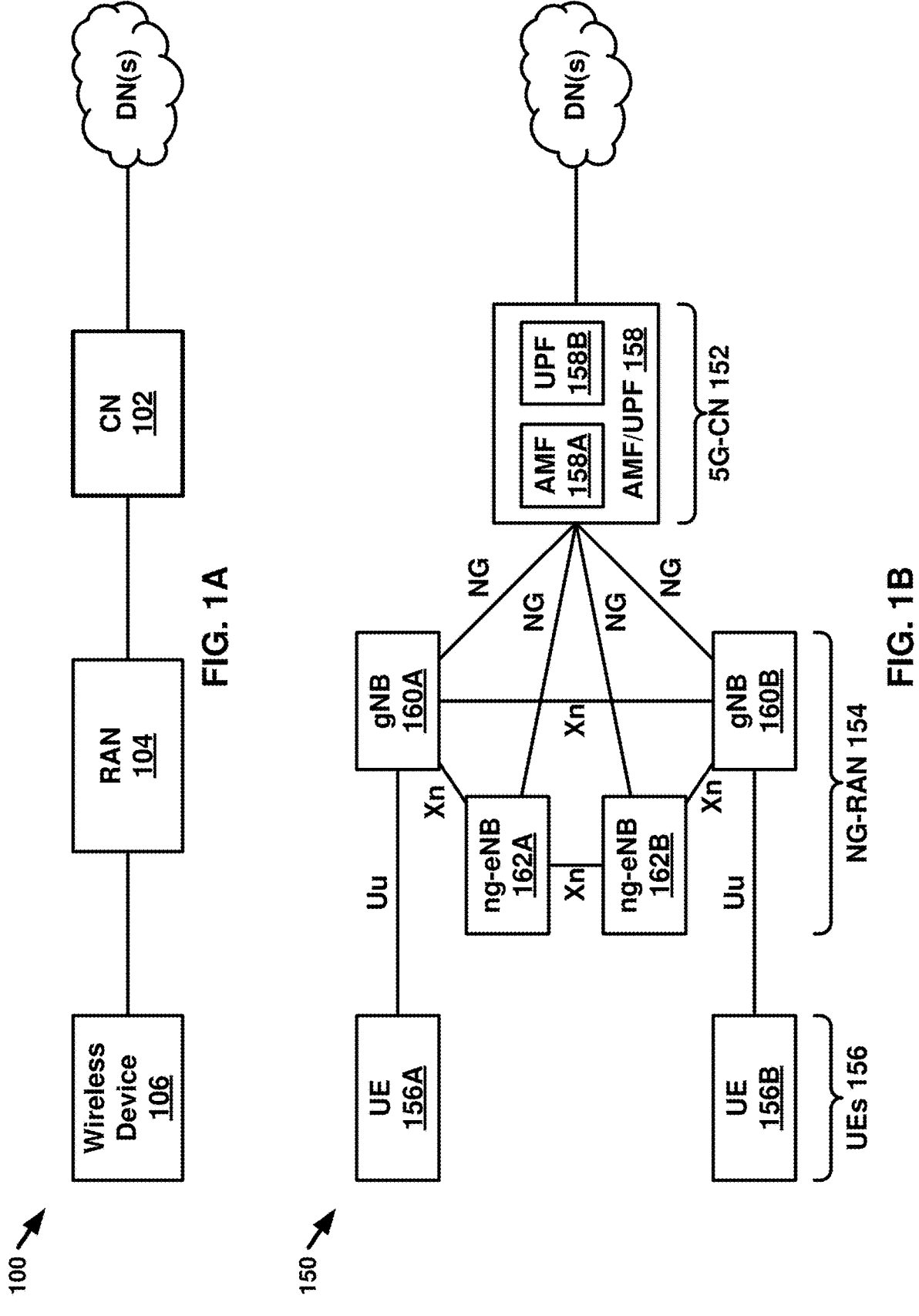
FIG. 1A and FIG. 1B illustrate example mobile communication networks in which embodiments of the present disclosure may be implemented.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE)N comprises parameter (IE)M, and parameter (IE)M comprises parameter (IE)K, and parameter (IE)K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g.

hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B.

The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
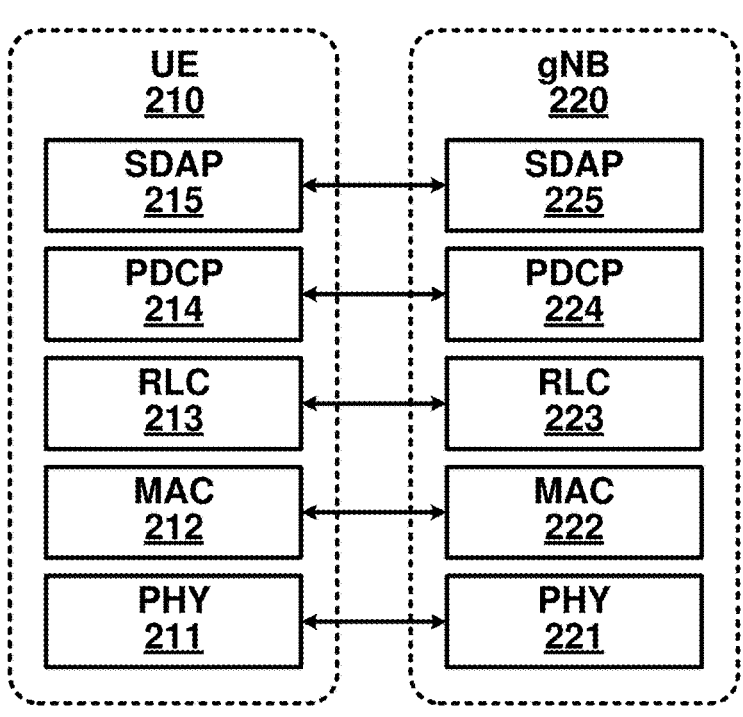
FIGS. 2A and 2B respectively illustrate a New Radio (NR) user plane and control plane protocol stack.
Figure 2B:
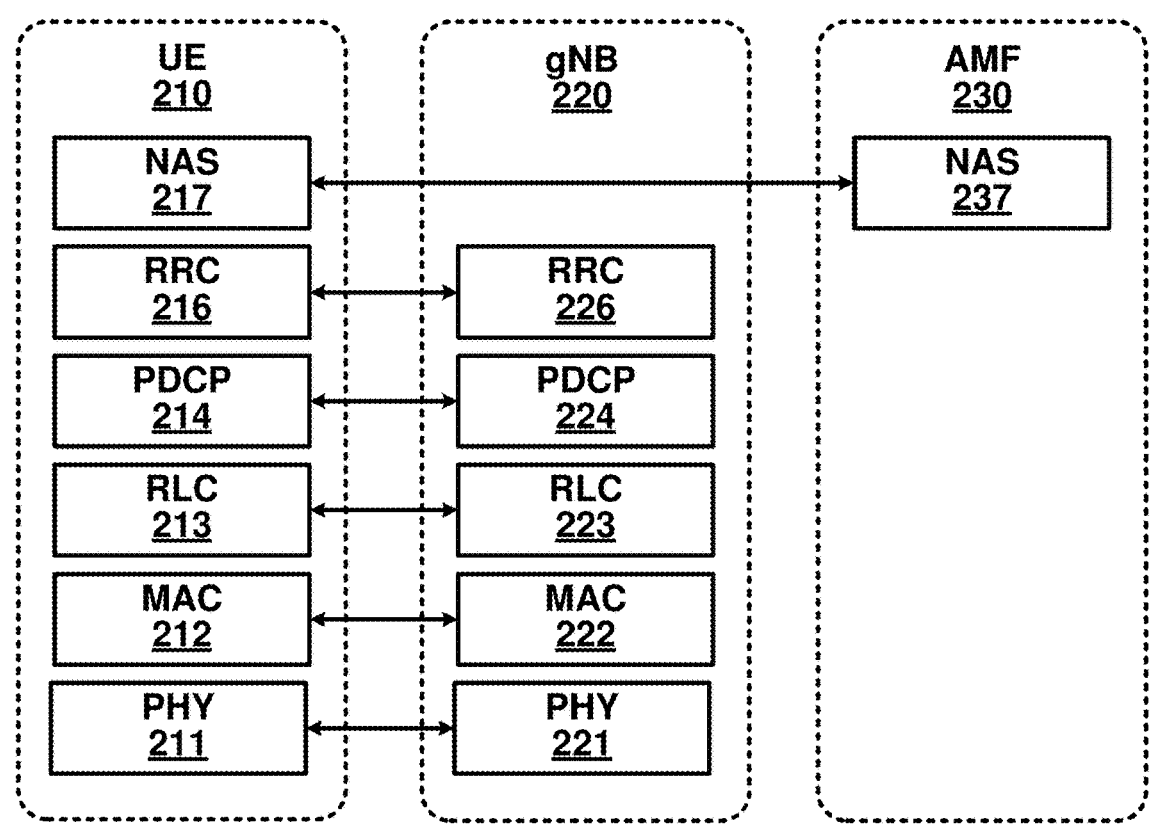

FIGS. 2A and 2B respectively illustrate examples of NR user plane and NR control plane protocol stacks for the Uu interface that lies between a UE 210 and a gNB 220. The protocol stacks illustrated in FIGS. 2A and 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model.

The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
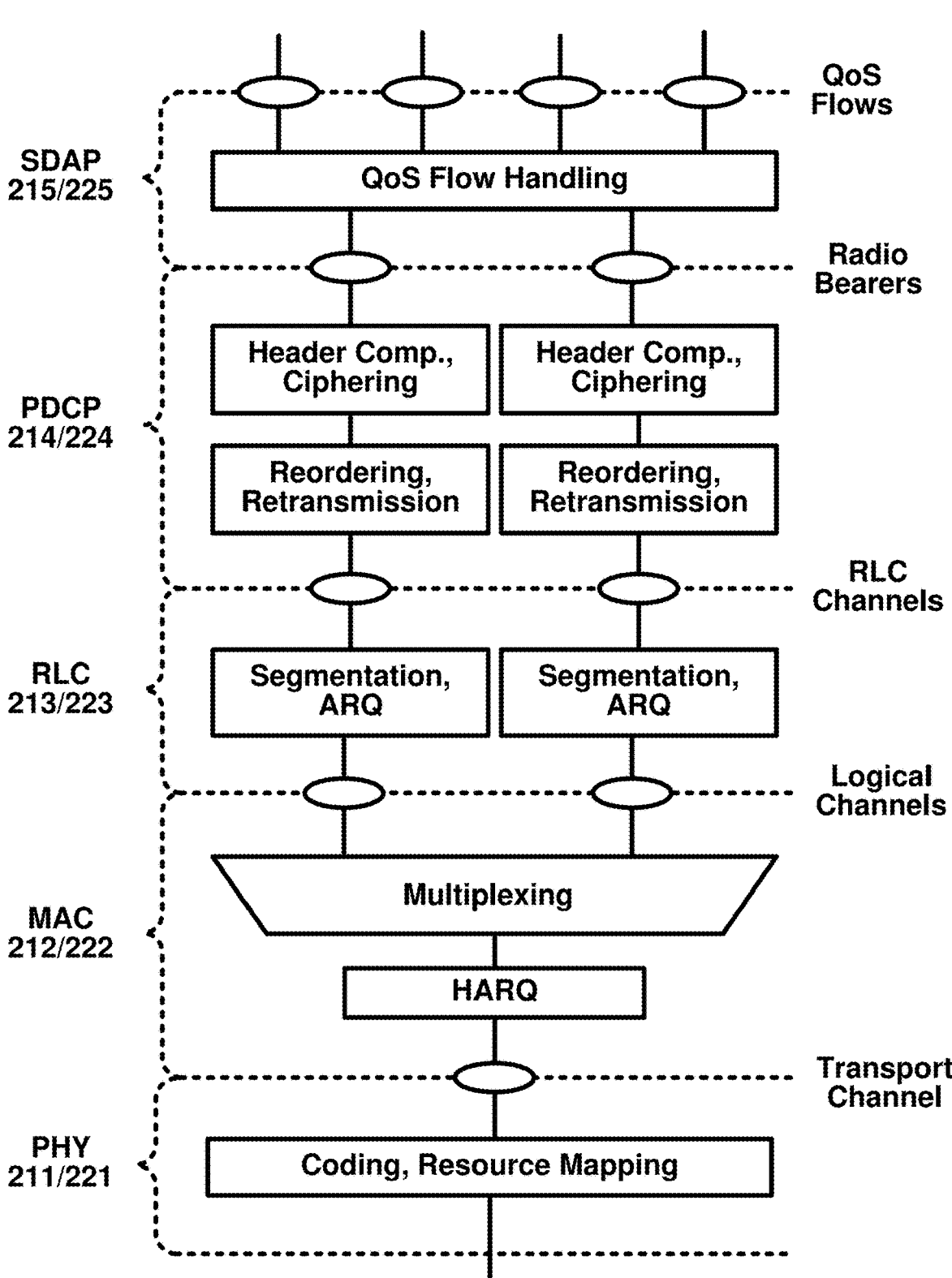
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIGS. 2A and 3, the SDAPs 215 and 225 may perform QoS flow handling. The UE 210 may receive services through a PDU session, which may be a logical connection between the UE 210 and a DN.

The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use.

As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG.

3, the PHYs 211 and 221 may provide one or more transport channels as a service to the MACs 212 and 222.

Figures 4A, 4B:
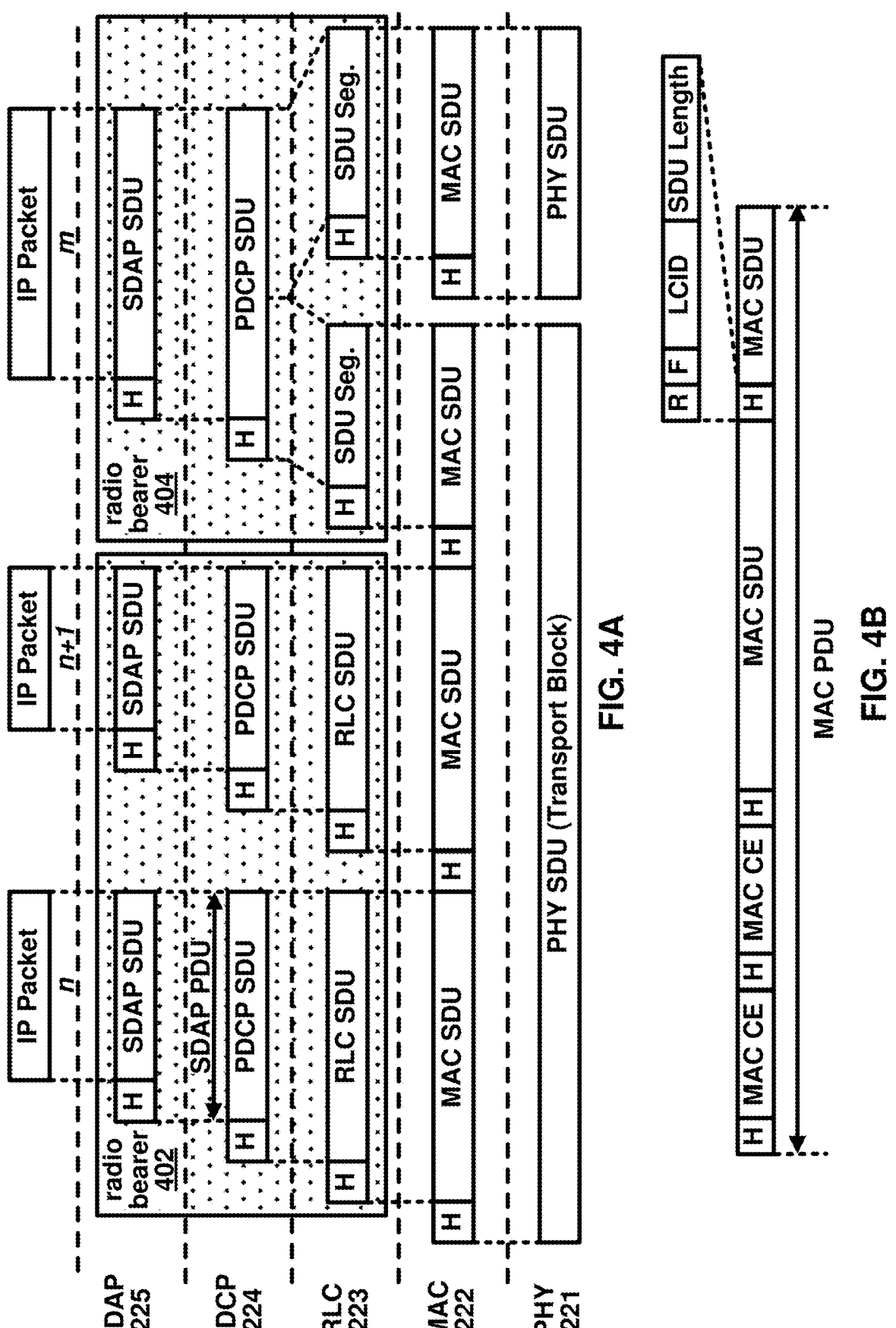
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 212 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
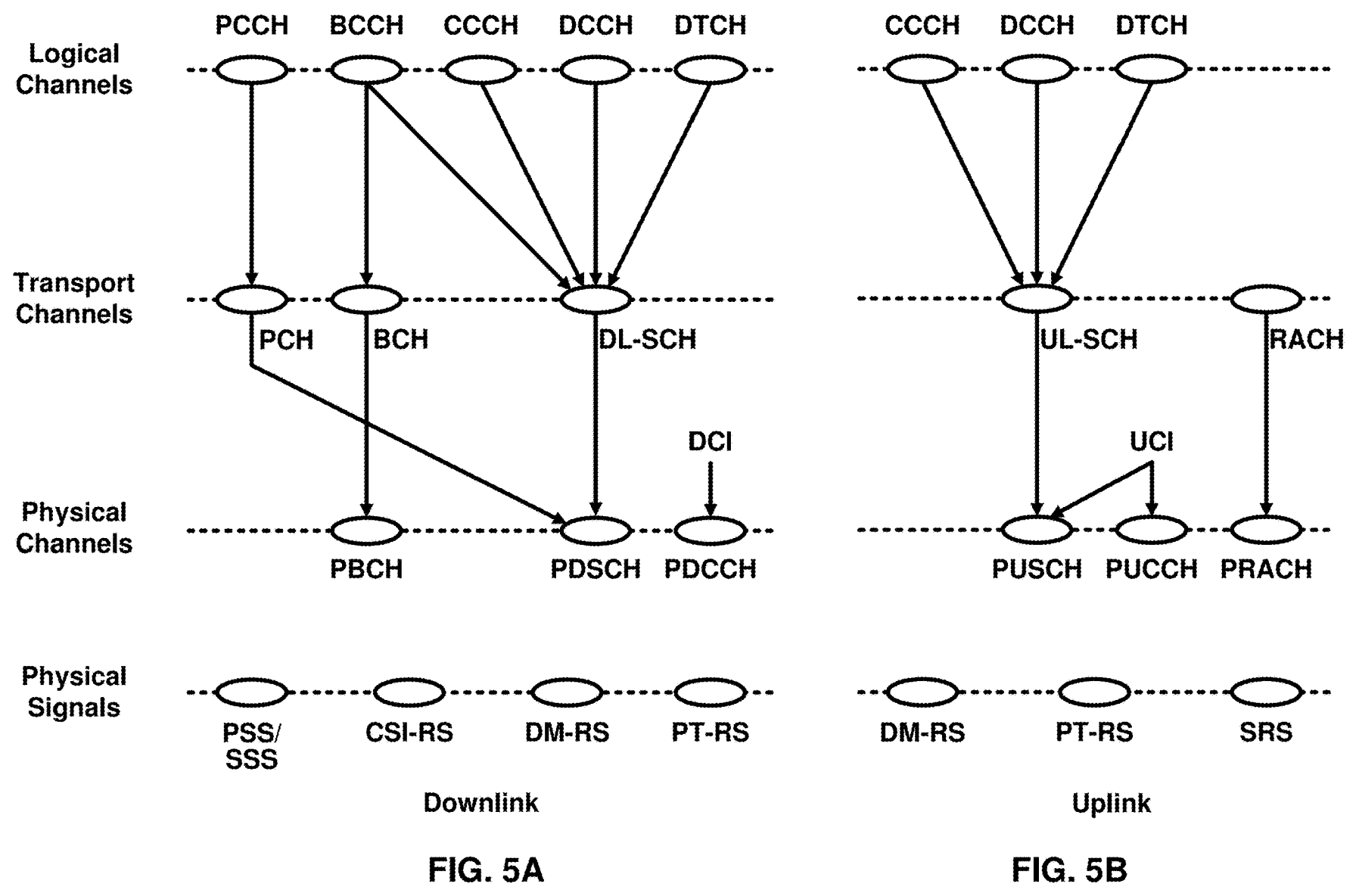

FIGS. 5A and 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIGS. 5A and 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
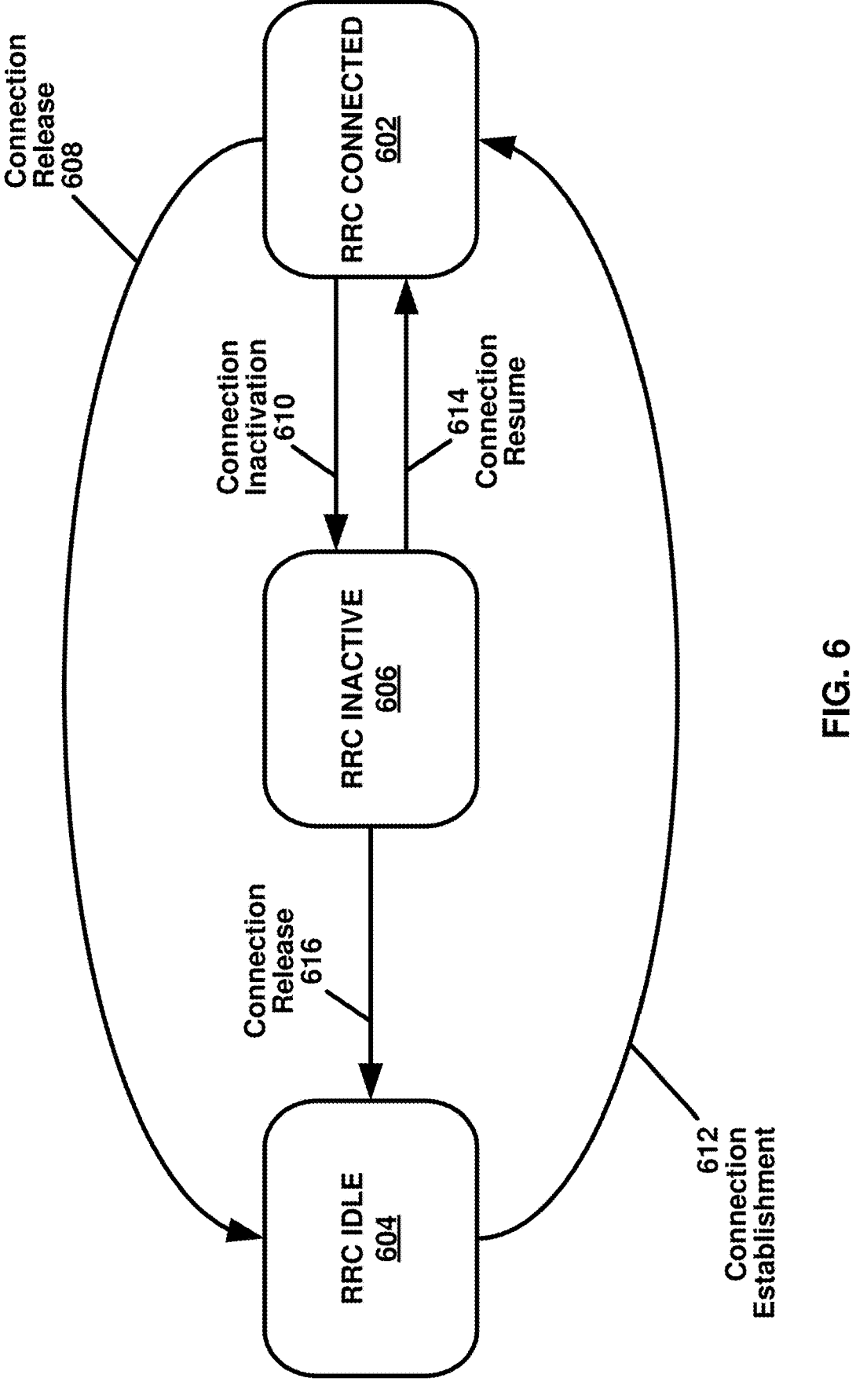
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIGS. 2A and 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1A, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIGS. 5A and 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
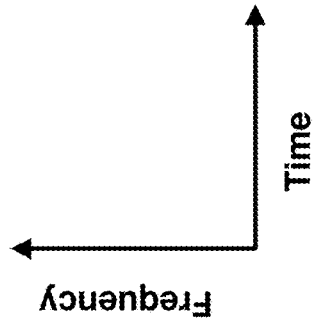
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
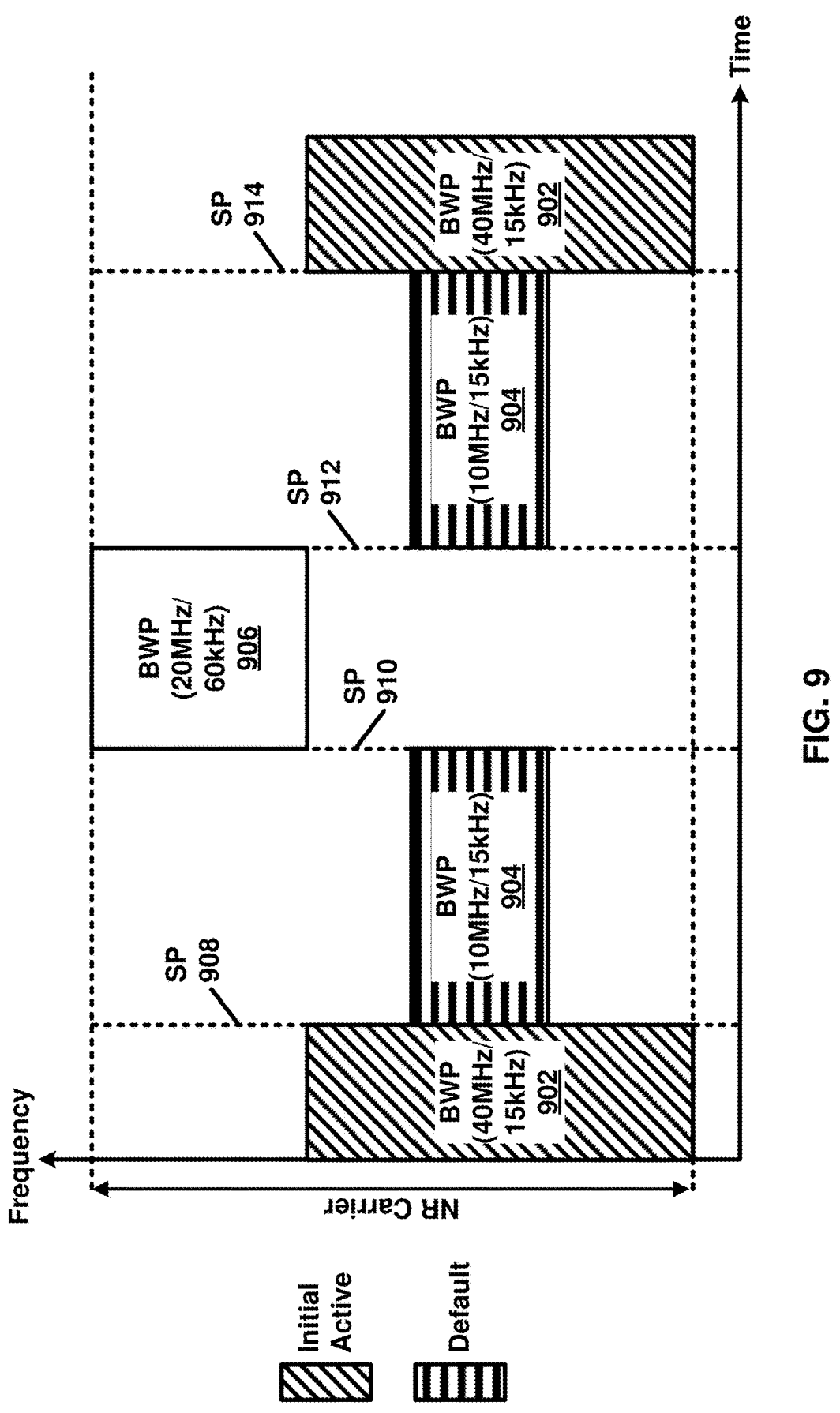
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in to response receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
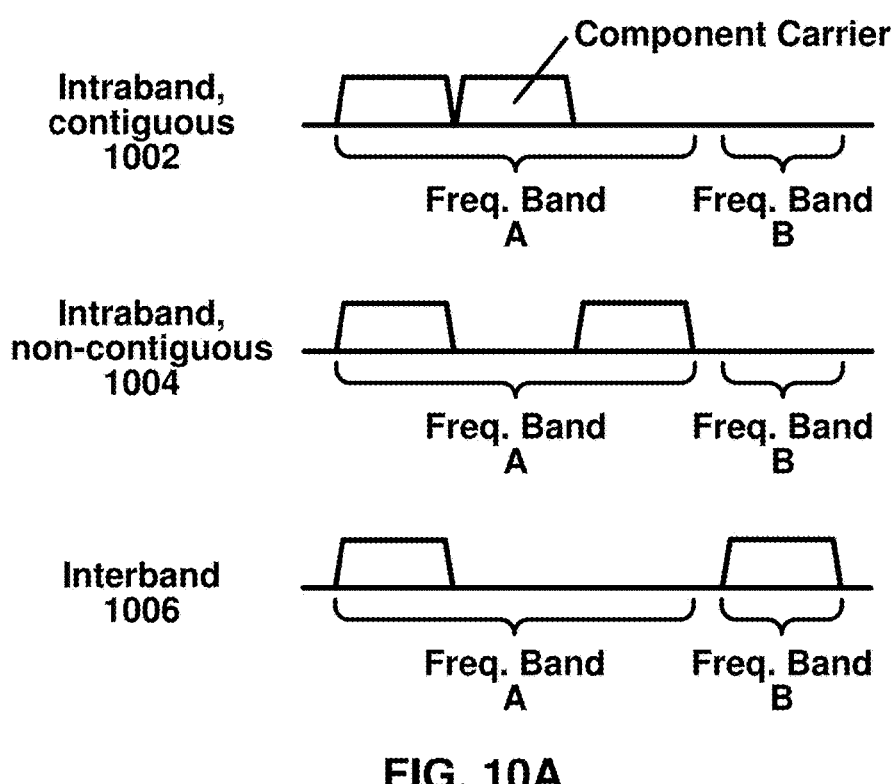
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
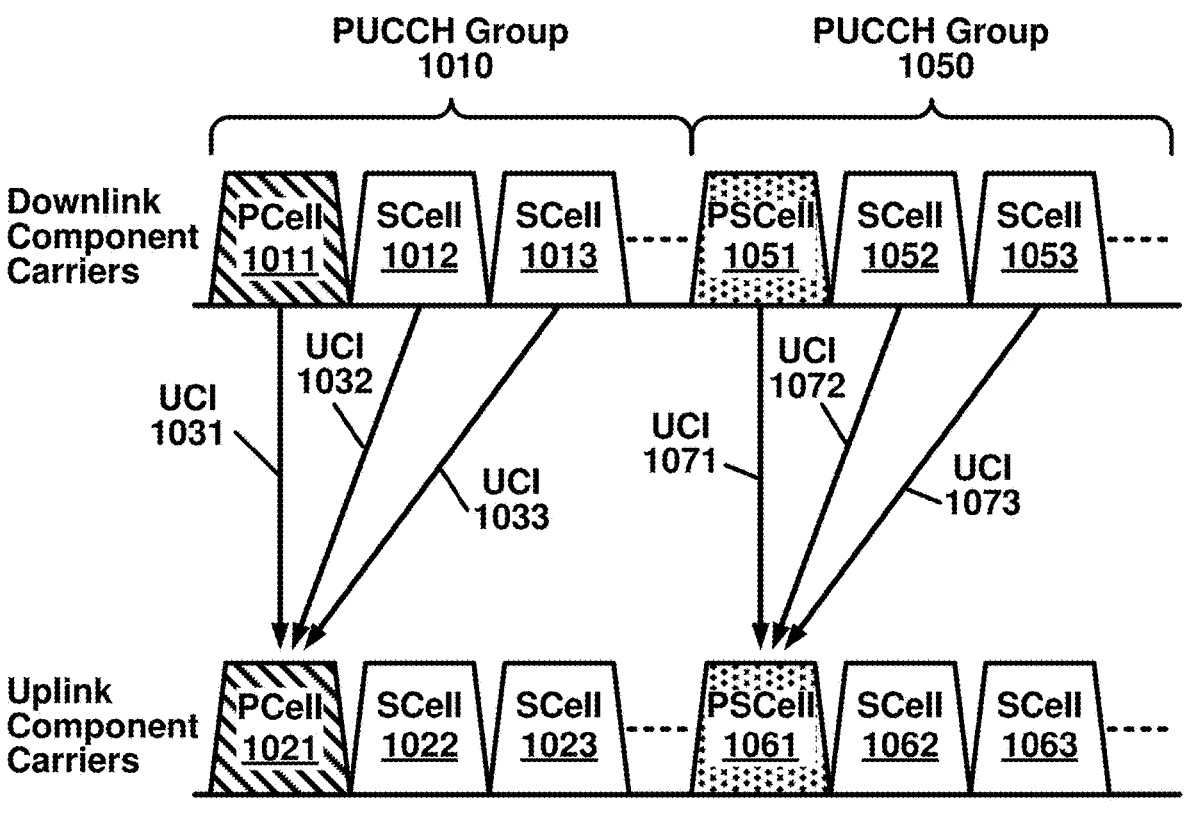
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
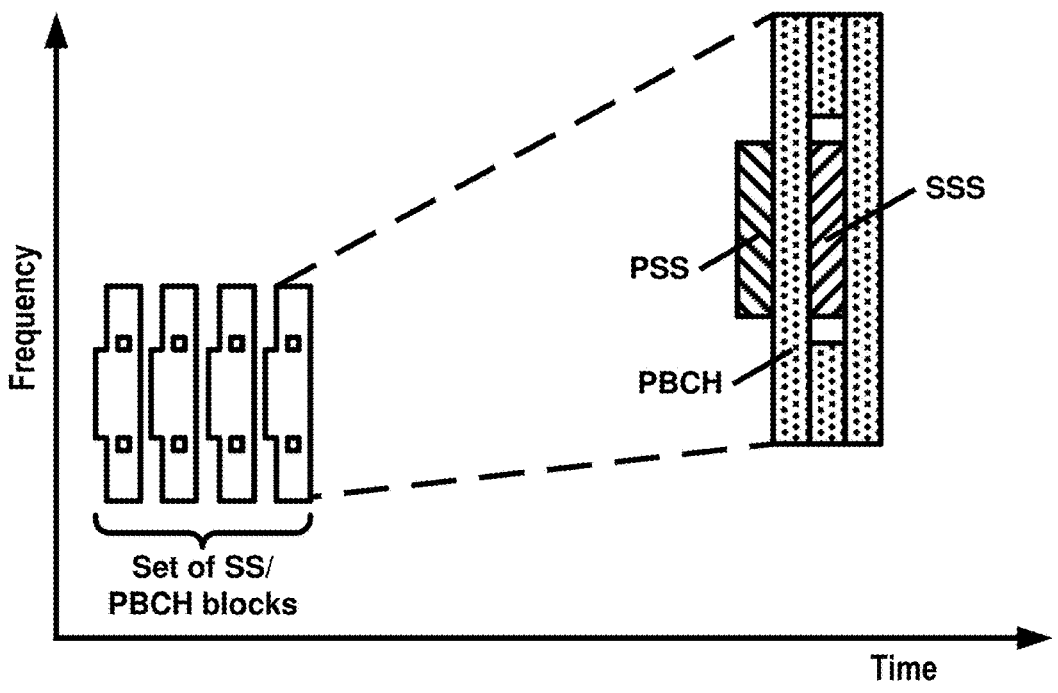
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
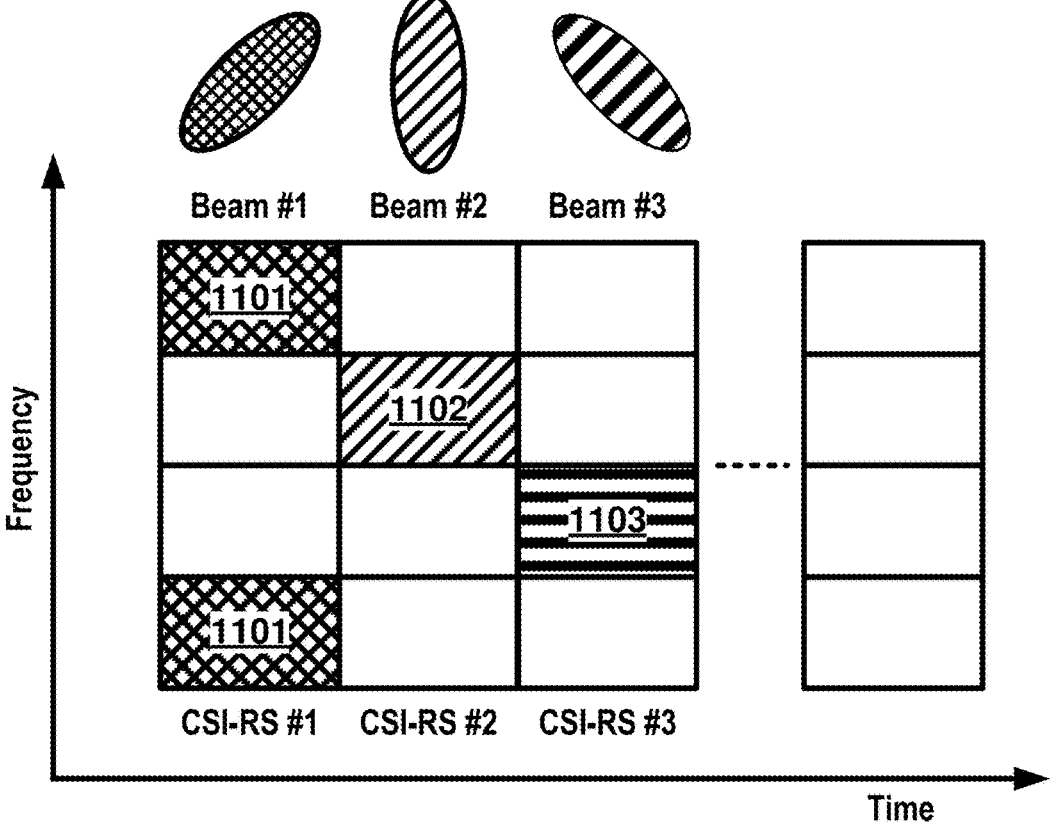
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
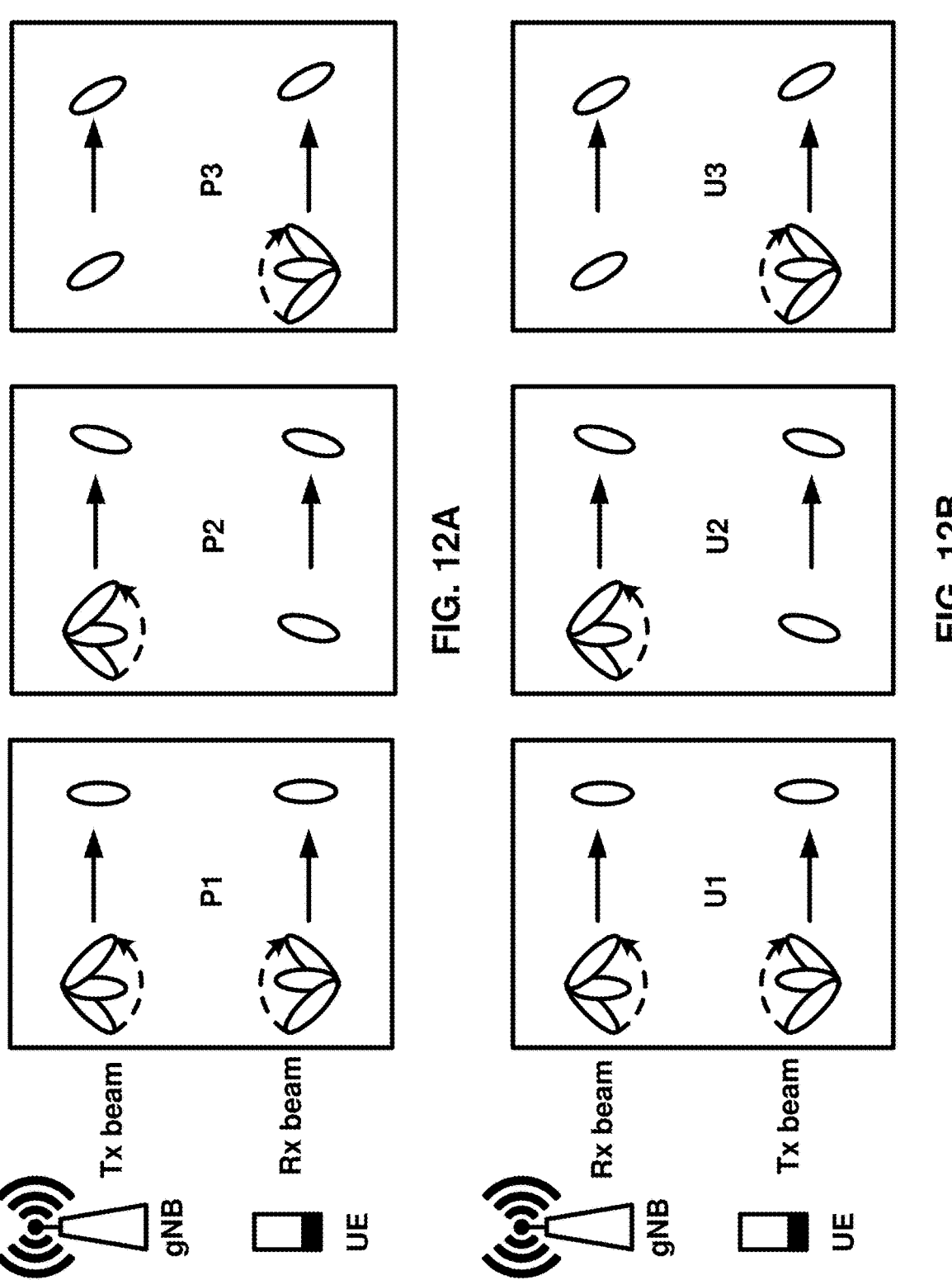
FIGS. 12A and 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
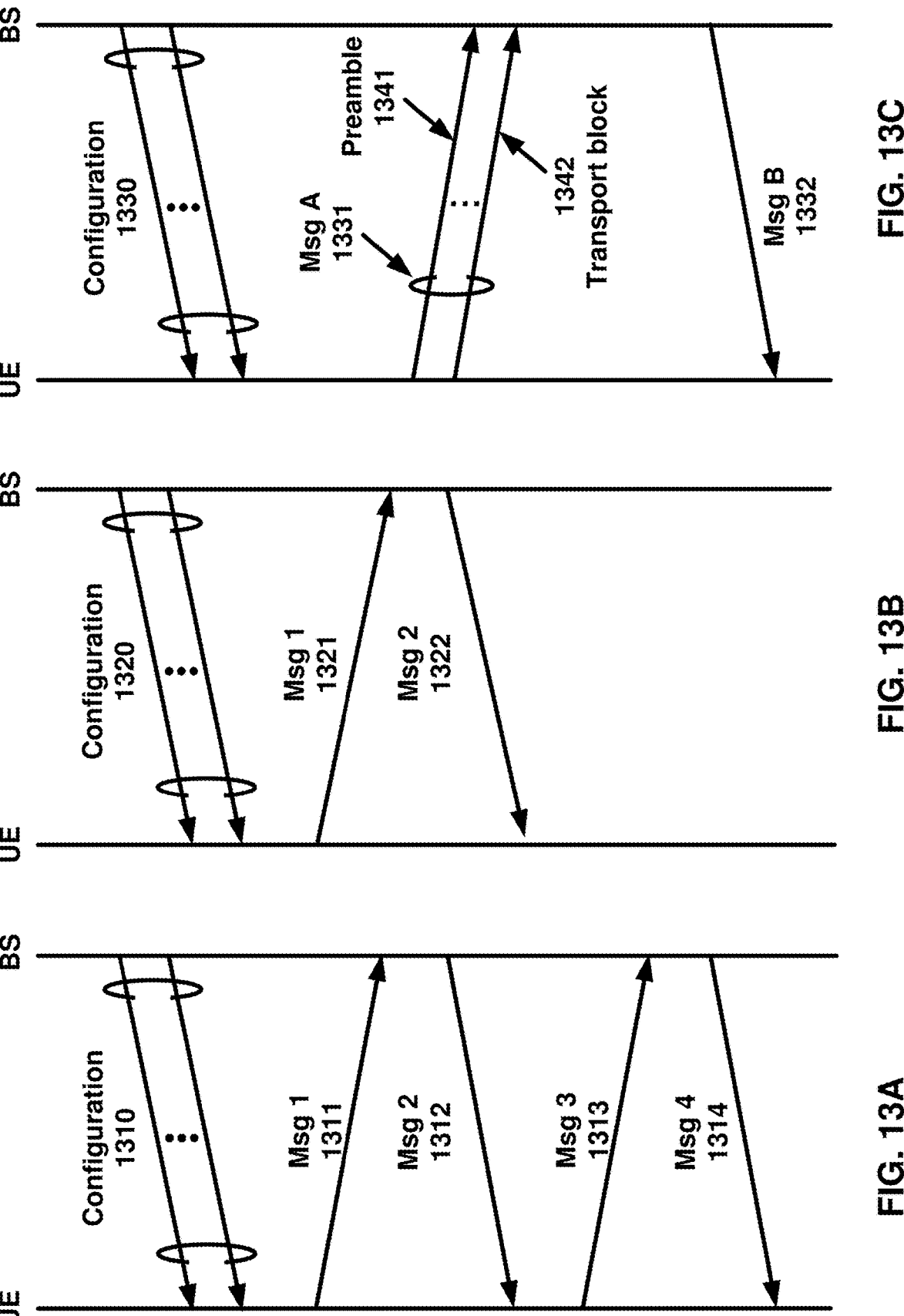
FIGS. 13A, 13B, and 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg2 1312, a Msg3 1313, and a Msg4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 31313. Based on the one or more RACH parameters, the UE may determine a reception timing and a downlink channel for receiving the Msg 21312 and the Msg 41314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 31313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 31313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 21312 received by the UE may include an RAR. In some scenarios, the Msg 21312 may include multiple RARs corresponding to multiple UEs. The Msg 21312 may be received after or in response to the transmitting of the Msg 1 1311. The Msg2 1312 may be scheduled on the DL-SCH and indicated on a PDCCH using a random access RNTI (RA-RNTI). The Msg 21312 may indicate that the Msg 1 1311 was received by the base station. The Msg 21312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 21312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id,$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The UE may transmit the Msg 31313 in response to a successful reception of the Msg 21312 (e.g., using resources identified in the Msg 21312). The Msg 31313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 31313 and the Msg 41314) may be used to increase the likelihood that the UE does not incorrectly use an identity of another the UE. To perform contention resolution, the UE may include a device identifier in the Msg 31313 (e.g., a C-RNTI if assigned, a TC-RNTI included in the Msg 21312, and/or any other suitable identifier).

The Msg 41314 may be received after or in response to the transmitting of the Msg 31313. If a C-RNTI was included in the Msg 31313, the base station will address the UE on the PDCCH using the C-RNTI. If the UE's unique C-RNTI is detected on the PDCCH, the random access procedure is determined to be successfully completed. If a TC-RNTI is included in the Msg 31313 (e.g., if the UE is in an RRC_IDLE state or not otherwise connected to the base station), Msg 41314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 31313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 31313) may remain on the selected carrier. The UE may switch an uplink carrier during the random access procedure (e.g., between the Msg 1 1311 and the Msg 31313) in one or more cases. For example, the UE may determine and/or switch an uplink carrier for the Msg 1 1311 and/or the Msg 31313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 21312 illustrated in FIG. 13A, respectively. As will be understood from FIGS. 13A and 13B, the contention-free random access procedure may not include messages analogous to the Msg 31313 and/or the Msg 41314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 21322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 31313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 21312 (e.g., an RAR) illustrated in FIGS. 13A and 13B and/or the Msg 41314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 31313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
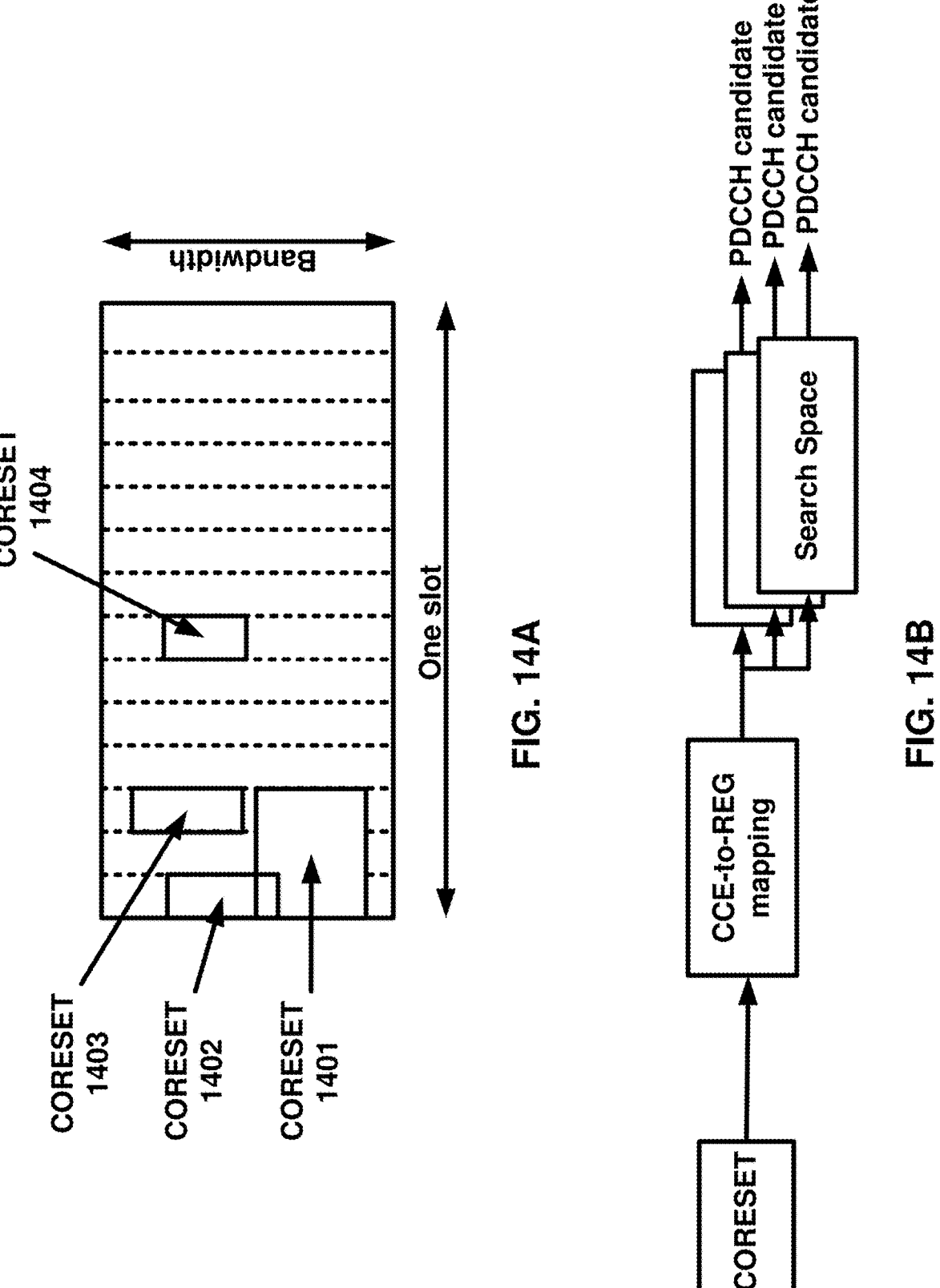
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
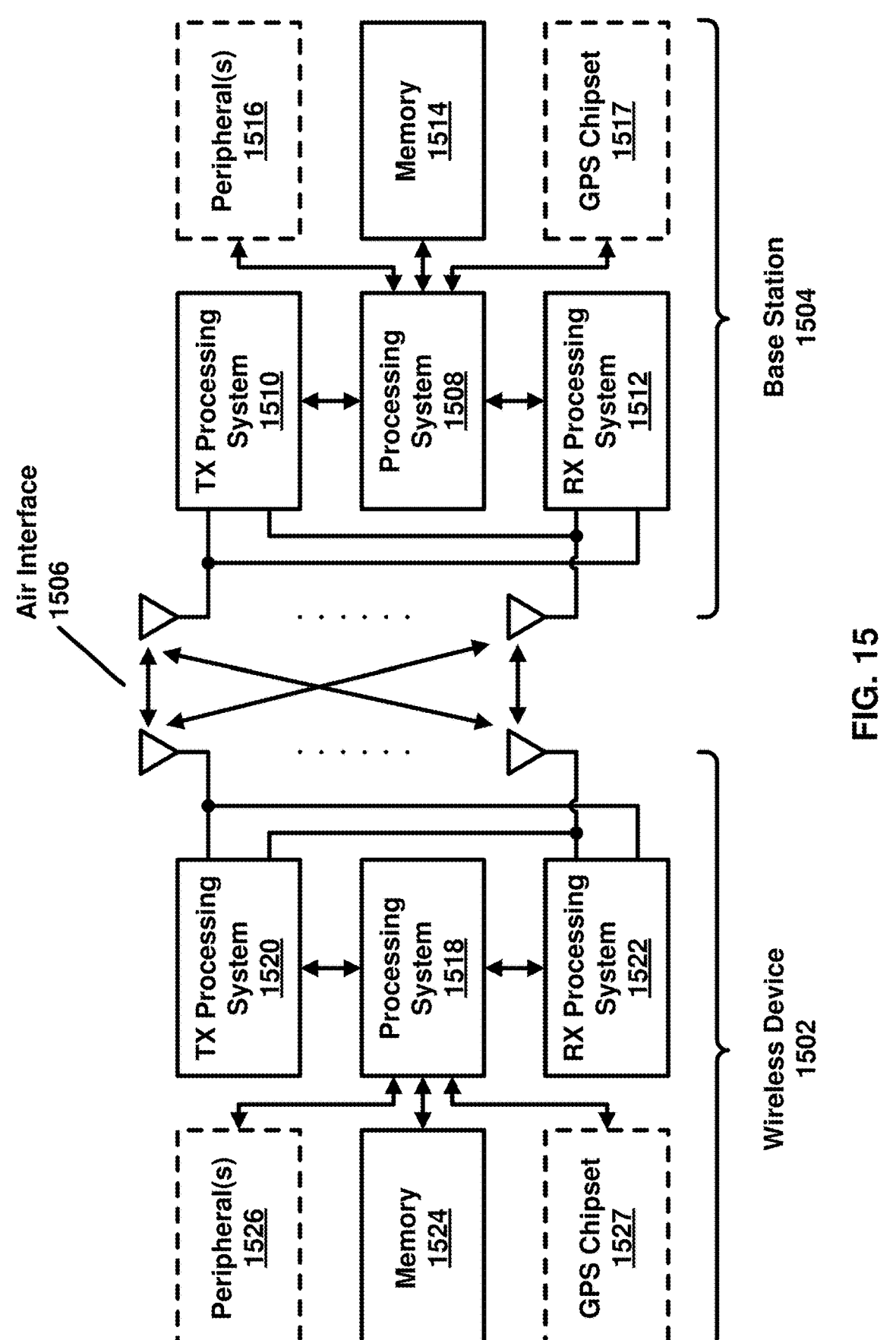
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
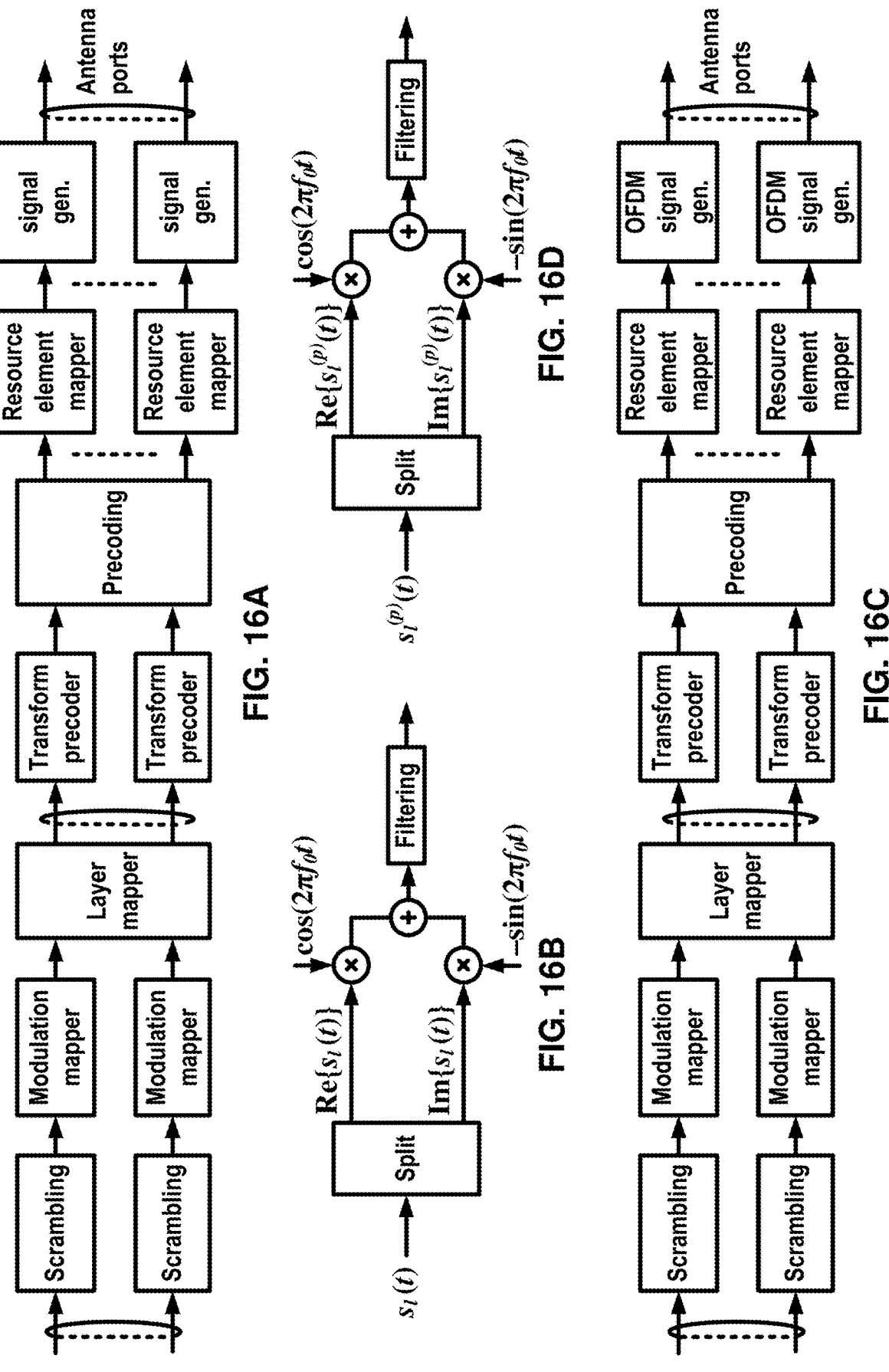
FIGS. 16A, 16B, 16C, and 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17:
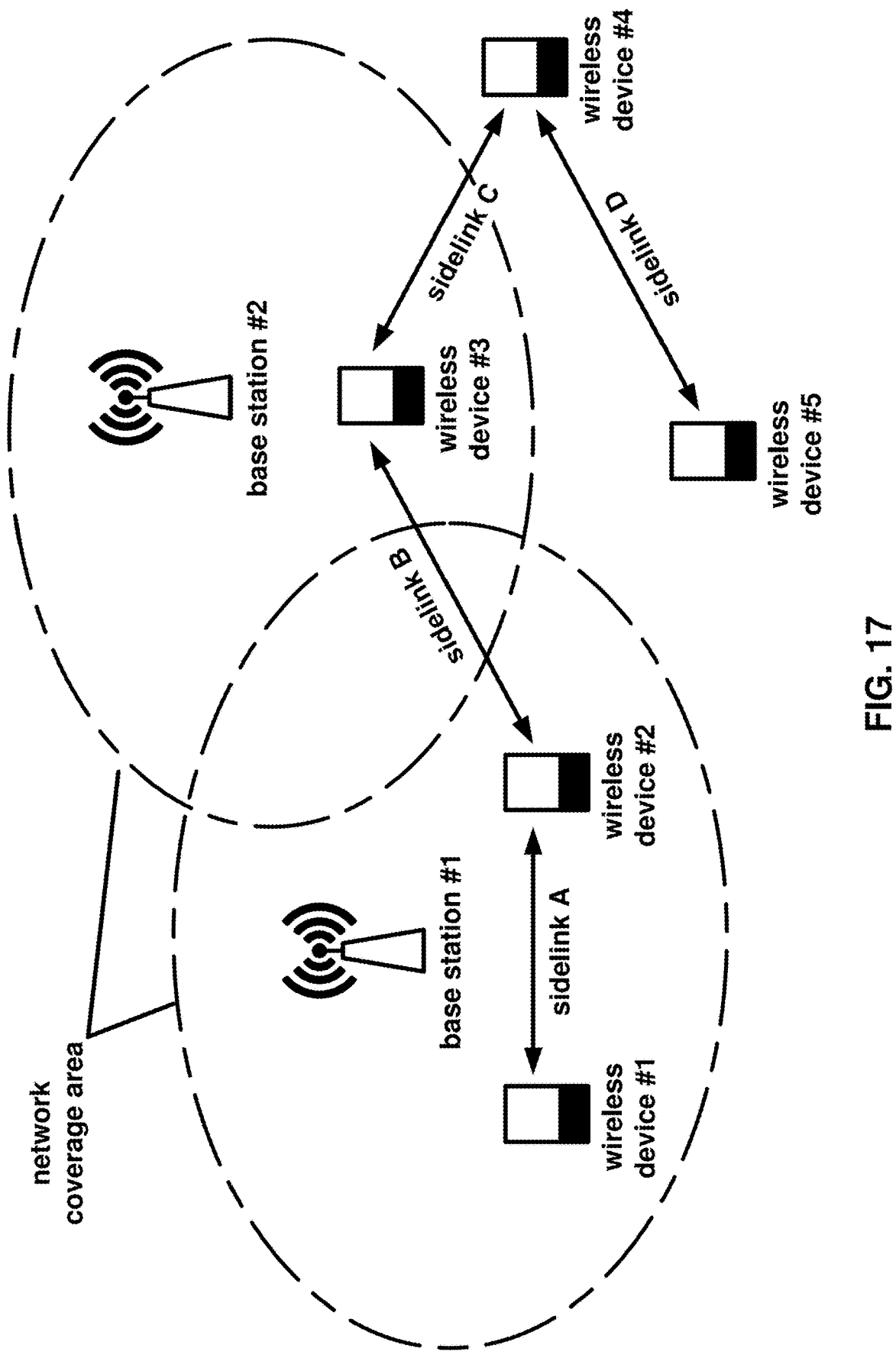
FIG. 17 illustrates examples of device-to-device (D2D) communication as per an aspect of an example embodiment of the present disclosure.

FIG. 17 illustrates examples of device-to-device (D2D) communication, in which there is a direct communication between wireless devices. In an example, D2D communication may be performed via a sidelink (SL). The wireless devices may exchange sidelink communications via a sidelink interface (e.g., a PC5 interface). Sidelink differs from uplink (in which a wireless device communicates to a base station) and downlink (in which a base station communicates to a wireless device). A wireless device and a base station may exchange uplink and/or downlink communications via a user plane interface (e.g., a Uu interface).

As shown in the FIG. 17, wireless device #1 and wireless device #2 may be in a coverage area of base station #1. For example, both wireless device #1 and wireless device #2 may communicate with the base station #1 via a Uu interface. Wireless device #3 may be in a coverage area of base station #2. Base station #1 and base station #2 may share a network and may jointly provide a network coverage area. Wireless device #4 and wireless device #5 may be outside of the network coverage area.

In-coverage D2D communication may be performed when two wireless devices share a network coverage area. Wireless device #1 and wireless device #2 are both in the coverage area of base station #1. Accordingly, they may perform an in-coverage intra-cell D2D communication, labeled as sidelink A. Wireless device #2 and wireless device #3 are in the coverage areas of different base stations, but share the same network coverage area. Accordingly, they may perform an in-coverage inter-cell D2D communication, labeled as sidelink B. Partial-coverage D2D communications may be performed when one wireless device is within the network coverage area and the other wireless device is outside the network coverage area. Wireless device #3 and wireless device #4 may perform a partial-coverage D2D communication, labeled as sidelink C. Out-of-coverage D2D communications may be performed when both wireless devices are outside of the network coverage area. Wireless device #4 and wireless device #5 may perform an out-of-coverage D2D communication, labeled as sidelink D.

Sidelink communications may be configured using physical channels, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. PSBCH may be similar in some respects to PBCH. The broadcast information may comprise, for example, a slot format indication, resource pool information, a sidelink system frame number, or any other suitable broadcast information. PSFCH may be used by a first wireless device to send feedback information to a second wireless device. The feedback information may comprise, for example, HARQ feedback information. PSDCH may be used by a first wireless device to send discovery information to a second wireless device. The discovery information may be used by a wireless device to signal its presence and/or the availability of services to other wireless devices in the area. PSCCH may be used by a first wireless device to send sidelink control information (SCI) to a second wireless device. PSCCH may be similar in some respects to PDCCH and/or PUCCH. The control information may comprise, for example, time/frequency resource allocation information (RB size, a number of retransmissions, etc.), demodulation related information (DMRS, MCS, RV, etc.), identifying information for a transmitting wireless device and/or a receiving wireless device, a process identifier (HARQ, etc.), or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar in some respects to PDSCH and/or PUSCH. Each of the sidelink channels may be associated with one or more demodulation reference signals. Sidelink operations may utilize sidelink synchronization signals to establish a timing of sidelink operations. Wireless devices configured for sidelink operations may send sidelink synchronization signals, for example, with the PSBCH. The sidelink synchronization signals may include primary sidelink synchronization signals (PSSS) and secondary sidelink synchronization signals (SSSS).

Sidelink resources may be configured to a wireless device in any suitable manner. A wireless device may be pre-configured for sidelink, for example, pre-configured with sidelink resource information. Additionally or alternatively, a network may broadcast system information relating to a resource pool for sidelink. Additionally or alternatively, a network may configure a particular wireless device with a dedicated sidelink configuration. The configuration may identify sidelink resources to be used for sidelink operation (e.g., configure a sidelink band combination).

The wireless device may operate in different modes, for example, an assisted mode (which may be referred to as mode 1) or an autonomous mode (which may be referred to as mode 2). Mode selection may be based on a coverage status of the wireless device, a radio resource control status of the wireless device, information and/or instructions from the network, and/or any other suitable factors. For example, if the wireless device is idle or inactive, or if the wireless device is outside of network coverage, the wireless device may select to operate in autonomous mode. For example, if the wireless device is in a connected mode (e.g., connected to a base station), the wireless device may select to operate (or be instructed by the base station to operate) in assisted mode. For example, the network (e.g., a base station) may instruct a connected wireless device to operate in a particular mode.

In an assisted mode, the wireless device may request scheduling from the network. For example, the wireless device may send a scheduling request to the network and the network may allocate sidelink resources to the wireless device. Assisted mode may be referred to as network-assisted mode, gNB-assisted mode, or base station-assisted mode. In an autonomous mode, the wireless device may select sidelink resources based on measurements within one or more resource pools (for example, pre-configure or network-assigned resource pools), sidelink resource selections made by other wireless devices, and/or sidelink resource usage of other wireless devices.

To select sidelink resources, a wireless device may observe a sensing window and a selection window. During the sensing window, the wireless device may observe SCI transmitted by other wireless devices using the sidelink resource pool. The SCIs may identify resources that may be used and/or reserved for sidelink transmissions. Based on the resources identified in the SCIs, the wireless device may select resources within the selection window (for example, resource that are different from the resources identified in the SCIs). The wireless device may transmit using the selected sidelink resources.

Figure 18:
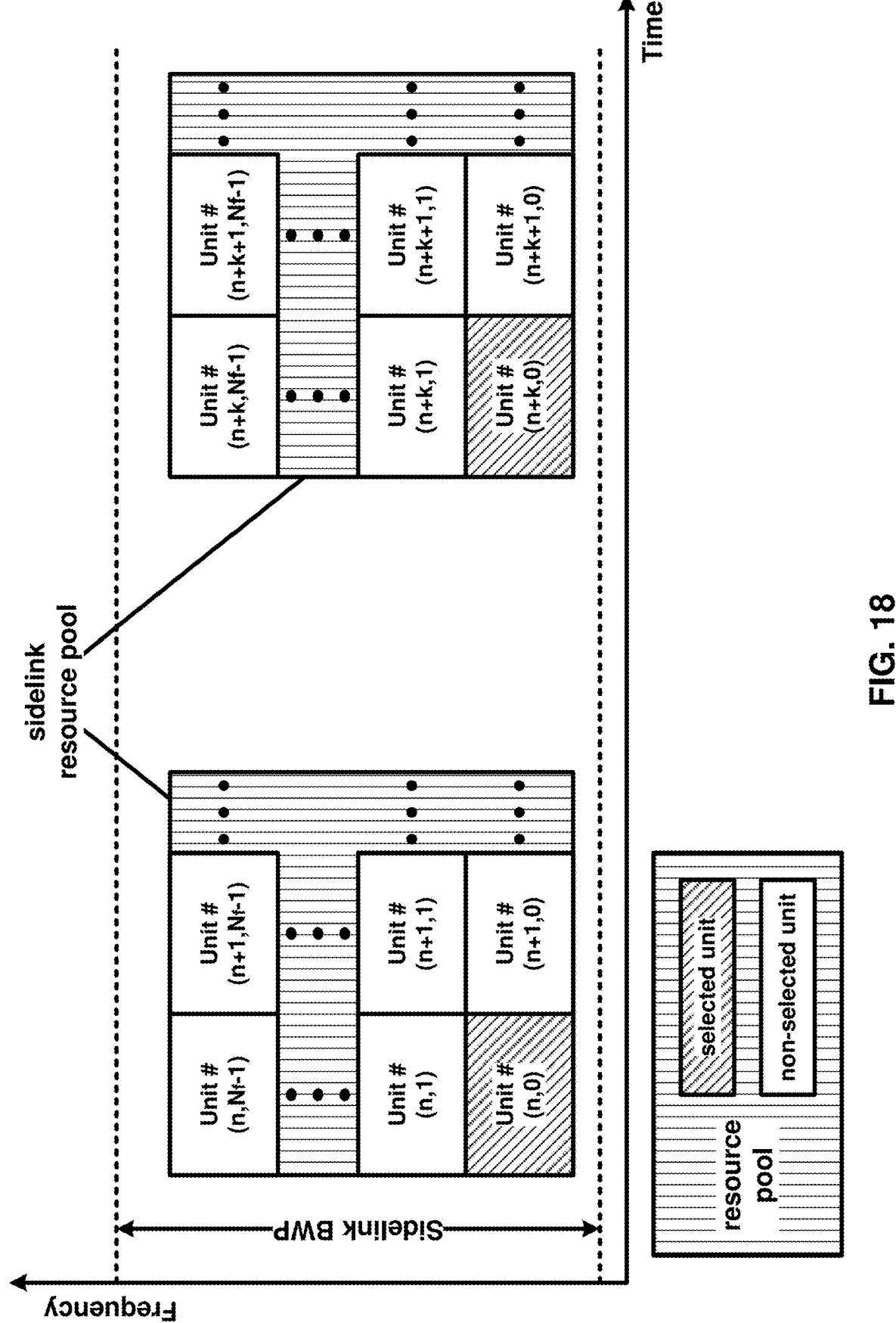
FIG. 18 illustrates an example of a resource pool for sidelink operations as per an aspect of an example embodiment of the present disclosure.

FIG. 18 illustrates an example of a resource pool for sidelink operations. A wireless device may operate using one or more sidelink cells. A sidelink cell may include one or more resource pools. Each resource pool may be configured to operate in accordance with a particular mode (for example, assisted or autonomous). The resource pool may be divided into resource units. In the frequency domain, each resource unit may comprise, for example, one or more resource blocks which may be referred to as a sub-channel. In the time domain, each resource unit may comprise, for example, one or more slots, one or more subframes, and/or one or more OFDM symbols. The resource pool may be continuous or non-continuous in the frequency domain and/or the time domain (for example, comprising contiguous resource units or non-contiguous resource units). The resource pool may be divided into repeating resource pool portions. The resource pool may be shared among one or more wireless devices. Each wireless device may attempt to transmit using different resource units, for example, to avoid collisions.

Sidelink resource pools may be arranged in any suitable manner. In the figure, the example resource pool is non-contiguous in the time domain and confined to a single sidelink BWP. In the example resource pool, frequency resources are divided into a Nf resource units per unit of time, numbered from zero to Nf−1. The example resource pool may comprise a plurality of portions (non-contiguous in this example) that repeat every k units of time. In the figure, time resources are numbered as n, n+1 . . . n+k, n+k+1 . . . , etc.

A wireless device may select for transmission one or more resource units from the resource pool. In the example resource pool, the wireless device selects resource unit (n,0) for sidelink transmission. The wireless device may further select periodic resource units in later portions of the resource pool, for example, resource unit (n+k,0), resource unit (n+2k,0), resource unit (n+3k,0), etc. The selection may be based on, for example, a determination that a transmission using resource unit (n,0) will not (or is not likely) to collide with a sidelink transmission of a wireless device that shares the sidelink resource pool. The determination may be based on, for example, behavior of other wireless devices that share the resource pool. For example, if no sidelink transmissions are detected in resource unit (n–k,0), then the wireless device may select resource unit (n,0), resource (n+k,0), etc. For example, if a sidelink transmission from another wireless device is detected in resource unit (n–k,1), then the wireless device may avoid selection of resource unit (n,1), resource (n+k,1), etc.

Different sidelink physical channels may use different resource pools. For example, PSCCH may use a first resource pool and PSSCH may use a second resource pool. Different resource priorities may be associated with different resource pools. For example, data associated with a first QoS, service, priority, and/or other characteristic may use a first resource pool and data associated with a second QoS, service, priority, and/or other characteristic m ay use a second resource pool. For example, a network (e.g., a base station) may configure a priority level for each resource pool, a service to be supported for each resource pool, etc. For example, a network (e.g., a base station) may configure a first resource pool for use by unicast UEs, a second resource pool for use by groupcast UEs, etc. For example, a network (e.g., a base station) may configure a first resource pool for transmission of sidelink data, a second resource pool for transmission of discovery messages, etc.

In an example of vehicle-to-everything (V2X) communications via a Uu interface and/or a PC5 interface, the V2X communications may be vehicle-to-vehicle (V2V) communications. A wireless device in the V2V communications may be a vehicle. In an example, the V2X communications may be vehicle-to-pedestrian (V2P) communications. A wireless device in the V2P communications may be a pedestrian equipped with a mobile phone/handset. In an example, the V2X communications may be vehicle-to-infrastructure (V2I) communications. The infrastructure in the V2I communications may be a base station/access point/node/road side unit. A wireless device in the V2X communications may be a transmitting wireless device performing one or more sidelink transmissions to a receiving wireless device. The wireless device in the V2X communications may be a receiving wireless device receiving one or more sidelink transmissions from a transmitting wireless device.

Figure 19:
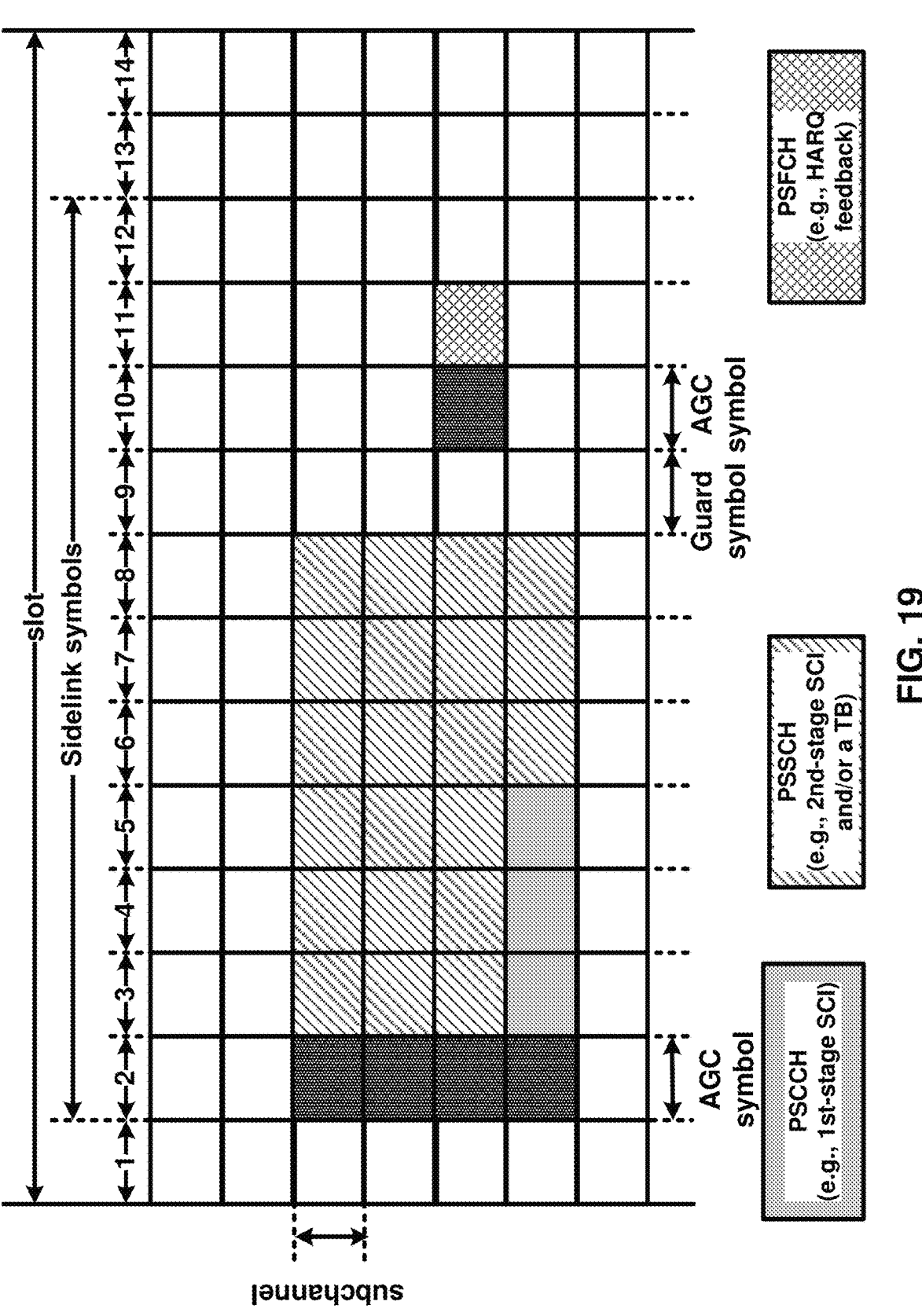
FIG. 19 illustrates an example of sidelink symbols in a slot as per an aspect of an example embodiment of the present disclosure.

FIG. 19 illustrates an example of sidelink symbols in a slot. In an example, a sidelink transmission may be transmitted in a slot in the time domain. In an example, a wireless device may have data to transmit via sidelink. The wireless device may segment the data into one or more transport blocks (TBs). The one or more TBs may comprise different pieces of the data. A TB of the one or more TBs may be a data packet of the data. The wireless device may transmit a TB of the one or more TBs (e.g., a data packet) via one or more sidelink transmissions (e.g., via PSCCH/PSSCH in one or more slots). In an example, a sidelink transmission (e.g., in a slot) may comprise SCI. The sidelink transmission may further comprise a TB. The SCI may comprise a $1^{st}$-stage SCI and a $2^{nd}$-stage SCI. A PSCCH of the sidelink transmission may comprise the $1^{st}$-stage SCI for scheduling a PSSCH (e.g., the TB). The PSSCH of the sidelink transmission may comprise the $2^{nd}$-stage SCI. The PSSCH of the sidelink transmission may further comprise the TB. In an example, sidelink symbols in a slot may or may not start from the first symbol of the slot. The sidelink symbols in the slot may or may not end at the last symbol of the slot. In an example of FIG. 19, sidelink symbols in a slot start from the second symbol of the slot. In an example of FIG. 19, the sidelink symbols in the slot end at the twelfth symbol of the slot. A first sidelink transmission may comprise a first automatic gain control (AGC) symbol (e.g., the second symbol in the slot), a PSCCH (e.g., in the third, fourth and the fifth symbols in a sub-channel in the slot), a PSSCH (e.g., from the third symbol to the eighth symbol in the slot), and/or a first guard symbol (e.g., the ninth symbol in the slot). A second sidelink transmission may comprise a second AGC symbol (e.g., the tenth symbol in the slot), a PSFCH (e.g., the eleventh symbol in the slot), and/or a second guard symbol for the second sidelink transmission (e.g., the twelfth symbol in the slot). In an example, one or more HARQ feedbacks (e.g., positive acknowledgement or ACK and/or negative acknowledgement or NACK) may be transmitted via the PSFCH. In an example, the PSCCH, the PSSCH, and the PSFCH may have different number of sub-channels (e.g., a different number of frequency resources) in the frequency domain.

The $1^{st}$-stage SCI may be a SCI format 1-A. The SCI format 1-A may comprise a plurality of fields used for scheduling of the first TB on the PSSCH and the $2^{nd}$-stage SCI on the PSSCH. The following information may be transmitted by means of the SCI format 1-A.

A priority of the sidelink transmission. For example, the priority may be a physical layer (e.g., layer 1) priority of the sidelink transmission. For example, the priority may be determined based on logical channel priorities of the sidelink transmission;

Frequency resource assignment of the PSSCH;

Time resource assignment of the PSSCH;

Resource reservation period/interval for a second TB;

Demodulation reference signal (DMRS) pattern;

A format of the $2^{nd}$-stage SCI;

Beta_offset indicator;

Number of DMRS port;

Modulation and coding scheme of the PSSCH;

Additional MCS table indicator;

PSFCH overhead indication;

Reserved bits.

The $2^{nd}$-stage SCI may be a SCI format 2-A. The SCI format 2-A may be used for the decoding of the PSSCH, with HARQ operation when HARQ-ACK information includes ACK or NACK, or when there is no feedback of HARQ-ACK information. The SCI format 2-A may comprise a plurality of fields indicating the following information.

HARQ process number;

New data indicator;

Redundancy version;

Source ID of a transmitter (e.g., a transmitting wireless device) of the sidelink transmission;

Destination ID of a receiver (e.g., a receiving wireless device) of the sidelink transmission;

HARQ feedback enabled/disabled indicator;

Cast type indicator indicating that the sidelink transmission is a broadcast, a groupcast and/or a unicast;

CSI request.

The $2^{nd}$-stage SCI may be a SCI format 2-B. The SCI format 2-B may be used for the decoding of the PSSCH, with HARQ operation when HARQ-ACK information includes only NACK, or when there is no feedback of HARQ-ACK information. The SCI format 2-B may comprise a plurality of fields indicating the following information.

HARQ process number;

New data indicator;

Redundancy version;

Source ID of a transmitter (e.g., a transmitting wireless device) of the sidelink transmission;

Destination ID of a receiver (e.g., a receiving wireless device) of the sidelink transmission;

HARQ feedback enabled/disabled indicator;

Zone ID indicating a zone in which a transmitter (e.g., a transmitting wireless device) of the sidelink transmission is geographic located;

Communication range requirement indicating a communication range of the sidelink transmission.

Figure 20:
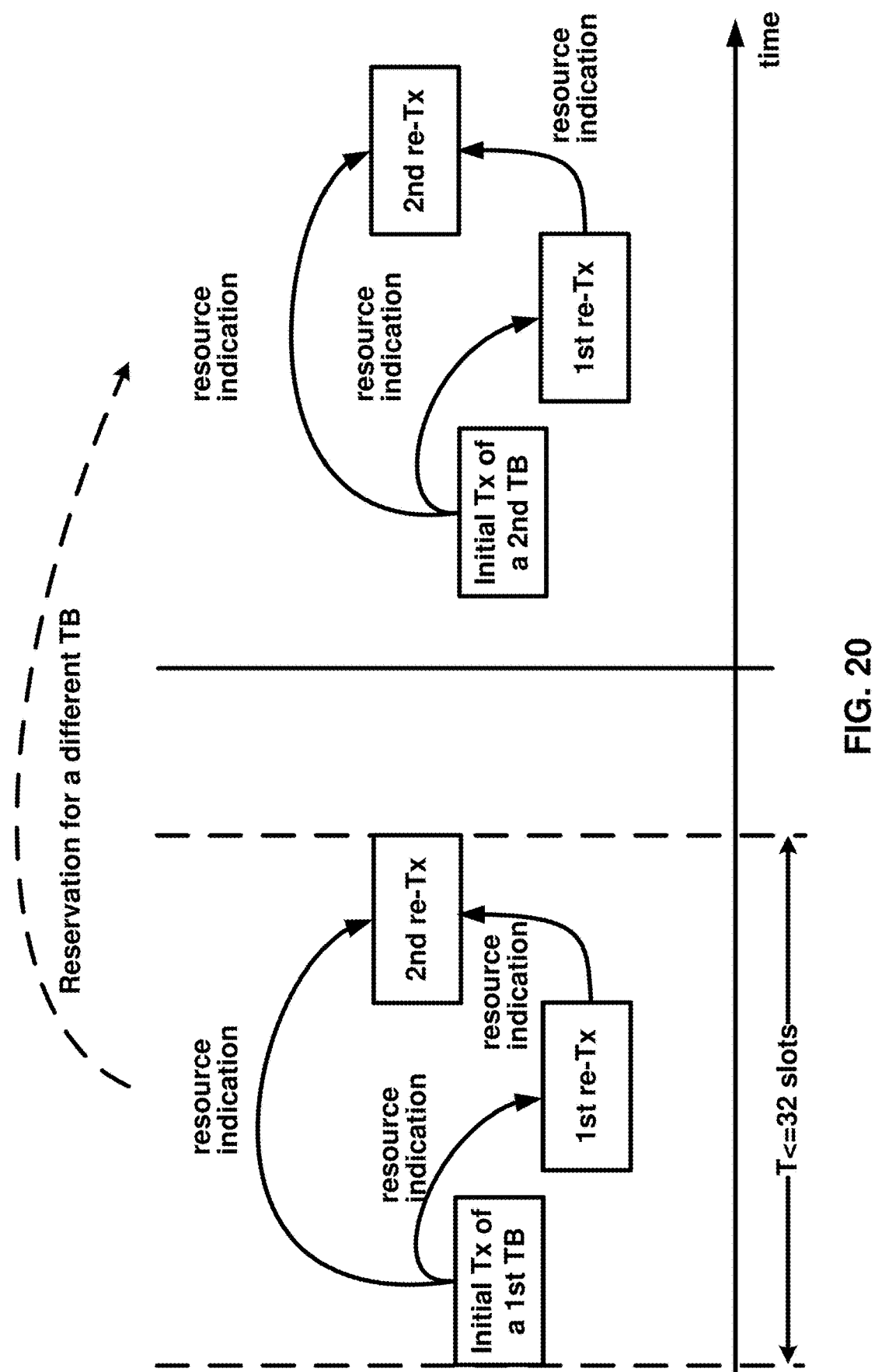
FIG. 20 illustrates an example of resource indication for a first TB (e.g., a first data packet) and resource reservation for a second TB (e.g., a second data packet) as per an aspect of an example embodiment of the present disclosure.

FIG. 20 illustrates an example of resource indication for a first TB (e.g., a first data packet) and resource reservation for a second TB (e.g., a second data packet). SCI of an initial transmission (e.g., a first transmission) and/or retransmission of the first TB may comprise one or more first parameters (e.g., Frequency resource assignment and Time resource assignment) indicating one or more first time and frequency (T/F) resources for transmission and/or retransmission of the first TB. The SCI may further comprise one or more second parameters (e.g., Resource reservation period) indicating a reservation period/interval of one or more second T/F resources for initial transmission and/or retransmission of the second TB.

In an example, in response to triggering a resource selection procedure, a wireless device may select one or more first T/F resources for initial transmission and/or retransmission of a first TB. As shown in FIG. 20, the wireless device may select three resources for transmitting the first TB. The wireless device may transmit an initial transmission (initial Tx of a first TB in FIG. 20) of the first TB via a first resource of the three resources. The wireless device may transmit a first retransmission ($1^{st}$ re-Tx in FIG. 20) of the first TB via a second resource of the three resources. The wireless device may transmit a second retransmission ($2^{nd}$ re-Tx in FIG. 20) of the first TB via a third resource of the three resources. A time duration between a starting time of the initial transmission of the first TB and the second retransmission of the first TB may be smaller than or equal to 32 sidelink slots (e.g., T 32 slots in FIG. 20). A first SCI may associate with the initial transmission of the first TB. The first SCI may indicate a first T/F resource indication for the initial transmission of the first TB, the first retransmission of the first TB and the second retransmission of the first TB. The first SCI may further indicate a reservation period/interval of resource reservation for a second TB. A second SCI may associate with the first retransmission of the first TB. The second SCI may indicate a second T/F resource indication for the first retransmission of the first TB and the second retransmission of the first TB. The second SCI may further indicate the reservation period/interval of resource reservation for the second TB. A third SCI may associate with the second retransmission of the first TB. The third SCI may indicate a third T/F resource indication for the second retransmission of the first TB. The third SCI may further indicate the reservation period/interval of resource reservation for the second TB.

FIGS. 21 and 22 illustrate examples of configuration information for sidelink communication. In an example, a base station may transmit one or more radio resource control (RRC) messages to a wireless device for delivering the configuration information for the sidelink communication. The configuration information may comprise a field of sl-UE-SelectedConfigRP. A parameter sl-ThresPSSCH-RSRP-List in the field may indicate a list of 64 thresholds.

In an example, a wireless device may receive first sidelink control information (SCI) indicating a first priority.

The wireless device may have second SCI to be transmitted. The second SCI may indicate a second priority. The wireless device may select a threshold from the list based on the first priority in the first SCI and the second priority in the second SCI. Referring to second exclusion in FIG. 26, the wireless device may exclude resources from candidate resource set based on the threshold. A parameter sl-MaxNumPerReserve in the field may indicate a maximum number of reserved PSCCH/PSSCH resources indicated in an SCI. A parameter sl-MultiReserveResource in the field may indicate if it is allowed to reserve a sidelink resource for an initial transmission of a TB by an SCI associated with a different TB, based on sensing and resource selection procedure. A parameter sl-ResourceReservePeriodList may indicate a set of possible resource reservation periods/intervals (e.g., SL-ResourceReservedPeriod) allowed in a resource pool. Up to 16 values may be configured per resource pool. A parameter sl-RS-ForSensing may indicate whether DMRS of PSCCH or PSSCH is used for layer 1 (e.g., physical layer) RSRP measurement in sensing operation. A parameter sl-SensingWindow may indicate a start of a sensing window. A parameter sl-SelectionWindowList may indicate an end of a selection window in resource selection procedure for a TB with respect to priority indicated in SCI. Value n1 may correspond to $1*2\ \mu$, value n5 corresponds to $5*2\ \mu$, and so on, where $=0,1,2,3$ for sub-carrier spacing (SCS) of 15, 30, 60, and 120 kHz respectively. A parameter SL-SelectionWindowConfig may indicate a mapping between a sidelink priority (e.g., sl-Priority) and the end of the selection window (e.g., sl-SelectionWindow).

The configuration information may comprise a parameter sl-PreemptionEnable indicating whether sidelink pre-emption is disabled or enabled in a resource pool. For example, a priority level p_preemption may be configured if the sidelink pre-emption is enabled. For example, if the sidelink pre-emption is enabled but the p_preemption is not configured, the sidelink pre-emption may be applicable to all priority levels.

The configuration information may comprise a parameter sl-TxPercentageList indicating a portion of candidate single-slot PSSCH resources over total resources. For example, value p20 may correspond to 20%, and so on. A parameter SL-TxPercentageConfig may indicate a mapping between a sidelink priority (e.g., sl-Priority) and the portion of candidate single-slot PSSCH resources over total resources (e.g., sl-TxPercentage).

Figure 23:
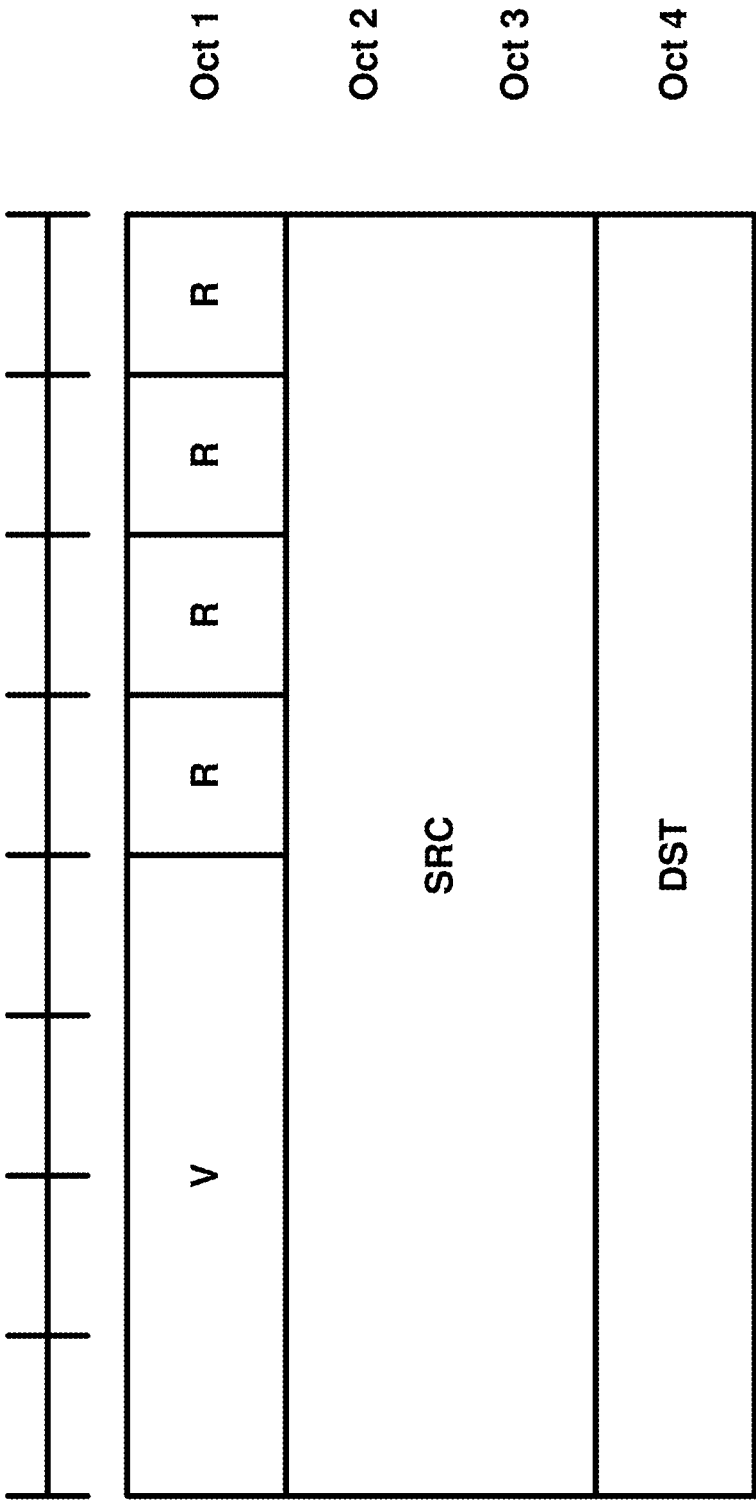
FIG. 23 illustrates an example format of a MAC subheader for sidelink shared channel (SL-SCH) an aspect of an example embodiment of the present disclosure.

FIG. 23 illustrates an example format of a MAC sub-header for sidelink shared channel (SL-SCH). The MAC subheader for SL-SCH may comprise seven header fields V/R/R/R/R/SCR/DST. The MAC subheader is octet aligned. For example, the V field may be a MAC protocol date units (PDU) format version number field indicating which version of the SL-SCH subheader is used. For example, the SRC field may carry 16 bits of a Source Layer-2 identifier (ID) field set to a first identifier provided by upper layers. For example, the DST field may carry 8 bits of the Destination Layer-2 ID set to a second identifier provided by upper layers. In an example, if the V field is set to "1"', the second identifier may be a unicast identifier. In an example, if the V field is set to "2", the second identifier may be a groupcast identifier. In an example, if the V field is set to "3", the second identifier may be a broadcast identifier. For example, the R field may indicate reserved bit.

Figure 24:
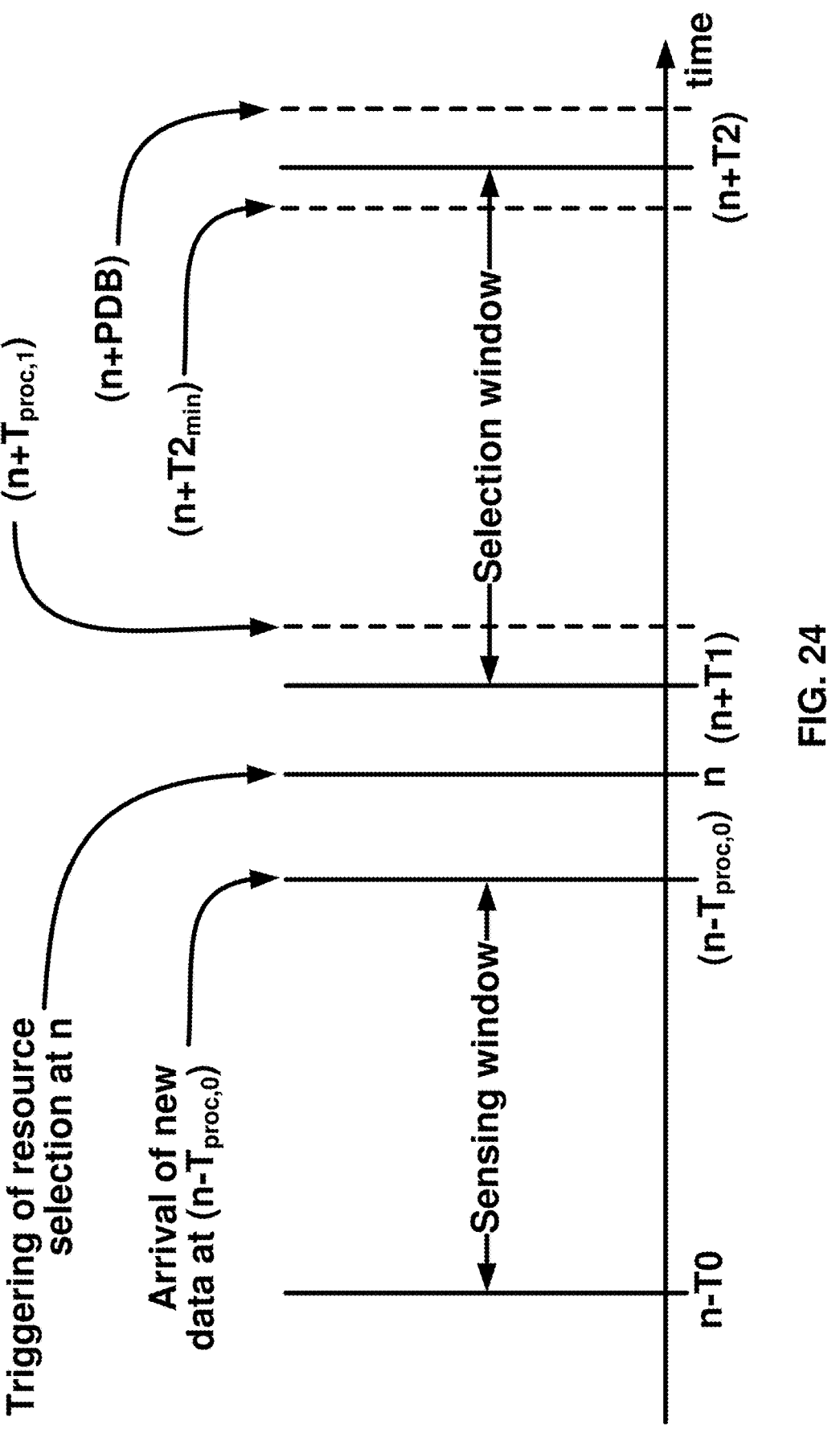
FIG. 24 illustrates an example time of a resource selection procedure as per an aspect of an example embodiment of the present disclosure.

FIG. 24 illustrates an example time of a resource selection procedure. A wireless device may perform the resource selection procedure to select resources for one or more sidelink transmissions. As shown in FIG. 24, a sensing window of the resource selection procedure may start at time (n−T0) (e.g., parameter sl-SensingWindow). The sensing window may end at time (n−T$_{proc,0}$). New data of the one or more sidelink transmissions may arrive at the wireless device at time (n−T$_{proc,0}$). The time period T$_{proc,0}$ may be a processing delay of the wireless device to determine to trigger the resource selection procedure. The wireless device may determine to trigger the resource selection procedure at time n to select the resources for the new data arrived at time (n−T$_{proc,0}$). The wireless device may complete the resource selection procedure at time (n+T1). The wireless device may determine the parameter T1 based on a capability of the wireless device. The capability of the wireless device may be a processing delay of a processor of the wireless device. A selection window of the resource selection procedure may start at time (n+T1). The selection window may end at time (n+T2) indicating the ending of the selection window. The wireless device may determine the parameter T2 based on a parameter T2min (e.g., sl-Selection Window). In an example, the wireless device may determine the parameter T2 subject to T2min≤T2≤PDB, where the PDB (packet delay budget) may be the maximum allowable delay (e.g., a delay budget) for successfully transmitting the new data via the one or more sidelink transmissions. The wireless device may determine the parameter T2min to a corresponding value for a priority of the one or more sidelink transmissions (e.g., based on a parameter SL-Selection WindowConfig indicating a mapping between a sidelink priority sl-Priority and the end of the selection window sl-Selection Window). In an example, the wireless device may set the parameter T2=PDB if the parameter T2min>PDB.

Figure 25:
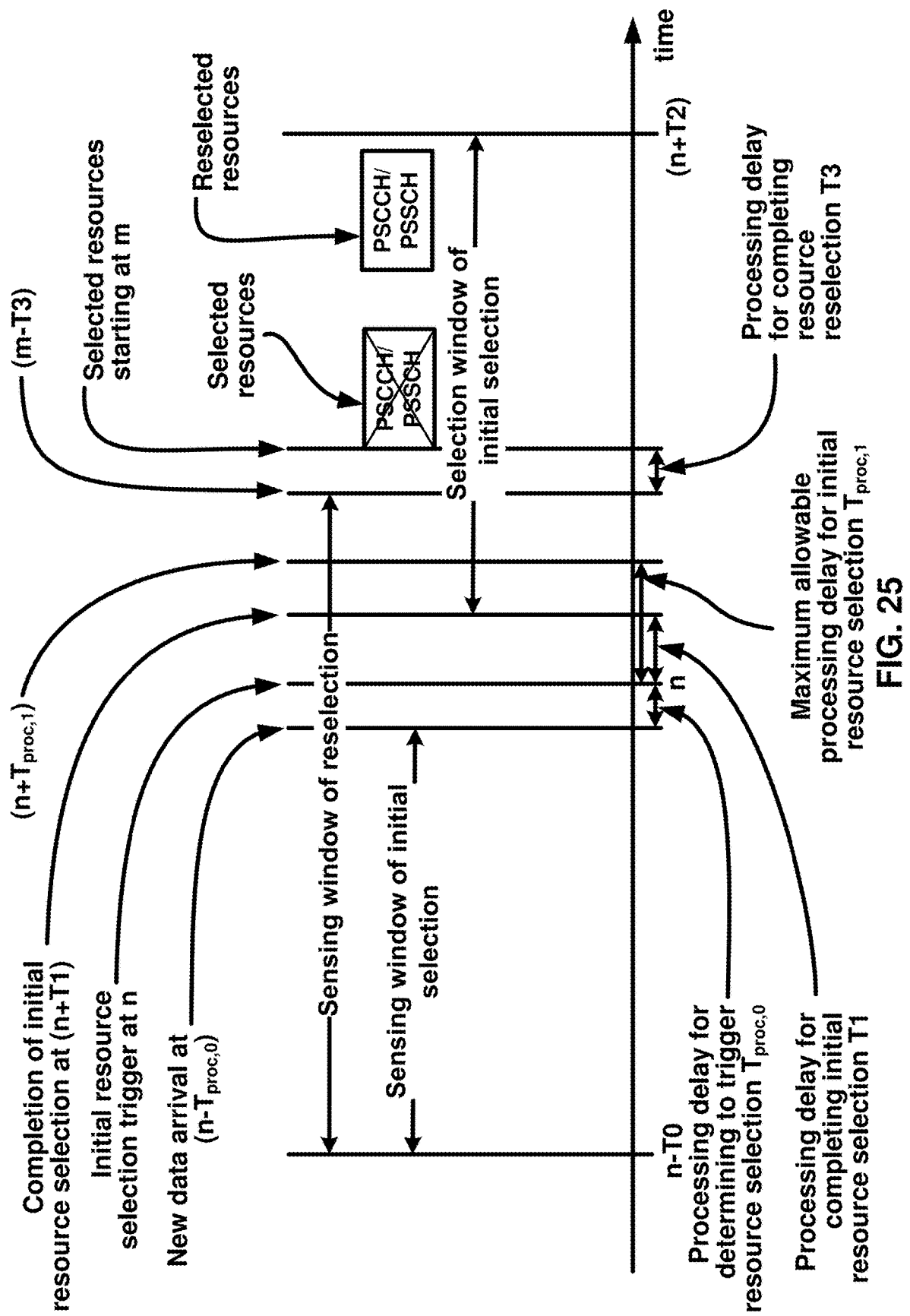
FIG. 25 illustrates an example timing of a resource selection procedure as per an aspect of an example embodiment of the present disclosure.

FIG. 25 illustrates an example timing of a resource selection procedure. A wireless device may perform the resource selection procedure for selecting resources for one or more sidelink transmissions. Referring to FIG. 24, a sensing window of initial selection may start at time (n−T0). The sensing window of initial selection may end at time (n−T$_{proc,0}$). New data of the one or more sidelink transmissions may arrive at the wireless device at the time (n−T$_{proc,0}$). The time period T$_{proc,0}$ may be a processing delay for the wireless device to determine to trigger the initial selection of the resources. The wireless device may determine to trigger the initial selection at time n for selecting the resources for the new data arrived at the time (n−T$_{proc,0}$). The wireless device may complete the resource selection procedure at time (n+T1). The time (n+T$_{proc,1}$) may be the maximum allowable processing latency for completing the resource selection procedure being triggered at the time n, where 0<T1≤T$_{proc,1}$. A selection window of initial selection may start at time (n+T1). The selection window of initial selection may end at time (n+T2). The parameter T2 may be configured, preconfigured, or determined at the wireless device.

The wireless device may determine first resources (e.g., selected resources in FIG. 25) for the one or more sidelink transmissions based on the completion of the resource selection procedure at the time (n+T1). The wireless device may select the first resources from candidate resources in the selection window of initial selection based on measurements in the sensing window for initial selection. The wireless device may determine a resource collision between the first resources and other resources reserved by another wireless device. The wireless device may determine to drop the first resources for avoiding interference. The wireless device may trigger a resource reselection procedure (e.g., a second resource selection procedure) at time (m−T3) and/or before time (m−T3). The time period T3 may be a processing delay for the wireless device to complete the resource reselection procedure (e.g., a second resource selection procedure). The wireless device may determine second resources (e.g., reselected resource in FIG. 25) via the resource reselection procedure (e.g., a second resource selection procedure). The start time of the first resources may be time m (e.g., the first resources may be in slot m).

In an example, at least one of time parameters T0, T$_{proc,0}$, T$_{proc,1}$, T2, and PDB may be configured by a base station to the wireless device. In an example, the at least one of the time parameters T0, T$_{proc,0}$, T$_{proc,1}$, T2, and PDB may be preconfigured to the wireless device. The at least one of the time parameters T0, T$_{proc,0}$, T$_{proc,1}$, T2, and PDB may be stored in a memory of the wireless device. In an example, the memory may be a Subscriber Identity Module (SIM) card. In an example of FIGS. 24 and 25, the time n, m, T0, T1, T$_{proc,0}$, T$_{proc,1}$, T2, T2min, T3, and PDB may be in terms of slots and/or slot index.

Figure 26:
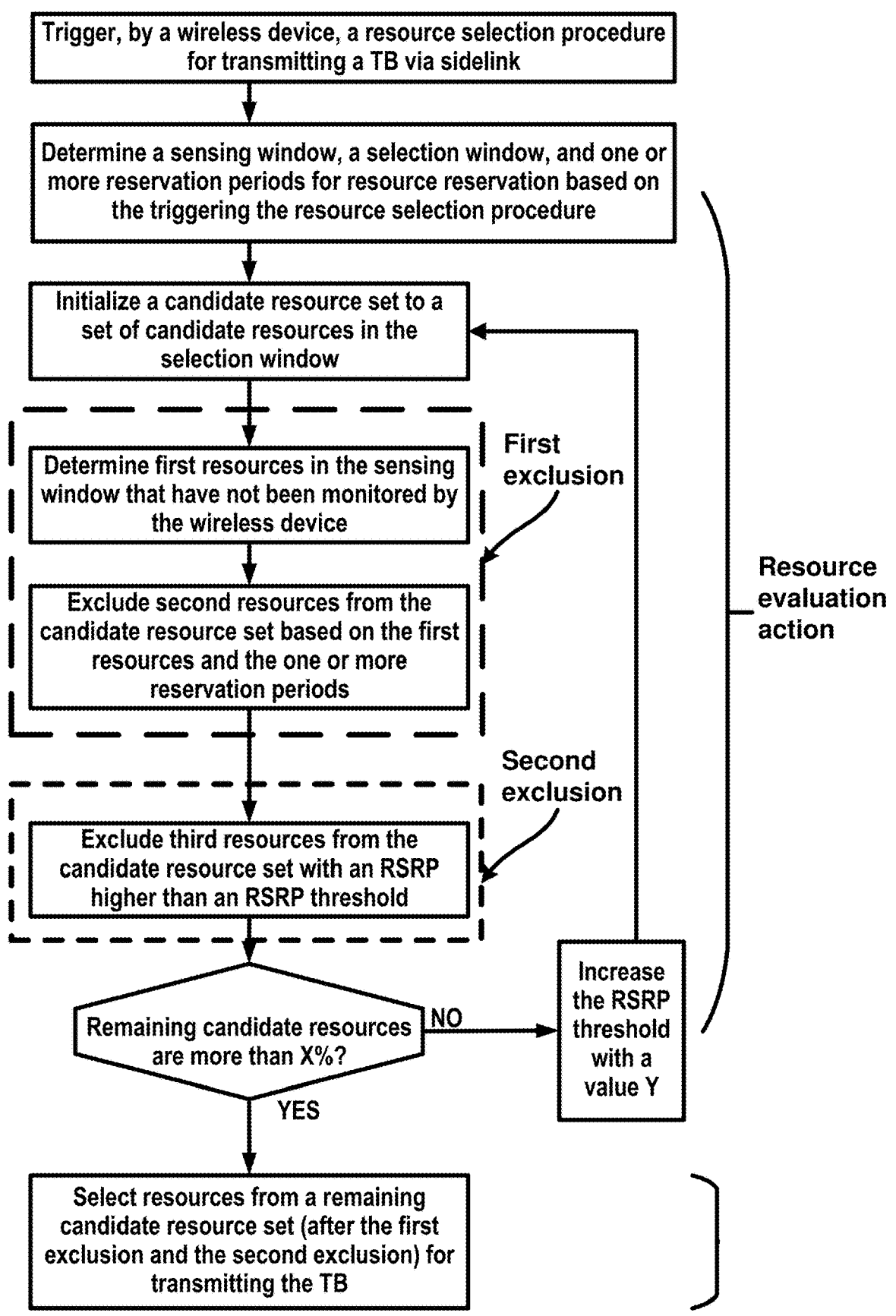
FIG. 26 illustrates an example flowchart of a resource selection procedure by a wireless device for transmitting a TB via sidelink as per an aspect of an example embodiment of the present disclosure.

FIG. 26 illustrates an example flowchart of a resource selection procedure by a wireless device for transmitting a TB (e.g., a data packet) via sidelink.

Figure 27:
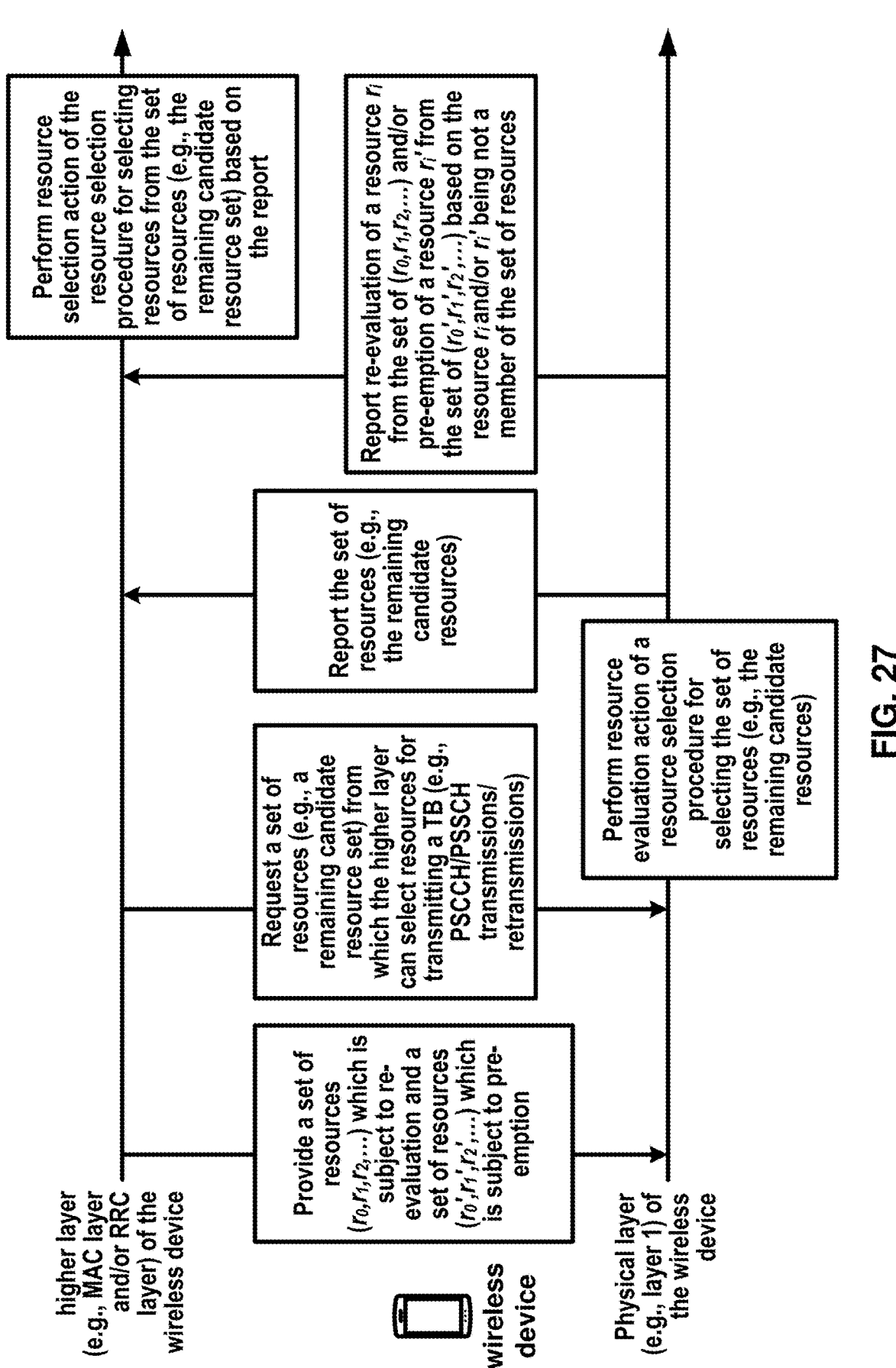
FIG. 27 illustrates an example diagram of the resource selection procedure among layers of the wireless device as per an aspect of an example embodiment of the present disclosure.

FIG. 27 illustrates an example diagram of the resource selection procedure among layers of the wireless device.

Referring to FIGS. 26 and 27, the wireless device may transmit one or more sidelink transmissions (e.g., a first transmission of the TB and one or more retransmissions of the TB) for the transmitting of the TB. Referring to FIG. 19, a sidelink transmission of the one or more sidelink transmission may comprise a PSCCH. The sidelink transmission may comprise a PSSCH. The sidelink transmission may comprise a PSFCH. The wireless device may trigger the resource selection procedure for the transmitting of the TB. The resource selection procedure may comprise two actions. The first action of the two actions may be a resource evaluation action. Physical layer (e.g., layer 1) of the wireless device may perform the first action. The physical layer may determine a subset of resources based on the first action and report the subset of resources to higher layer (e.g., RRC layer and/or MAC layer) of the wireless device. The second action of the two actions may be a resource selection action. The higher layer (e.g., RRC layer and/or MAC layer) of the wireless device may perform the second action based on the reported the subset of resources from the physical layer.

In an example, higher layer (e.g., RRC layer and/or MAC layer) of a wireless device may trigger a resource selection procedure for requesting the wireless device to determine a subset of resources. The higher layer may select resources from the subset of resources for PSSCH and/or PSCCH transmission. To trigger the resource selection procedure, e.g., in slot n, the higher layer may provide the following parameters for the PSSCH and/or PSCCH transmission:

a resource pool, from which the wireless device may determine the subset of resources;

layer 1 priority, prio$_{Tx}$ (e.g., si-Priority referring to FIG. 21 and FIG. 22), of the PSSCH/PSCCH transmission;

remaining packet delay budget (PDB) of the PSSCH and/or PSCCH transmission;

a number of sub-channels, L$_{subcH}$, for the PSSCH and/or PSCCH transmission in a slot;

a resource reservation period/interval, P$_{rsvp\_TX}$, in units of millisecond (ms).

In an example, if the higher layer requests the wireless device to determine a subset of resources from which the higher layer will select the resources for the PSSCH and/or PSCCH transmission for re-evaluation and/or pre-emption, the higher layer may provide a set of resources ($r_0$, $r_1$, $r_2$, . . . ) which may be subject to the re-evaluation and a set of resources ($r_0$, $r_1$, $r_2$, . . . ) which may be subject to the pre-emption.

In an example, a base station (e.g., network) may transmit a message comprising one or more parameters to the wireless device for performing the resource selection procedure. The message may be an RRC/SIB message, a MAC CE, and/or a DCI. In an example, a second wireless device may transmit a message comprising one or more parameters to the wireless device for performing the resource selection procedure. The message may be an RRC message, a MAC CE, and/or a SCI. The one or more parameters may indicate following information.

sl-SelectionWindowList (e.g., sl-Selection Window referring to FIG. 21 and FIG. 22): an internal parameter T2min (e.g., T2min referring to FIG. 24) may be set to a corresponding value from the parameter sl-Selection-WindowList for a given value of $prio_{TX}$ (e.g., based on SL-SelectionWindowConfig referring to FIG. 21 and FIG. 22).

sl-ThresPSSCH-RSRP-List (e.g., sl-ThresPSSCH-RSRP-List referring to FIG. 21 and FIG. 22): a parameter may indicate an RSRP threshold for each combination ($p_i$, $p_j$), where $p_i$ is a value of a priority field in a received SCI format 1-A and $p_j$ is a priority of a sidelink transmission (e.g., the PSSCH/PSCCH transmission) of the wireless device; In an example of the resource selection procedure, an invocation of $p_j$ may be $p_j=prio_{TX}$.

sl-RS-ForSensing (e.g., sl-RS-ForSensing referring to FIG. 21 and FIG. 22): a parameter may indicate whether DMRS of a PSCCH or a PSSCH is used, by the wireless device, for layer 1 (e.g., physical layer) RSRP measurement in sensing operation.

sl-ResourceReservePeriodList (e.g., sl-ResourceReserve-PeriodList referring to FIG. 21 and FIG. 22)

sl-Sensing Window (e.g., sl-Sensing Window referring to FIG. 21 and FIG. 22): an internal parameter $T_0$ may be defined as a number of slots corresponding to t0_Sensing Window ms.

sl-TxPercentageList (e.g., based on SL-TxPercentageConfig referring to FIG. 21 and FIG. 22): an internal parameter X (e.g., sl-TxPercentage referring to FIG. 21 and FIG. 22) for a given $prio_{TX}$ (e.g., sl-Priority referring to FIG. 21 and FIG. 22) may be defined as sl-xPercentage($prio_{TX}$) converted from percentage to ratio.

sl-PreemptionEnable (e.g., p_preemption referring to FIG. 21 and FIG. 22): an internal parameter $prio_{pre}$ may be set to a higher layer provided parameter sl-PreemptionEnable.

The resource reservation period/interval, $P_{rsvp\_TX}$, if provided, may be converted from units of ms to units of logical slots, resulting in $P'_{rsvp\_TX}$.

Notation: ($t_0^{SL}$, $t_1^{SL}$, $t_2^{SL}$, . . . ) may denote a set of slots of a sidelink resource pool.

In the resource evaluation action (e.g., the first action in FIG. 26), the wireless device may determine a sensing window (e.g., the sensing window shown in FIGS. 24 and 25 based on sl-SensingWindow) based on the triggering the resource selection procedure. The wireless device may determine a selection window (e.g., the selection window shown in FIGS. 24 and 25 based on sl-Selection WindowList) based on the triggering the resource selection procedure. The wireless device may determine one or more reservation periods/intervals (e.g., parameter sl-ResourceReservePeriodList) for resource reservation. In an example, a candidate single-slot resource for transmission $R_{x,y}$ may be defined as a set of $L_{subCH}$ contiguous sub-channels with sub-channel x+j in slot $t_y^{SL}$ where j=0, . . . , $L_{subCH}-1$. The wireless device may assume that a set of $L_{subCH}$ contiguous sub-channels in the resource pool within a time interval [n+$T_1$, n+$T_2$] correspond to one candidate single-slot resource (e.g., referring to FIG. 24 and FIG. 25). A total number of candidate single-slot resources may be denoted by $M_{total}$. In an example, referring to FIGS. 24 and 25, the sensing window may be defined by a number of slots in a time duration of [n–$T_0$, n–$T_{proc,0}$). The wireless device may monitor a first subset of the slots, of a sidelink resource pool, within the sensing window. The wireless device may not monitor a second subset of the slots than the first subset of the slots due to half duplex. The wireless device may perform the following actions based on PSCCH decoded and RSRP measured in the first subset of the slots. In an example, an internal parameter Th($p_i$, $p_j$) may be set to the corresponding value of RSRP threshold indicated by the i-th field in sl-ThresPSSCH-RSRP-List, where i=$p_i$+($p_j$–1)*8.

Referring to FIGS. 26 and 27, in the resource evaluation action (e.g., the first action in FIG. 26), the wireless device may initialize a candidate resource set (e.g., a set $S_A$) to be a set of candidate resources. In an example, the candidate resource set may be the union of candidate resources within the selection window. In an example, a candidate resource may be a candidate single-subframe resource. In an example, a candidate resource may be a candidate single-slot resource. In an example, the set $S_A$ may be initialized to a set of all candidate single-slot resources.

Referring to FIGS. 26 and 27, in the resource evaluation action (e.g., the first action in FIG. 26), the wireless device may perform a first exclusion for excluding second resources from the candidate resource set based on first resources and one or more reservation periods/intervals. In an example, the wireless device may not monitor the first resources within a sensing window. In an example, the one or more reservation periods/intervals may be configured/associated with a resource pool of the second resources. In an example, the wireless device may determine the second resources within a selection window which might be reserved by a transmission transmitted via the first resources based on the one or more reservation periods/intervals. In an example, the wireless device may exclude a candidate single-slot resource $R_{x,y}$ from the set $S_A$ based on following conditions:

the wireless device has not monitored slot $t_m^{SL}$ in the sensing window.

for any periodicity value allowed by the parameter sl-ResourceReservePeriodList and a hypothetical SCI format 1-A received in the slot $t_m^{SL}$ with "Resource reservation period" field set to that periodicity value and indicating all sub-channels of the resource pool in this slot, condition c of a second exclusion would be met.

Referring to FIGS. 26 and 27, in the resource evaluation action (e.g., the first action in FIG. 26), the wireless device may perform a second exclusion for excluding third resources from the candidate resource set. In an example, a SCI may indicate a resource reservation of the third resources. The SCI may further indicate a priority value (e.g., indicated by a higher layer parameter sl-Priority). The wireless device may exclude the third resources from the candidate resource set based on a reference signal received power (RSRP) of the third resources being higher than an RSRP threshold (e.g., indicated by a higher layer parameter sl-ThresPSSCH-RSRP-List). The RSRP threshold may be related to the priority value based on a mapping list of RSRP thresholds to priority values configured and/or pre-configured to the wireless device. In an example, a base station may transmit a message to the wireless device for configuring the mapping list. The message may be a radio resource control (RRC) message. In an example, the mapping list may be pre-configured to the wireless device. A memory of the wireless device may store the mapping list. In an example, a priority indicated by the priority value may be a layer 1 priority (e.g., physical layer priority). In an example, a bigger priority value may indicate a higher priority of a sidelink transmission. A smaller priority value may indicate a lower priority of the sidelink transmission. In another example, a bigger priority value may indicate a lower priority of a sidelink transmission. A smaller priority value may indicate a higher priority of the sidelink transmission. In an example, the wireless device may exclude a candidate single-slot resource $R_{x,y}$ from the set $S_A$ based on following conditions:

a) the wireless device receives an SCI format 1-A in slot $t_m^{SL}$, and "Resource reservation period" field, if present, and "Priority" field in the received SCI format 1-A indicate the values $P_{rsvp\_RX}$ and $prio_{RX}$;

b) the RSRP measurement performed, for the received SCI format 1-A, is higher than $Th(prio_{RX}, prio_{TX})$;

c) the SCI format received in slot $t_m^{SL}$ or the same SCI format which, if and only if the "Resource reservation period" field is present in the received SCI format 1-A, is assumed to be received in slot(s) $t_{m+q\times P'_{rsvp\_RX}}^{SL}$ determines the set of resource blocks and slots which overlaps with $R_{x,y+j\times P'_{rsvp\_TX}}$ for q=1, 2, . . . , Q and j=0, 1, . . . , $C_{resel}$−1. Here, $P'_{rsvp\_RX}$ is $P_{rsvp\_RX}$ converted to units of logical slots, $$Q = \left\lceil \frac{T_{scal}}{P_{rsvp\_RX}} \right\rceil \text{ if } P_{rsvp\_RX} < T_{scal}$$

and n'−m≤$P'_{rsvp\_RX}$, where $t_n^{SL}$=n if slot n belongs to the set $(t_0^{SL}, t_1^{SL}, . . . , t_{T_{max}}^{SL})$, otherwise slot $t_n^{SL}$ is the first slot after slot n belonging to the set $(t_0^{SL}, t_1^{SL}, . . . , t_{T_{max}}^{SL})$; otherwise Q=1. $T_{scal}$ is set to selection window size T2 converted to units of ms.

Referring to FIGS. 26 and 27, in the resource evaluation action (e.g., the first action in FIG. 26), the wireless device may determine whether remaining candidate resources in the candidate resource set are sufficient for selecting resources for the one or more sidelink transmissions of the TB based on a condition, after performing the first exclusion and the second exclusion. In an example, the condition may be the total amount of the remaining candidate resources in the candidate resource set being more than X percent (e.g., indicated by a higher layer parameter sl-TxPercentageList) of the candidate resources in the candidate resource set before performing the first exclusion and the second exclusion. If the condition is not met, the wireless device may increase the RSRP threshold used to exclude the third resources with a value Y and iteratively re-perform the initialization, first exclusion, and second exclusion until the condition being met. In an example, if the number of remaining candidate single-slot resources in the set $S_A$ is smaller than X·$M_{total}$, then $Th(p_i, p_j)$ may be increased by 3 dB and the procedure continues with re-performing of the initialization, first exclusion, and second exclusion until the condition being met. In an example, the wireless device may report the set $S_A$ (e.g., the remaining candidate resources of the candidate resource set) to the higher layer of the wireless device. In an example, the wireless device may report the set $S_A$ (e.g., the remaining candidate resources of the candidate resource set when the condition is met) to the higher layer of the wireless device, based on that the number of remaining candidate single-slot resources in the set $S_A$ being greater than or equal to X·$M_{total}$.

Referring to FIGS. 26 and 27, in the resource selection action (e.g., the second action in FIG. 26), the wireless device (e.g., the higher layer of the wireless device) may select fourth resources from the remaining candidate resources of the candidate resource set (e.g., the set $S_A$ reported by the physical layer) for the one or more sidelink transmissions of the TB. In an example, the wireless device may randomly select the fourth resources from the remaining candidate resources of the candidate resource set.

Referring to FIGS. 26 and 27, in an example, if a resource $r_i$ from the set $(r_0, r_1, r_2, . . . )$ is not a member of $S_A$ (e.g., the remaining candidate resources of the candidate resource set when the condition is met), the wireless device may report re-evaluation of the resource $r_i$ to the higher layers.

Referring to FIGS. 26 and 27, in an example, if a resource $r_i'$ from the set $(r_0', r_1', r_2', . . . )$ meets the conditions below, then the wireless device may report pre-emption of the resource $r_i'$ to the higher layers.

$r_i'$ is not a member of $S_A$, and $r_i'$ meets the conditions for the second exclusion, with $Th(prio_{RX}, prio_{TX})$ set to a final threshold for reaching X·$M_{total}$, and the associated priority $prio_{RX}$, satisfies one of the following conditions:

sl-PreemptionEnable is provided and is equal to 'enabled' and $prio_{TX}$>$prio_{RX}$ sl-PreemptionEnable is provided and is not equal to 'enabled', and $prio_{RX}$<$prio_{pre}$ and $prio_{TX}$>$prio_{RX}$ In an example, if the resource $r_i$ is indicated for re-evaluation by the wireless device (e.g., the physical layer of the wireless device), the higher layer of the wireless device may remove the resource $r_i$ from the set $(r_0, r_1, r_2, . . . )$. In an example, if the resource $r_i'$ is indicated for pre-emption by the wireless device (e.g., the physical layer of the wireless device), the higher layer of the wireless device may remove the resource $r_i'$ from the set $(r_0', r_1', r_2', . . . )$. The higher layer of the wireless device may randomly select new time and frequency resources from the remaining candidate resources of the candidate resource set (e.g., the set $S_A$ reported by the physical layer) for the removed resources $r_i$ and/or $r_i'$. The higher layer of the wireless device may replace the removed resources $r_i$ and/or $r_i'$ by the new time and frequency resources. For example, the wireless device may remove the resources $r_i$ and/or $r_i'$ from the set $(r_0, r_1, r_2, . . . )$ and/or the set $(r_0', r_1', r_2', . . . )$ and add the new time and frequency resources to the set $(r_0, r_1, r_2, . . . )$ and/or the set $(r_0', r_1', r_2', . . . )$ based on the removing of the resources $r_i$ and/or $r_i'$.

Sidelink pre-emption may happen between a first wireless device and a second wireless device. The first wireless device may select first resources for a first sidelink transmission. The first sidelink transmission may have a first priority. The second wireless device may select second resources for a second sidelink transmission. The second sidelink transmission may have a second priority. The first resources may partially and/or fully overlap with the second resources. The first wireless device may determine a resource collision between the first resources and the second resources based on that the first resources and the second resources being partially and/or fully overlapped. The resource collision may imply fully and/or partially overlapping between the first resources and the second resources in time, frequency, code, power, and/or spatial domain. Referring to an example of FIG. 18, the first resources may comprise one or more first sidelink resource units in a sidelink resource pool. The second resources may comprise one or more second sidelink resource units in the sidelink resource pool. A partial resource collision between the first resources and the second resources may indicate that the at least one sidelink resource unit of the one or more first sidelink resource units belongs to the one or more second sidelink resource units. A full resource collision between the first resources and the second resources may indicate that the one or more first sidelink resource units may be the same as or a subset of the one or more second sidelink resource units. In an example, a bigger priority value m ay indicate a lower priority of a sidelink transmission. A smaller priority value may indicate a higher priority of the sidelink transmission. In an example, the first wireless device may determine the sidelink pre-emption based on the resource collision and the second priority being higher than the first priority. That is, the first wireless device may determine the sidelink pre-emption based on the resource collision and a value of the second priority being smaller than a value of the first priority. In another example, the first wireless device may determine the sidelink pre-emption based on the resource collision, the value of the second priority being smaller than a priority threshold, and the value of the second priority being smaller than the value of the first priority.

Referring to FIG. 25, a first wireless device may trigger a first resource selection procedure for selecting first resources (e.g., selected resources after resource selection with collision in FIG. 25) for a first sidelink transmission. A second wireless device may transmit an SCI indicating resource reservation of the first resource for a second sidelink transmission. The first wireless device may determine a resource collision on the first resources between the first sidelink transmission and the second sidelink transmission. The first wireless device may trigger a resource re-evaluation (e.g., a resource evaluation action of a second resource selection procedure) at and/or before time (m−T3) based on the resource collision. The first wireless device may trigger a resource reselection (e.g., a resource selection action of the second resource selection procedure) for selecting second resources (e.g., reselected resources after resource reselection in FIG. 25) based on the resource re-evaluation. The start time of the second resources may be time m.

A UE may receive one or more messages (e.g., RRC messages and/or SIB messages) comprising configuration parameters of a sidelink BWP. The configuration parameters may comprise a first parameter (e.g., sl-StartSymbol) indicating a sidelink starting symbol. The first parameter may indicate a starting symbol (e.g., symbol #0, symbol #1, symbol #2, symbol #3, symbol #4, symbol #5, symbol #6, symbol #7, etc.) used for sidelink in a slot. For example, the slot may not comprise a SL-SSB (S-SSB). In an example, the UE may be (pre-)configured with one or more values of the sidelink starting symbol per sidelink BWP. The configuration parameters may comprise a second parameter (e.g., sl-LengthSymbols) indicating number of symbols (e.g., 7 symbols, 8 symbols, 9 symbols, 10 symbols, 11 symbols, 12 symbols, 13 symbols, 14 symbols, etc.) used sidelink in a slot. For example, the slot may not comprise a SL-SSB (S-SSB). In an example, the UE may be (pre-)configured with one or more values of the sidelink number of symbols (symbol length) per sidelink BWP.

The configuration parameters of the sidelink BWP may indicate one or more sidelink (communication) resource pools of the sidelink BWP (e.g., via SL-BWP-PoolConfig and/or SL-BWP-PoolConfigCommon). A resource pool may be a sidelink receiving resource pool (e.g., indicated by sl-RxPool) on the configured sidelink BWP. For example, the receiving resource pool may be used for PSFCH transmission/reception, if configured. A resource pool may be a sidelink transmission resource pool (e.g., indicated by sl-TxPool, and/or sl-ResourcePool) on the configured sidelink BWP. For example, the transmission resource pool may comprise resources by which the UE is allowed to tranmsit NR sidelink communication (e.g., in exceptional conditions and/or based on network scheduling) on the configured BWP. For example, the transmission resource pool may be used for PSFCH transmission/reception, if configured.

Configuration parameters of a resource pool may indicate a size of a sub-channel of the resource pool (e.g., via sl-SubchannelSize) in unit of PRB. For example, the sub-channel size may indicate a minimum granularity in frequency domain for sensing and/or for PSSCH resource selection. Configuration parameters of a resource pool may indicate a lowest/starting RB index of a sub-channel with a lowest index in the resource pool with respect to lowest RB index RB index of the sidelink BWP (e.g., via sl-StartRB-Subchannel). Configuration parameters of a resource pool may indicate a number of sub-channels in the corresponding resource pool (e.g., via sl-NumSubchannel). For example, the sub-channels and/or the resource pool may consist of contiguous PRBs.

Configuration parameters of a resource pool may indicate configuration of one or more sidelink channels on/in the resource pool. For example, the configuration parameters may indicate that the resource pool is configured with PSSCH and/or PSCCH and/or PSFCH.

Configuration parameters of PSCCH may indicate a time resource for a PSCCH transmission in a slot. Configuration parameters of PSCCH (e.g., SL-PSCCH-Config) may indicate a number of symbols of PSCCH (e.g., 2 or 3) in the resource pool (e.g., via sl-TimeResourcePSCCH). Configuration parameters of PSCCH (e.g., SL-PSCCH-Config) may indicate a frequency resource for a PSCCH transmission in a corresponding resource pool (e.g., via sl-FreqResourcePSCCH). For example, the configuration parameters may indicate a number of PRBs for PSCCH in a resource pool, which may not be greater than a number of PRBs of a sub-channel of the resource pool (sub-channel size).

Configuration parameters of PSSCH may indicate one or more DMRS time domain patterns (e.g., PSSCH DMRS symbols in a slot) for the PSSCH that may be used in the resource pool.

A resource pool may or may not be configured with PSFCH. Configuration parameters of PSFCH may indicate a period for the PSFCH in unit/number of slots within the resource pool (e.g., via sl-PSFCH-Period). For example, a value 0 of the period may indicate that no resource for PSFCH is configured in the resource pool and/or HARQ feedback for (all) transmissions in the resource pool is disabled. For example, the period may be 1 slot or 2 slots or 4 slots, etc. Configuration parameters of PSFCH may indicate a set of PRBs that are (actually) used for PSFCH transmission and reception (e.g., via sl-PSFCH-RB-Set). For example, a bitmap may indicate the set of PRBs, wherein a leftmost bit of the bitmap may refer to a lowest RB index in the resource pool, and so on. Configuration parameters of PSFCH may indicate a minimum time gap between PSFCH and the associated PSSCH in unit of slots (e.g., via sl-MinTimeGapPSFCH). Configuration parameters of PSFCH may indicate a number of PSFCH resources available for multiplexing HARQ-ACK information in a PSFCH transmission (e.g., via sl-PSFCH-CandidateResourceType).

A UE may be configured by higher layers (e.g., by RRC configuration parameters) with one or more sidelink resource pools. A sidelink resource pool may be for transmission of PSSCH and/or for reception of PSSCH. A sidelink resource pool may be associated with sidelink resource allocation mode 1 and/or sidelink resource allocation mode 2. In the frequency domain, a sidelink resource pool consists of one or more (e.g., sl-NumSubchannel) contiguous sub-channels. A sub-channel consists of one or more (e.g., sl-SubchannelSize) contiguous PRBs. For example, higher layer parameters (e.g., RRC configuration parameters) may indicate a number of sub-channels in a sidelink resource pool (e.g., sl-NumSubchannel) and/or a number of PRBs per sub-channel (e.g., sl-SubchannelSize).

A set of slots that may belong to a sidelink resource pool. The set of slots may be denoted by $(t_0^{SL}, t_1^{SL}, \ldots, t_{T_{max}-1}^{SL})$ where $0 \le t_i^{SL} < 10240 \times 2^\mu$, $0 \le i < T_{max}$. The slot index may be relative to slot #0 of the radio frame corresponding to SFN 0 of the serving cell or DFN 0. The set includes all the slots except $N_{S\_SSB}$ slots in which S-SS/PSBCH block (S-SSB) is configured. The set includes all the slots except $N_{nonSL}$ slots in each of which at least one of Y-th, (Y+1)-th, . . . , (Y+X−1)-th OFDM symbols are not semi-statically configured as UL as per the higher layer parameter (e.g., tdd-UL-DL-ConfigurationCommon-r16 of the serving cell if provided and/or sl-TDD-Configuration-r16 if provided and/or sl-TDD-Config-r16 of the received PSBCH if provided). For example, a higher layer (e.g., MAC or RRC) parameter may indicate a value of Y as the sidelink starting symbol of a slot (e.g., sl-StartSymbol). For example, a higher layer (e.g., MAC or RRC) parameter may indicate a value of X as the number of sidelink symbols in a slot (e.g., sl-LengthSymbols). The set includes all the slots except one or more reserved slots. The slots in the set may be arranged in increasing order of slot index. The UE may determine the set of slot assigned to a sidelink resource pool based on a bitmap $(b_0, b_1, \ldots, b_{L_{bitmap}-1})$ associated with the resource pool where $L_{bitmap}$ the length of the bitmap is configured by higher layers. A slot $t_k^{SL}$ ($0 \le k < 10240 \times 2^\mu - N_{S\_SSB} - N_{nonSL} - N_{reserved}$) may belong to the set of slots if $b_{k'}=1$ where k'=k mod $L_{bitmap}$. The slots in the set are re-indexed such that the subscripts i of the remaining slots $t_i'^{SL}$ are successive {0, 1, . . . , $T'_{max}-1$} where $T'_{max}$ is the number of the slots remaining in the set.

The UE may determine the set of resource blocks assigned to a sidelink resource pool, wherein the resource pool consists of $N_{PRB}$ PRBs. The sub-channel m for m=0, 1, . . . , numSubchannel−1 consists of a set of $n_{subCHsize}$ contiguous resource blocks with the physical resource block number $n_{PRB}=n_{subCHRBstart}+m \cdot n_{subCHsize}+j$ for j=0,1, . . . , $n_{subCHsize}-1$, where $n_{subCHRBstart}$ and $n_{subCHsize}$ are given by higher layer parameters sl-StartRB-Subchannel and sl-SubchannelSize, respectively. A UE may not be expected to use the last $N_{PRB}$ mod $n_{subCHsize}$ PRBs in the resource pool.

A UE may be provided/configured with a number of symbols in a resource pool for PSCCH (e.g., by sl-TimeResourcePSCCH). The PSCCH symbols may start from a second symbol that is available for sidelink transmissions in a slot. The UE may be provided/configured with a number of PRBs in the resource pool for PSCCH (e.g., by sl-FreqResourcePSCCH). The PSCCH PRBs may start from the lowest PRB of the lowest sub-channel of the associated PSSCH, e.g., for a PSCCH transmission with a SCI format 1-A. In an example, PSCCH resource/symbols may be configured in every slot of the resource pool. In an example, PSCCH resource/symbols may be configured in a subset of slot of the resource pool (e.g., based on a period comprising two or more slots).

In an example, each PSSCH transmission is associated with an PSCCH transmission. The PSCCH transmission may carry the $1^{st}$ stage of the SCI associated with the PSSCH transmission. The $2^{nd}$ stage of the associated SCI may be carried within the resource of the PSSCH. In an example, the UE transmits a first SCI (e.g., $1^{st}$ stage SCI, SCI format 1-A) on PSCCH according to a PSCCH resource configuration in slot n and PSCCH resource m. For the associated PSSCH transmission in the same slot, the UE may transmit one transport block (TB) with up to two layers (e.g., one layer or two layers). The number of layers (v) may be determined according to the 'Number of DMRS port' field in the SCI. The UE may determine the set of consecutive symbols within the slot for transmission of the PSSCH. The UE may determine the set of contiguous resource blocks for transmission of the PSSCH. Transform precoding may not be supported for PSSCH transmission. For example, wideband precoding may be supported for PSSCH transmission.

The UE may set the contents of the second SCI (e.g., $2^{nd}$ stage SCI, SCI format 2-A). The UE may set values of the SCI fields comprising the 'HARQ process number' field, the 'NDI' field, the 'Source ID' field, the 'Destination D' field, the 'HARQ feedback enabled/disabled indicator' field, the 'Cast type indicator' field, and/or the 'CSI request' field, as indicated by higher (e.g., MAC and/or RRC) layers. The UE may set the contents of the second SCI (e.g., $2^{nd}$ stage SCI, SCI format 2-B). The UE may set values of the SCI fields comprising the 'HARQ process number' field, the 'NDI' field, the 'Source ID' field, the 'Destination ID' field, the 'HARQ feedback enabled/disabled indicator' field, the 'Zone ID' field, and/or the 'Communication range requirement' field, as indicated by higher (e.g., MAC and/or RRC) layers.

In an example, one transmission scheme may be defined for the PSSCH and may be used for all PSSCH transmissions. PSSCH transmission may be performed with up to two antenna ports, e.g., with antenna ports 1000-1001.

In sidelink resource allocation mode 1, for PSSCH and/or PSCCH transmission, dynamic grant, configured grant type 1 and/or configured grant type 2 may be supported. The configured grant Type 2 sidelink transmission is semi-persistently scheduled by a SL grant in a valid activation DCI.

The UE may transmit the PSSCH in the same slot as the associated PSCCH. The (minimum) resource allocation unit in the time domain may be a slot. The UE may transmit the PSSCH in consecutive symbols within the slot. The UE may not transmit PSSCH in symbols which are not configured for sidelink. A symbol may be configured for sidelink, according to higher layer parameters indicating the starting sidelink symbol (e.g., startSLsymbols) and a number of consecutive sidelink symbols (e.g., lengthSLsymbols). For example, startSLsymbols is the symbol index of the first symbol of lengthSLsymbols consecutive symbols configured for sidelink. Within the slot, PSSCH resource allocation may start at symbol startSLsymbols+1 (e.g., second sidelink symbol of the slot). The UE may not transmit PSSCH in symbols which are configured for use by PSFCH, if PSFCH is configured in this slot. The UE may not transmit PSSCH in the last symbol configured for sidelink (e.g., last sidelink symbol of the slot). The UE may not transmit PSSCH in the symbol immediately preceding the symbols which are configured for use by PSFCH, if PSFCH is configured in this slot. FIG. 19 shows an example of sidelink symbols and the PSSCH resource allocation within the slot.

A Sidelink grant may be received dynamically on the PDCCH, and/or configured semi-persistently by RRC, and/or autonomously selected by the MAC entity of the UE. The MAC entity may have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant. The UE may be configured with Sidelink resource allocation mode 1. The UE may for each PDCCH occasion and for each grant received for this PDCCH occasion (e.g., for the SL-RNTI or SLCS-RNTI of the UE), use the sidelink grant to determine PSCCH duration(s) and/or PSSCH duration(s) for initial transmission and/or one or more retransmission of a MAC PDU for a corresponding sidelink process (e.g., associated with a HARQ buffer and/or a HARQ process ID).

The UE may be configured with Sidelink resource allocation mode 2 to transmit using pool(s) of resources in a carrier, based on sensing or random selection. The MAC entity for each Sidelink process may select to create a selected sidelink grant corresponding to transmissions of multiple MAC PDUs, and SL data may be available in a logical channel. The UE may select a resource pool, e.g., based on a parameter enabling/disabling sidelink HARQ feedback. The UE may perform the TX resource (re-) selection check on the selected pool of resources. The UE may select the time and frequency resources for one transmission opportunity from the resources pool and/or from the resources indicated by the physical layer, according to the amount of selected frequency resources and the remaining PDB of SL data available in the logical channel(s) allowed on the carrier. The UE may use the selected resource to select a set of periodic resources spaced by the resource reservation interval for transmissions of PSCCH and PSSCH corresponding to the number of transmission opportunities of MAC PDUs. The UE may consider the first set of transmission opportunities as the initial transmission opportunities and the other set(s) of transmission opportunities as the retransmission opportunities. The UE may consider the sets of initial transmission opportunities and retransmission opportunities as the selected sidelink grant. The UE may consider the set as the selected sidelink grant. The UE may use the selected sidelink grant to determine the set of PSCCH durations and the set of PSSCH durations.

The UE may for each PSSCH duration and/or for each sidelink grant occurring in this PSSCH duration, select a MCS table allowed in the pool of resource which is associated with the sidelink grant. The UE may determine/set the resource reservation interval to a selected value (e.g., 0 or more). In an example, if the configured sidelink grant has been activated and this PSSCH duration corresponds to the first PSSCH transmission opportunity within this period of the configured sidelink grant, the UE may set the HARQ Process ID to the HARQ Process ID associated with this PSSCH duration and, if available, all subsequent PSSCH duration(s) occurring in this period for the configured sidelink grant. The UE may flush the HARQ buffer of Sidelink process associated with the HARQ Process ID. The UE may deliver the sidelink grant, the selected MCS, and the associated HARQ information to the Sidelink HARQ Entity for this PSSCH duration.

The MAC entity may include at most one Sidelink HARQ entity for transmission on SL-SCH, which maintains a number of parallel Sidelink processes. The (maximum) number of transmitting Sidelink processes associated with the Sidelink HARQ Entity may be a value (e.g., 16). A sidelink process may be configured for transmissions of multiple MAC PDUs. For transmissions of multiple MAC PDUs with Sidelink resource allocation mode 2, the (maximum) number of transmitting Sidelink processes associated with the Sidelink HARQ Entity may be a second value (e.g., 4). A delivered sidelink grant and its associated Sidelink transmission information may be associated with a Sidelink process. Each Sidelink process may support one TB.

For each sidelink grant and for the associated Sidelink process, the Sidelink HARQ Entity may obtain the MAC PDU to transmit from the Multiplexing and assembly entity, if any. The UE may determine Sidelink transmission information of the TB for the source and destination pair of the MAC PDU. The UE may set the Source Layer-1 ID to the 8 LSB of the Source Layer-2 ID of the MAC PDU, and set the Destination Layer-1 ID to the 16 LSB of the Destination Layer-2 ID of the MAC PDU. The UE may set the following information of the TB: cast type indicator, HARQ feedback enabler/disabler, priority, NDI, RV. The UE may deliver the MAC PDU, the sidelink grant and the Sidelink transmission information of the TB to the associated Sidelink process. The MAC entity of the UE may instruct the associated Sidelink process to trigger a new transmission or a retransmission.

In sidelink resource allocation mode 1, for sidelink dynamic grant, the PSSCH transmission may be scheduled by a DCI (e.g., DCI format 3_0). In sidelink resource allocation mode 1, for sidelink configured grant type 2, the configured grant may be activated by a DCI (e.g., DCI format 3_0). In sidelink resource allocation mode 1, for sidelink dynamic grant and sidelink configured grant type 2 the "Time gap" field value m of the DCI may provide an index m+1 into a slot offset table (e.g., the table may be configured by higher layer parameter sl-DCI-ToSL-Trans). The table value at index m+1 may be referred to as slot offset $K_{SL}$. The slot of the first sidelink transmission scheduled by the DCI may be the first SL slot of the corresponding resource pool that starts not earlier than $$T_{DL} - \frac{T_{TA}}{2} + K_{SL} \times T_{s101},$$

where $T_{DL}$ is the starting time of the downlink slot carrying the corresponding DCI, $T_{TA}$ is the timing advance value corresponding to the TAG of the serving cell on which the DCI is received and $K_{SL}$ is the slot offset between the slot of the DCI and the first sidelink transmission scheduled by DCI and $T_{slot}$ is the SL slot duration. The "Configuration index" field of the DCI, if provided and not reserved, may indicate the index of the sidelink configured type 2. In sidelink resource allocation mode 1, for sidelink configured grant type 1, the slot of the first sidelink transmissions may follow the higher layer configuration.

The resource allocation unit in the frequency domain may be the sub-channel. The sub-channel assignment for sidelink transmission may be determined using the "Frequency resource assignment" field in the associated SCI. The lowest sub-channel for sidelink transmission may be the sub-channel on which the lowest PRB of the associated PSCCH is transmitted. For example, if a PSSCH scheduled by a PSCCH would overlap with resources containing the PSCCH, the resources corresponding to a union of the PSCCH that scheduled the PSSCH and associated PSCCH DM-RS may not be available for the PSSCH.

The redundancy version for transmitting a TB may be given by the "Redundancy version" field in the $2^{nd}$ stage SCI (e.g., SCI format 2-A or 2-B). The modulation and coding scheme $I_{MCS}$ may be given by the 'Modulation and coding scheme' field in the $1^{st}$ stage SCI (e.g., SCI format 1-A). The UE may determine the MCS table based on the following: a pre-defined table may be used if no additional MCS table is configured by higher layer parameter sl-MCS-Table; otherwise an MCS table is determined based on the 'MCS table indicator' field in the $1^{st}$ stage SCI (e.g., SCI format 1-A). The UE may use $I_{MCS}$ and the MCS table determined according to the previous step to determine the modulation order ($Q_m$) and Target code rate (R) used in the physical sidelink shared channel.

The UE may determine the TB size (TBS) based on the number of REs ($N_{RE}$) within the slot. The UE may determine the number of REs allocated for PSSCH within a PRB ($N'_{RE}$) by $N'_{RE} = N_{SC}^{RB} (N_{symb}^{sh} - N_{symb}^{PSFCH}) - N_{oh}^{PRB} - N_{RE}^{DMRS}$, where $N_{SC}^{RB} = 12$ is the number of subcarriers in a physical resource block; $N_{symb}^{sh} =$ sl-LengthSymbols-2, where sl-LengthSymbols is the number of sidelink symbols within the slot provided by higher layers; $N_{symb}^{PSFCH} = 3$ if 'PSFCH overhead indication' field of SCI format 1-A indicates "1", and $N_{symb}^{PSFCH} = 0$ otherwise, if higher layer parameter sl-PSFCH-Period is 2 or 4. If higher layer parameter sl-PSFCH-Period is 0, $N_{symb}^{PSFCH} = 0$. If higher layer parameter sl-PSFCH-Period is 1, $N_{symb}^{PSFCH} = 3$. $N_{oh}^{PRB}$ is the overhead given by higher layer parameter sl-X-Overhead. $N_{RE}^{DMRS}$ is given by higher layer parameter s-PSSCH-DMRS-TimePattern. The UE may determine the total number of REs allocated for PSSCH ($N_{RE}$) by $N_{RE} = N'_{RE} \cdot n_{PRB} - N_{RE}^{SCI,1} - N_{RE}^{SCI,2}$ where $n_{PRB}$ is the total number of allocated PRBs for the PSSCH; $N_{RE}^{SCI,1}$ is the total number of REs occupied by the PSCCH and PSCCH DM-RS; $N_{RE}^{SCI,2}$ is the number of coded modulation symbols generated for $2^{nd}$-stage SCI transmission (prior to duplication for the $2^{nd}$ layer, if present). The UE may determine the TBS based on the total number of REs allocated for PSSCH ($N_{RE}$) and/or the modulation order ($Q_m$) and Target code rate (R) used in the physical sidelink shared channel.

For the single codeword q=0 of a PSSCH, the block of bits $b^{(q)}(0), \ldots, b^{(q)}(M_{bit}^{(q)} - 1)$, where $M_{bit}^{(q)} = M_{bit,SCI2}^{(q)} + M_{bit,data}^{(q)}$ is the number of bits in codeword q transmitted on the physical channel, may be scrambled prior to modulation (e.g., using a scrambling sequence based on a CRC of the PSCCH associated with the PSSCH). For the single codeword q=0, the block of scrambled bits may be modulated, resulting in a block of complex-valued modulation symbols $d^{(q)}(0), \ldots, d^{(q)}(M_{symb}^{(q)} - 1)$ where $M_{symb}^{(q)} = M_{symb,1}^{(q)} + M_{symb,2}^{(q)}$. Layer mapping may be done with the number of layers $v \in \{1,2\}$, resulting in $x(i) = [x^{(0)}(i) \ldots x^{(v-1)}(i)]^T$, $i=0,1, \ldots, M_{symb}^{layer} - 1$. The block of vectors $[x^{(0)}(i) \ldots x^{(v-1)}(i)]^T$ may be pre-coded where the precoding matrix W equals the identity matrix and $M_{symb}^{ap} = M_{symb}^{layer}$. For each of the antenna ports used for transmission of the PSSCH, the block of complex-valued symbols $z^{(p)}(0), \ldots, z^{(p)}(M_{symb}^{ap} - 1)$ may be multiplied with the amplitude scaling factor $\beta_{DMRS}^{PSSCH}$ in order to conform to the transmit power and mapped to resource elements $(k',l)_{p,\mu}$ in the virtual resource blocks assigned for transmission, where k'=0 is the first subcarrier in the lowest-numbered virtual resource block assigned for transmission. The mapping operation may be done in two steps: first, the complex-valued symbols corresponding to the bit for the $2^{nd}$-stage SCI in increasing order of first the index k' over the assigned virtual resource blocks and then the index l, starting from the first PSSCH symbol carrying an associated DM-RS, wherein the corresponding resource elements in the corresponding physical resource blocks are not used for transmission of the associated DM-RS, PT-RS, or PSCCH; secondly, the complex-valued modulation symbols not corresponding to the $2^{nd}$-stage SCI shall be in increasing order of first the index k' over the assigned virtual resource blocks, and then the index l with the starting position, wherein the resource elements are not used for $2^{nd}$-stage SCI in the first step; and/or the corresponding resource elements in the corresponding physical resource blocks are not used for transmission of the associated DM-RS, PT-RS, CSI-RS, or PSCCH.

The resource elements used for the PSSCH in the first OFDM symbol in the mapping operation above, including DM-RS, PT-RS, and/or CSI-RS occurring in the first OFDM symbol, may be duplicated in the OFDM symbol immediately preceding the first OFDM symbol in the mapping (e.g., for AGC training purposes).

Virtual resource blocks may be mapped to physical resource blocks according to non-interleaved mapping. For non-interleaved VRB-to-PRB mapping, virtual resource block n is mapped to physical resource block n.

For a PSCCH, the block of bits $b(0), \ldots, b(M_{bit} - 1)$, where $M_{bit}$ It is the number of bits transmitted on the physical channel, may be scrambled prior to modulation, resulting in a block of scrambled bits $\tilde{b}(0), \ldots, \tilde{b}(M_{bit} - 1)$ according to $\tilde{b}(i) = (b(i) + c(i)) \bmod 2$. The block of scrambled bits $\tilde{b}(0), \ldots, \tilde{b}(M_{bit} - 1)$ may be modulated using QPSK, resulting in a block of complex-valued modulation symbols $d(0), \ldots, d(M_{symb} - 1)$ where $M_{symb} = M_{bit}/2$. The set of complex-valued modulation symbols $d(0), \ldots, d(M_{symb} - 1)$ may be multiplied with the amplitude scaling factor $\beta_{DMRS}^{PSCCH}$ in order to conform to the transmit power and mapped in sequence starting with d(0) to resource elements $(k,l)_{p,\mu}$ assigned for transmission, and not used for the demodulation reference signals associated with PSCCH, in increasing order of first the index k over the assigned physical resources, and then the index l on antenna port p (e.g., p=2000).

The resource elements used for the PSCCH in the first OFDM symbol in the mapping operation above, including DM-RS, PT-RS, and/or CSI-RS occurring in the first OFDM symbol, may be duplicated in the immediately preceding OFDM symbol (e.g., for AGC training purposes).

For sidelink resource allocation mode 1, a UE upon detection of a first SCI (e.g., SCI format 1-A) on PSCCH may decode PSSCH according to the detected second SCI (e.g., SCI formats 2-A and/or 2-B), and associated PSSCH resource configuration configured by higher layers. The UE may not be required to decode more than one PSCCH at each PSCCH resource candidate. For sidelink resource allocation mode 2, a UE upon detection of a first SCI (e.g., SCI format 1-A) on PSCCH may decode PSSCH according to the detected second SCI (e.g., SCI formats 2-A and/or 2-B), and associated PSSCH resource configuration configured by higher layers. The UE may not be required to decode more than one PSCCH at each PSCCH resource candidate. A UE may be required to decode neither the corresponding second SCI (e.g., SCI formats 2-A and/or 2-B) nor the PSSCH associated with a first SCI (e.g., SCI format 1-A) if the first SCI indicates an MCS table that the UE does not support.

Throughout this disclosure, a (sub)set of symbols of a slot, associated with a resource pool of a sidelink BWP, that is (pre-)configured for sidelink communication (e.g., transmission and/or reception) may be referred to as 'sidelink symbols' of the slot. The sidelink symbols may be contiguous/consecutive symbols of a slot. The sidelink symbols may start from a sidelink starting symbol (e.g., indicated by an RRC parameter), e.g., sidelink starting symbol may be symbol #0 or symbol #1, and so on. The sidelink symbols may comprise one or more symbols of the slot, wherein a parameter (e.g., indicated by RRC) may indicate the number of sidelink symbols of the slot. The sidelink symbols may comprise one or more guard symbols, e.g., to provide a time gap for the UE to switch from a transmission mode to a reception mode. For example, the OFDM symbol immediately following the last symbol used for PSSCH, PSFCH, and/or S-SSB may serve as a guard symbol. As shown in FIG. 19, the sidelink symbols may comprise one or more PSCCH resources/occasions and/or one or more PSCCH resources and/or zero or more PSFCH resources/occasions. The sidelink symbols may comprise one or more AGC symbols.

An AGC symbol may comprise duplication of (content of) the resource elements of the immediately succeeding/following symbol (e.g., a TB and/or SCI may be mapped to the immediately succeeding symbol). In an example, the AGC symbol may be a dummy OFDM symbol. In an example, the AGC symbol may comprise a reference signal. For example, the first OFDM symbol of a PSSCH and its associated PSCCH may be duplicated (e.g., in the AGC symbol that is immediately before the first OFDM symbol of the PSSCH). For example, the first OFDM symbol of a PSFCH may be duplicated (e.g., for AGC training purposes).

In a sidelink slot structure configuration, the first symbol is used for automatic gain control (AGC) and the last symbol is used for a gap. During an AGC symbol, a receiving and/or sensing UE may perform AGC training. For AGC training, a UE detects the energy/power of a signal in the channel during the AGC symbol and applies a hardware gain to maximize the signal amplitude to the dynamic range of the analog to digital convertor (ADC) at the receiver. The receiver may determine a gain for a received signal, and an AGC duration allows time for the receiver to determine the gain and apply the gain (e.g., hardware gain component) such that when the receiver receives the data (e.g., in the next symbol(s)), the gain of the amplifier has already been adjusted.

For sidelink communication, the transmitter UE may not map data/control information to the AGC symbol. The AGC symbol may not be used for communication and sending information other than energy. The AGC symbol may be a last symbol prior to an earliest symbol of a transmission, such that a gap between AGC symbol and signal/channel transmission is minimized and an accurate gain is determined for receiving the following signal/channel. For example, the AGC symbol, as shown in FIG. 19, may be a symbol immediately preceding the first/earliest symbol of a resource used for a transmission via a channel (e.g., PSCCH and/or PSSCH and/or PSFCH transmission).

In an example, the AGC symbol may comprise duplication of resource elements of the next (immediately following) OFDM symbol. In an example, the AGC symbol may comprise any signal, e.g., a per-defined signal/sequence and/or dummy information. The purpose of the AGC symbol is to allow the receiver UE to perform AGC training and adjust the hardware gain for a most efficient reception of the following signal.

Throughout this disclosure, the "AGC symbol" may be referred to as "duplicated symbol" and/or "duplication"

and/or "the symbol used for duplication" and/or "the immediately preceding symbol comprising the duplication of a first symbol".

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning of very high data rates to meet customer expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of interworking solutions with Wi-Fi, e.g., LTE/WLAN interworking. This interest indicates that unlicensed spectrum, when present, may be an effective complement to licensed spectrum for cellular operators to address the traffic explosion in some scenarios, such as hotspot areas. For example, licensed assisted access (LAA) and/or new radio on unlicensed band(s) (NR-U) may offer an alternative for operators to make use of unlicensed spectrum while managing one radio network, thus offering new possibilities for optimizing the network's efficiency.

Similar to the LAA feature introduced in LTE, the NR-U (e.g., in Rel-16 and Rel-17), the motivation and primary use of unlicensed spectrum is to expand 3GPP technologies into more vertical domains to support wider applications, enabling new services and creating more wireless product types. By not restricting to always rely on operator licensed carriers or dedicated carriers for V2X/D2D or Public Safety, which may not be always available depending on network deployment and availability, if devices are able to communicate directly with each other or sending out messages/signals on a frequency spectrum that is always readily available, this can be used to create exciting new services, applications and even saving lives in disaster areas (e.g. recent devastating flooding events in the US and China).

For example, sidelink in unlicensed spectrum, or a.k.a. SL-U, may be used in following applications and/or services. For example, for applications such as augmented reality (AR)/virtual reality (VR) interactive and gaming services, which often demands very low latency and high data rate communication over sidelink directly between devices. In another example, SL over unlicensed is also ideal for smart home applications, where tens of low-cost devices connecting to a central node like a customer premise equipment (CPE) within a home network to gain access to internet or just directly communicating with each other to share contents such as movies, videos, music, etc. When there are hundreds or thousands of these devices located within a cell area, it is not expected that all of these devices are to be connected to the mobile network and/or need to have the capability of supporting the Uu interface. Therefore, in order to enable these types of applications and expanding the usage of sidelink, the making use of unlicensed bands is the only choice. For wearable devices such as smart watches, bands, etc., it is already common not to have the capability to connect to a mobile network. In this case, unlicensed spectrum and sidelink connection to a smartphone is the only way for gaining access to the Internet. In another example, out of coverage network areas, such as disaster zones, rural sites, mines, deep basements, coast lines, or dangerous areas where unmanned vehicles, robots or UAVs needs to gain access into, unlicensed spectrum and NR sidelink communication is an ideal combination. In another example, IIoT/smart factory application is equally able to take an advantage of sidelink communication utilizing unlicensed spectrum. For traffic offloading from the Uu interface to sidelink in unlicensed band in a factory setting where not all communication data needs to go through a base station. Especially for coordination data messages between factory/warehouse moving equipment such that they don't collide with each other or to perform a synchronized movement between wheels. When the factory/warehouse is operating NR-U, the sidelink operation in the licensed spectrum can be dynamically control by the gNB as well. In another example, even for the cellular V2X (C-V2X) application, the current allocation of ITS spectrum in 5.9 GHz band dedicated for V2X communication only has very limited spectrum bandwidth. In some regions, total of 30 MHz while others have at most 40 MHz of bandwidth is allocated. This allocated bandwidth is to be shared at least between LTE and NR V2X. It is a well-known problem that this limited bandwidth allocation will not be able to support high data rate applications such as extended sensor data sharing and fully autonomous driving. With the local/regional regulators to increase the ITS bandwidth or designating additional spectrum for C-V2X, utilizing unlicensed spectrum is a viable option via SL carrier aggregation, where a vehicle UE transmits its essential/safety message data on the ITS band and the high data rate imaging over the unlicensed spectrum.

Increased sidelink data rate is motivated by applications such as sensor information (video) sharing between vehicles with high degree of driving automation. Commercial use cases could require data rates in excess of what is currently possible. Increased data rate can be achieved with the support of sidelink carrier aggregation and/or sidelink over unlicensed spectrum. Furthermore, by enhancing the FR2 sidelink operation, increased data rate can be more efficiently supported on FR2. While the support of new carrier frequencies and larger bandwidths would also allow to improve its data rate, the main benefit would come from making sidelink more applicable for a wider range of applications. More specifically, with the support of unlicensed spectrum and the enhancement in FR2, sidelink will be in a better position to be implemented in commercial devices since utilization of the ITS band is limited to ITS safety related applications.

Sidelink communication(s), e.g., in FIG. 17, may use radio resource(s) in an unlicensed band. For example, a sidelink BWP may be (pre-)configured in an unlicensed band/carrier. For example, a sidelink resource pool of the sidelink BWP may be (pre-)configured in an unlicensed band. For example, a base station may configure the sidelink BWP and/or the sidelink resource pool of the sidelink BWP in an unlicensed band. A first communication (e.g., UL and/or DL transmission) between a first device (e.g., a base station) and a second device (e.g., a first wireless device) via Uu interface and a second communication (e.g., sidelink transmission) between the second device (e.g., the first wireless device) and a third device (e.g., a second wireless device) via a sidelink may be performed in a same band or in different spectrum bands. For example, a wireless device may receive, from the base station, configuration parameters of communications via Uu interface and configuration parameters of communications via a sidelink. The configuration parameters may indicate that communications via Uu interface and via a sidelink are configured/scheduled in a same unlicensed band. The configuration parameters may indicate that communications via Uu interface and via a sidelink are configured/scheduled in different unlicensed bands. The configuration parameters may indicate that communications via Uu interface are configured/scheduled in a licensed band, while the communications via a sidelink are configured/scheduled in an unlicensed band. The configuration parameters may indicate that communications via Uu interface are configured/scheduled in an unlicensed band, while the communications via a sidelink are configured/scheduled in a licensed band.

In an example embodiment, Listen-before-talk (LBT) may be required for transmission in an unlicensed/shared band. A cell configured in unlicensed/shared cell may be referred to as an unlicensed/shared cell. The unlicensed/shared cell may be referred to as a LAA cell and/or a NR-U cell. The unlicensed/shared cell may be operated as non-standalone with an anchor cell in a licensed band or standalone without an anchor cell in a licensed band. LBT may comprise a clear channel assessment (CCA). For example, a carrier that is configured in the unlicensed/shared cell may be referred to as an unlicensed carrier. The base station may configure a cell on the carrier. For example, the unlicensed/shared cell may be configured on the unlicensed carrier.

For example, in an LBT procedure, equipment may apply a CCA before using the unlicensed/shared cell or channel. The CCA may comprise an energy detection (ED) that determines the presence of other signals on a channel (e.g., channel is occupied) or absence of other signals on a channel (e.g., channel is clear). A regulation of a country may impact the LBT procedure. For example, European and Japanese regulations mandate the usage of LBT in the unlicensed/shared bands, such as the 5 GHz unlicensed/shared band. Apart from regulatory requirements, carrier sensing via LBT may be one way for fairly sharing the unlicensed/shared spectrum among different devices and/or networks attempting to utilize the unlicensed/shared spectrum.

In an example embodiment, discontinuous transmission on an unlicensed/shared band with limited maximum transmission duration may be enabled. Some of these functions may be supported by one or more signals to be transmitted from the beginning of a discontinuous downlink transmission and/or a sidelink transmission in the unlicensed/shared band. Channel reservation may be enabled by the transmission of signals, after or in response to gaining channel access based on a successful LBT operation. Other nodes may receive the signals (e.g., transmitted for the channel reservation) with an energy level above a certain threshold that may sense the channel to be occupied. Functions that may need to be supported by one or more signals for operation in unlicensed/shared band with the discontinuous downlink transmission and/or sidelink transmission may comprise one or more of the following: detection of the downlink transmission and/or sidelink transmission in unlicensed/shared band (comprising cell identification) by wireless devices; time & frequency synchronization of wireless devices.

In an example embodiment, downlink/uplink and/or sidelink transmission and frame structure design for operation in an unlicensed/shared band may employ subframe, slot, mini-slot, and/or symbol boundary alignment according to timing relationships, e.g., across serving cells (e.g., configured on one or more carriers) aggregated by carrier aggregation. This may not imply that base station transmissions start at the subframe, (mini-)slot, and/or symbol boundary. The operation via the unlicensed/shared band may support transmitting PDCCH, PDSCH, PSBCH, PSCCH, PSSCH, and/or PSFCH, for example, when not all OFDM symbols are available for transmission in a slot according to LBT.

An LBT procedure may be employed for fair and friendly coexistence of a 3GPP system (e.g., LTE and/or NR) with other operators and/or radio access technologies (RATs), e.g., WiFi, and/or the like, operating in unlicensed/shared band. For example, a node attempting to transmit on a carrier in unlicensed/shared band may perform a CCA as a part of an LBT procedure to determine if a channel is free (e.g., idle) for use. For example, the channel may be confined within a range of frequency. For example, a regulation of a country may indicate the range of frequency that requires the LBT procedure to use the channel in the unlicensed/shared bands. For example, the channel may be 20 MHz or a multiple of 20 MHz. The channel may be referred to as an LBT band, a subband, and/or the like. The LBT procedure may comprise an energy detection (ED) performed by the node to determine if the channel is being free (e.g., idle) or used (e.g., occupied) for use. The wireless device may perform the ED for the range of frequency comprising the channel. For example, regulatory requirements in some regions, e.g., in Europe, specify an ED threshold such that if a node measures, detects, and/or receives energy greater than the ED threshold, the node determines that the channel is being used/occupied, e.g., by another node(s) (and/or is not free or idle for use/access). While nodes may follow such regulatory requirements, a node may optionally use a lower ED threshold for ED than that specified by regulatory requirements. A radio access technology (e.g., WiFi, LTE and/or NR) may employ a mechanism to adaptively change the ED threshold. For example, NR-U may employ a mechanism to adaptively lower the ED threshold from an upper bound. An adaptation mechanism may not preclude static or semi-static setting of the ED threshold. In an example, Category 4 LBT (CAT4 LBT or Type 1 LBT) mechanism or other type of LBT mechanisms may be implemented.

In an example, if the detected energy during a CCA (e.g., initial CCA) period is lower than an ED threshold, the device may access the channel for a period referred to as Channel Occupancy Time (COT). Otherwise, the device may start an extended CCA period, in which the detected energy is again compared against the ED threshold until channel access is granted. The regulation may specify the CCA slot duration (e.g., 9 μs in the 5 GHz band, and 5 μs in the 60 GHz band), the initial and extended CCA check times (e.g., a multiple of 5 μs for initial CCA and 8+m×5 μs for extended CCA in the 60 GHz band, where m controls the backoff), and the ED threshold (e.g., −72 dBm for a 20 MHz channel bandwidth in the 5 GHz band, and −47 dBm for 40 dBm of radiated power in the 60 GHz band).

In an example, a LBT failure of a LBT procedure on the channel in an unlicensed band may indicate a channel access failure on the channel. For example, a LBT failure of a LBT procedure on the channel may indicate that the channel is not idle or is busy (e.g., occupied by another device(s)) during one or more sensing slot durations (e.g., CCA periods) before a transmission via the channel (e.g., or immediately before the transmission via the channel). In an example, a LBT success of a LBT procedure on the channel may indicate a channel access success of the channel. In an example, a LBT success of a LBT procedure on the channel may indicate that the channel is idle during one or more sensing slot durations (e.g., CCA periods) before a transmission via the channels (e.g., or immediately before the transmission via channels).

Various example LBT mechanisms may be implemented. In an example, for some signals, in some implementation scenarios, in some situations, and/or in some frequencies no LBT procedure may be performed by the transmitting entity. An LBT procedure referred in example embodiment(s) may comprise Category 1 LBT, Category 2 LBT, Category 3 LBT, and/or Category 4 LBT. A type of an LBT (e.g., Category 1 LBT, Category 2 LBT, Category 3 LBT, and/or Category 4 LBT) may be indicated In an example, Category 1 (CAT1 LBT, e.g., no LBT) may be implemented in one or more cases. For example, a channel in unlicensed/shared band may be hold by a first device (e.g., for uplink, downlink, and/or sidelink transmissions). The first device may share the channel with a second device. For example, a second device may take over the channel in unlicensed/shared band for uplink, downlink, and/or sidelink transmissions, e.g., of a control signal (e.g., HARQ feedback of the uplink, downlink, and/or the sidelink transmissions) without performing the CAT1 LBT.

In an example, Category 2 (CAT2 LBT that may be referred to as one-shot LBT and/or a short LBT) may be implemented. The Category 2 may be an LBT without random back-off. The duration of time determining that the channel is idle may be deterministic (e.g., by a regulation). A transmitting device (e.g., a base station in Uu interface, a wireless device in Uu interface, and/or a transmitting device in a sidelink communication) may transmit a grant (e.g., uplink grant and/or a sidelink grant) indicating a type of LBT (e.g., CAT2 LBT) to a receiving device (e.g., a base station in Uu interface, a wireless device in Uu interface, and/or a receiving device in a sidelink communication).

In an example, Category 3 (CAT3, e.g. LBT with random back-off with a contention window of fixed size) may be implemented. The LBT procedure may have the following procedure as one of its components. The transmitting device may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting device transmits on the channel.

In an example, Category 4 (CAT4, e.g. LBT with random back-off with a contention window of variable size) may be implemented. The transmitting device may draw a random number N within a contention window. The size of contention window may be specified by the minimum and maximum value of N. The transmitting device may vary the size of the contention window when drawing the random number N. The random number N may be used in the LBT procedure to determine the duration of time that the channel is sensed to be idle before the transmitting device transmits on the channel.

In an example, a transmission burst(s) may comprise a continuous (unicast, multicast, broadcast, and/or combination thereof) transmission on a carrier component (CC). A first transmission burst(s) may be a continuous transmission from a first device (e.g., a base station in Uu interface, a wireless device in Uu interface, and/or a transmitting device in a sidelink communication) to a second device (e.g., a base station in Uu interface, a wireless device in Uu interface, and/or a receiving device in a sidelink communication) on the channel of the CC in an unlicensed/shared band. A second transmission burst(s) may be a continuous transmission from the second device (e.g., a base station in Uu interface, a wireless device in Uu interface, and/or a transmitting device in a sidelink communication) to the first device (e.g., a base station in Uu interface, a wireless device in Uu interface, and/or a receiving device in a sidelink communication) on the channel of the CC in the unlicensed/shared band. In an example, the first transmission burst(s) and the second transmission burst(s) on the channel in the unlicensed/shared band may be scheduled in a TDM manner over the same unlicensed/shared band. Switching between the first transmission burst and the second transmission burst(s) may require an LBT (e.g., CAT1 LBT, CAT2 LBT, CAT3 LBT, and/or CAT4 LBT). For example, an instant in time may be part of the first transmission burst or the second transmission burst.

COT sharing may comprise a mechanism by which one or more devices share a channel, in an unlicensed/shared band, that is sensed as idle by at least one of the one or more devices. For example, one or more first devices may occupy the channel via an LBT (e.g., the channel is sensed as idle based on CAT4 LBT) and one or more second devices may use and/or share, for a transmission of the one or more second devices, the channel using a particular type of an LBT within a maximum COT (MCOT) limit.

In an example, various of LBT types may be employed for Channel occupancy time (COT) sharing. A transmitting device (e.g., a base station in Uu interface, a wireless device in Uu interface, and/or a transmitting device in a sidelink communication) may transmit a grant (e.g., uplink grant and/or a sidelink grant) to a receiving device (e.g., a base station in Uu interface, a wireless device in Uu interface, and/or a receiving device in a sidelink communication). For example, the grant (e.g., uplink grant and/or a sidelink grant) may indicate a trigger of the COT sharing and/or a type of LBT (e.g., CAT1 LBT, CAT2 LBT, CAT2 LBT, and/or CAT2 LBT) to be used for the receiving device during the COT acquired and/or shared by the transmitting device.

In an example, a regulation of certain region(s), e.g., Europe and Japan may prohibit continuous transmission in the unlicensed band and may impose limits on the COT, e.g., the maximum continuous time a device may use the channel. The maximum continuous time in which the device gains an access based on LBT procedure and uses the channel may be referred to as a maximum channel occupancy time (MCOT). The MCOT in the 5 GHz band may be limited to a certain period, e.g., 2 ms, 4 ms, or 6 ms, depending on the channel access priority class, and it may be increased up to 8-10 ms.

The MCOT in the 60 GHz band may be 9 ms. For example, the regulation (e.g., for the 5 GHz and 60 GHz bands) may allow the device (e.g., a wireless device of a Uu interface and/or a transmitting wireless device in a sidelink communication) to share the COT with the associated devices. For example, the associated device may be a wireless device and/or a base station in the Uu interface. For example, the associated device may be a wireless device of the sidelink (e.g., unicast, multicast, and/or broadcast) communication. For example, the device may get an (e.g., initial) access to the channel through the LBT procedure, e.g., for COT (or MCOT). The device may transmit, to the associated device, a control message and/or a control signal indicating sharing the COT (or MCOT) with the associated device and/or remaining time of the COT, and starting/ending times (e.g., in terms of symbol(s), slot(s), SFN(s), and/or a combination thereof) of the COT that the associated device to use/share the channel. The associated device may skip (e.g., may not perform) the CCA check and/or may perform Category 1 LBT procedure on the channel during the shared COT. The associated wireless device may transmit data via the channel during the shared COT based on a particular LBT type. The particular LBT type may comprise Category 1, Category 2, Category 3, and/or Category 4. For example, the MCOT may be defined and/or configured per priority class, logical channel priority, and/or device specific.

In an example, a first device may gain an access through the LBT procedure for a first (e.g., UL, DL, and/or sidelink) transmission in an unlicensed band. If the first device shares, with a second device, the channel, the second device may perform a second (e.g., UL, DL, and/or sidelink) transmission with a dynamic grant and/or a configured grant (e.g., Type 1 and/or Type 2) with a particular LBT (e.g., CAT2 LBT) that the second device performs on a channel shared by a first device. The second device may use and/or occupy, e.g., by performing UL, DL, and/or sidelink transmission, the channel during the COT. For example, the first device performing the first transmission based on a configured grant (e.g., Type 1, Type 2, autonomous UL) may transmit a control information (e.g., DCI, UCI, SCI, and/or MAC CE) indicating the COT sharing. The COT sharing may comprise switching, within a (M)COT, from the first transmission (e.g., UL, DL, and/or sidelink transmission) of the first device to the second transmission (e.g., UL, DL, and/or sidelink transmission) of the second device. A starting time of the second transmission in the COT sharing, e.g., triggered by the first device, may be indicated in one or more ways. For example, one or more parameters in the control information may indicate the starting time of the COT sharing at which the second device starts to access the channel and/or an ending time of the COT sharing at which the second device terminates/ends to use the channel. For example, resource configuration(s) of configured grant(s) may indicate the starting time and/or the ending time.

In an example, single and/or multiple switching of transmissions within a shared COT may be supported. For example, a switching of transmissions within the shared COT may comprise switching from the first transmission (e.g., UL, DL, and/or sidelink transmission) of the first device to the second transmission (e.g., UL, DL, and/or sidelink transmission) of the second device within the shared COT. A type of LBT required/performed, by the second device, for the second transmission may be different depending on a time gap between the first transmission and the second transmission. The time gap may be referred to as a COT gap. For example, the second wireless device may perform CAT1 LBT (e.g., may not perform or may skip LBT procedure) for the second transmission switched from the first transmission within the shared COT, e.g., if the time gap is less than a first time value, e.g., 16 μs. For example, the second wireless device may perform CAT2 LBT for the second transmission switched from the first transmission within the shared COT, e.g., if the time gap is longer than the first time value and does not exceed a second time value, e.g., 25 μs. For example, the second wireless device may perform CAT2 LBT for the second transmission switched from the first transmission within the shared COT, e.g., if the time gap exceeds the second time value. For example, the second wireless device may perform CAT4 LBT for the second transmission switched from the first transmission within the shared COT, e.g., if the time gap exceeds the second time value.

A sidelink resource of a sidelink communication may be configured in an unlicensed band. For example, a first wireless device may perform, during a period in one or more symbols, an LBT procedure on a channel comprising a sidelink resource (e.g., comprising PSBCH, PSCCH, PSSCH, and/or PSFCH) via which the first wireless device schedules (or is scheduled) to transmit a data and/or a signal to a second wireless device. For example, the LBT procedure may start during a first symbol that is at least one symbol or a certain period (e.g., in terms of μ or ms) before and/or prior to a starting symbol of the sidelink resource (and/or a starting symbol of the transmission of the data and/or the signal). For example, the LBT procedure may end before and/or prior to the starting symbol of the sidelink resource (and/or the starting symbol of the transmission of the data and/or the signal). The wireless device may not transmit, via the sidelink resource (e.g., comprising PSBCH, PSCCH, PSSCH, and/or PSFCH), the data and/or the signal to the second wireless device, e.g., in response to the LBT procedure indicating the channel is busy. The wireless device may transmit, via the sidelink resource (e.g., comprising PSBCH, PSCCH, PSSCH, and/or PSFCH), the data and/or the signal to the second wireless device, e.g., in response to the LBT procedure indicating the channel is idle.

For example, the first wireless device may determine an AGC symbol located before or prior to a starting symbol of the PSBCH, PSCCH, PSSCH, and/or PSFCH via which the first wireless device schedules (or is scheduled) to transmit the data and/or the signal to the second wireless device. For example, the AGC symbol may be located one symbol before the starting symbol of sidelink resource (e.g., PSBCH, PSCCH, PSSCH, and/or PSFCH). Referring to FIG. 19, the AGC symbol is the second symbol in the slot (e.g., one symbol before a starting symbol (e.g., the third symbol in the slot) of a PSCCH (in the third, fourth and the fifth symbols in a subchannel in the slot) and/or a starting symbol (e.g., the third symbol in the slot) of PSSCH (e.g., from the third symbol to the eighth symbol in the slot), and/or a starting symbol (e.g., the tenth symbol in the slot) of a PSFCH (e.g., the eleventh symbol in the slot). For example, the first wireless device may start the LBT procedure at least one symbol or a certain period (e.g., in terms of μ or ms) before and/or prior to a starting symbol of the AGC symbol. For example, the first wireless device may end the LBT procedure at least one symbol or a certain period (e.g., in terms of μ or ms) before and/or prior to a starting symbol of the AGC symbol. For example, referring to FIG. 19, the first wireless device may start the LBT procedure For example, the LBT procedure may start during a first symbol that is at least one symbol or a certain period (e.g., in terms of μ or ms) before and/or prior to a starting symbol of the AGC symbol (e.g., located one symbol before the PSCCH, PSSCH, and/or PSFCH in FIG. 19). For example, the LBT procedure may end before and/or prior to the starting symbol. The wireless device may not transmit, via the AGC symbol, an AGC signal (e.g., that is for the second wireless device to determine/adjust/train parameter values of its AGC) to the second wireless device, e.g., in response to the LBT procedure indicating the channel is busy. The wireless device may transmit, via the AGC symbol, the AGC signal to the second wireless device, e.g., in response to the LBT procedure indicating the channel is idle.

A wireless device may receive message(s) comprising configuration parameters of one or more sidelink resource pools configured in an unlicensed spectrum. The wireless device may select and/or determine a sidelink resource pool from the one or more sidelink resource pools for a sidelink transmission and/or a sidelink reception in the unlicensed spectrum. The wireless device may select and/or a sidelink resource from the sidelink resource pool for the sidelink transmission and/or sidelink reception in the unlicensed spectrum In an example, a first wireless device may be a transmitting wireless device of one or more sidelink transmissions. A second wireless device may be a receiving wireless device of the one or more sidelink transmissions. For example, the second wireless device may be a desired/intended receiver of the one or more sidelink transmissions. For example, a SCI (e.g., a second-stage SCI) scheduling the one or more sidelink transmissions may comprise/indicate an ID (e.g., destination ID) of the second wireless device indicating that the second wireless device is a desired/intended/destination receiver of the one or more sidelink transmissions. For example, the second wireless device may not be a desired/ intended receiver of the one or more sidelink transmissions, e.g., if a SCI (e.g., a second-stage SCI) scheduling the one or more sidelink transmissions may not comprise/indicate an ID (e.g., destination ID) of the second wireless device. For example, the second wireless device that is not a desired/ intended receiver of the one or more sidelink transmissions may be a device that monitors and/or receives the SCI (e.g., comprising an ID (e.g., destination ID) of another wireless device) transmitted by the first wireless devices using the one or more sidelink resource pools. In an example, the one or more sidelink transmissions may comprise PSCCH and/ or PSSCH transmissions. In an example, the one or more sidelink transmissions may comprise one or more unicast transmissions, one or more groupcast transmissions, and/or one or more broadcast transmissions.

A base station and/or a wireless device may transmit a message to the first wireless device. The message may comprise an RRC message, SIB, a MAC CE, DCI, and/or SCI. The message may comprise a field indicating/configuring one or more sidelink resource pools in a sidelink BWP. The message may further indicate/configure (e.g., frequency location of) the sidelink BWP in a frequency band, e.g., an unlicensed band. In an example, the sidelink BWP may be in an unlicensed/shared spectrum/carrier/band/cell with a plurality of RATs (e.g., wifi, etc.). The one or more sidelink resource pools and/or sidelink BWP may be pre-configured to the first wireless device. A bandwidth of the frequency band may be at least as wide as (e.g., wider than or equal to) a minimum regularized bandwidth in a respective unlicensed band. In an example, the message transmitted by the base station and/or the wireless device may comprise/indicate a threshold indicating a bandwidth (e.g., a minimum bandwidth). The bandwidth indicated by the threshold may be wider than or equal to the minimum regularized bandwidth in the unlicensed spectrum. In an example, the threshold indicating the bandwidth may be pre-configured to the first wireless device. In an example, the frequency band may have a frequency band identifier (ID)/index. Each of the one or more sidelink resource pools (e.g., in the frequency band) may have a sidelink resource pool ID/index. The message, received by the first wireless device and/or the second wireless device from the base station and/or the wireless device, may comprise/indicate/configure the frequency band ID/index and the sidelink resource pool ID/index for the each of the one or more sidelink resource pools in the frequency band. The message may comprise/indicate/configure a mapping (e.g., an association) between the frequency band and the one or more sidelink resource pools in the frequency band. The mapping may indicate that the ID/index of the frequency band is associated with the IDs/Indexes of the one or more sidelink resource pools in the frequency band. In an example, the frequency ID/index, the sidelink resource pool IDs/indexes of the one or more sidelink resource pools in the frequency band, and/or the mapping between the frequency band and the one or more sidelink resource pools in the frequency band may be pre-configured to the first wireless device and/or the second wireless device. The first wireless device may select, from the one or more sidelink resource pools, a sidelink grant comprising one or more resources for the one or more sidelink transmissions. The first wireless device may select the sidelink grant based on a resource selection procedure in the frequency band (e.g., unlicensed band). In an example, the resource selection procedure may comprise at least one of sensing procedures and/or actions described in FIGS. 25, 26, and/or 27.

A sidelink resource pool may be confined within an unlicensed band. The unlicensed band may comprise a channel having a bandwidth (e.g., a range of frequency) requiring an LBT procedure. For example, a wireless device determine/select the sidelink resource pool and determine/select a sidelink resource among one or more sidelink resources of the sidelink resource pool. The wireless device may perform the LBT on the channel. The bandwidth may comprise one or more subchannel of the sidelink resource. The sidelink BWP comprising the sidelink resource pool may be confined in the unlicensed band. The sidelink BWP comprising the sidelink resource pool may be confined in the unlicensed band.

Figure 28:
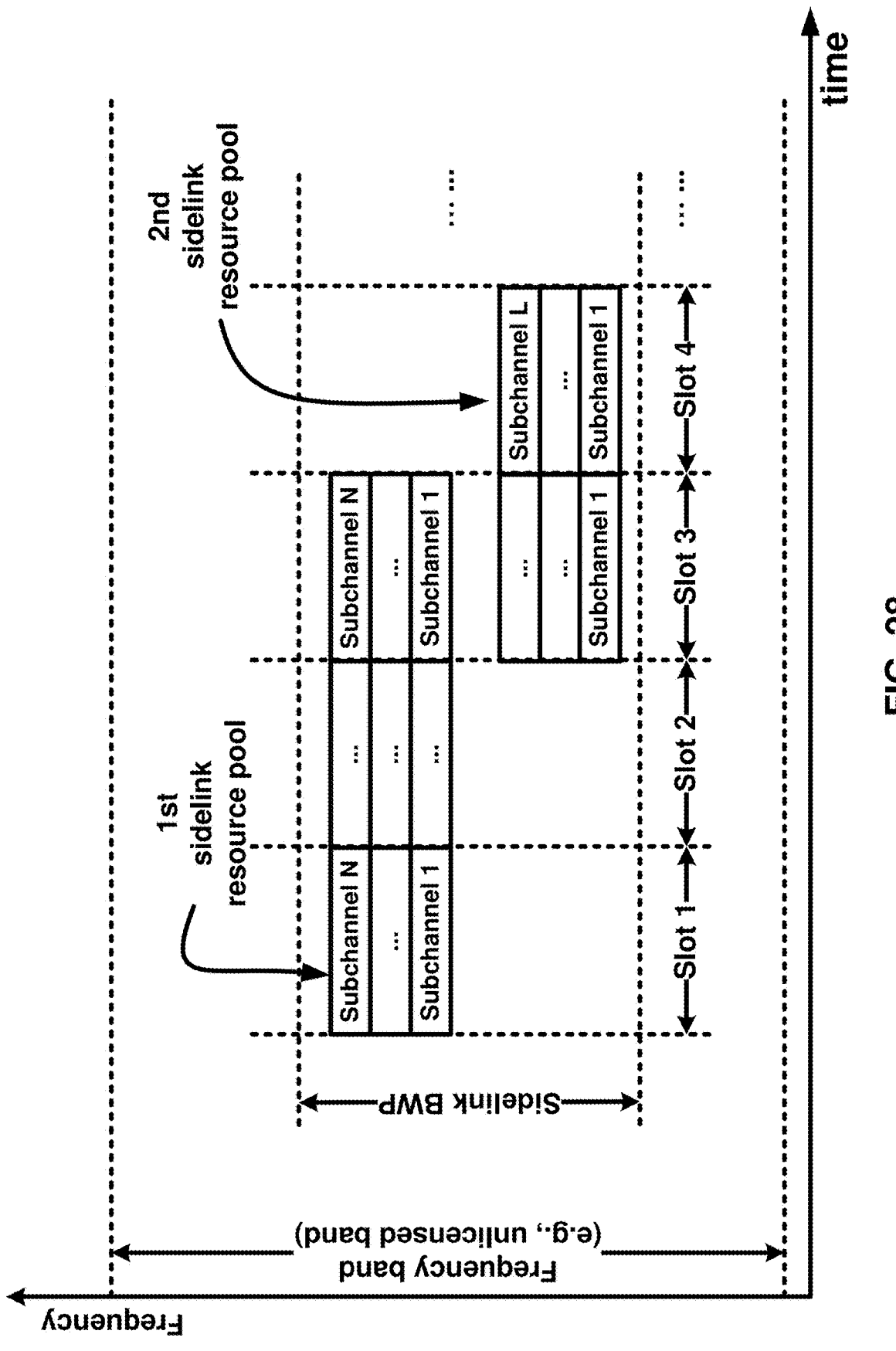
FIG. 28 illustrates an example configuration of a sidelink resource pool in a frequency band as per an aspect of an example embodiment of the present disclosure.

FIG. 28 illustrates an example configuration of a sidelink resource pool in a frequency band as per an aspect of an example embodiment of the present disclosure. In FIG. 28, a sidelink resource pool may refer to the one in FIG. 18. For example, a wireless device may receive a message (e.g., RRC message and/or a SIB) from a base station and/or another wireless device. The message may comprise configuration parameters of sidelink BWP. The configuration parameters may indicate a bandwidth (e.g., and/or frequency size) of the sidelink BWP. The configuration parameters may indicate a first sidelink resource pool is configured in the sidelink BWP. The configuration parameters may indicate that the sidelink BWP is confined and/or configured in a particular frequency band (e.g., unlicensed band). For example, the size of the sidelink BWP may be equal to or smaller than a minimum regularized bandwidth for which the wireless device performs an LBT procedure to gain access on a channel. For example, the size of the sidelink BWP may be smaller than or equal to 20 MHz, e.g., the particular frequency band is an unlicensed band in 5 GHz, 6 GHz, and/or FR1 band. For example, the configuration parameters may further indicate a second sidelink resource pool is configured in the sidelink BWP. A first sidelink resource of the first sidelink resource pool may overlap in time with a second sidelink resource of the second sidelink resource pool, e.g., Slot 3 in FIG. 28.

Figure 29:
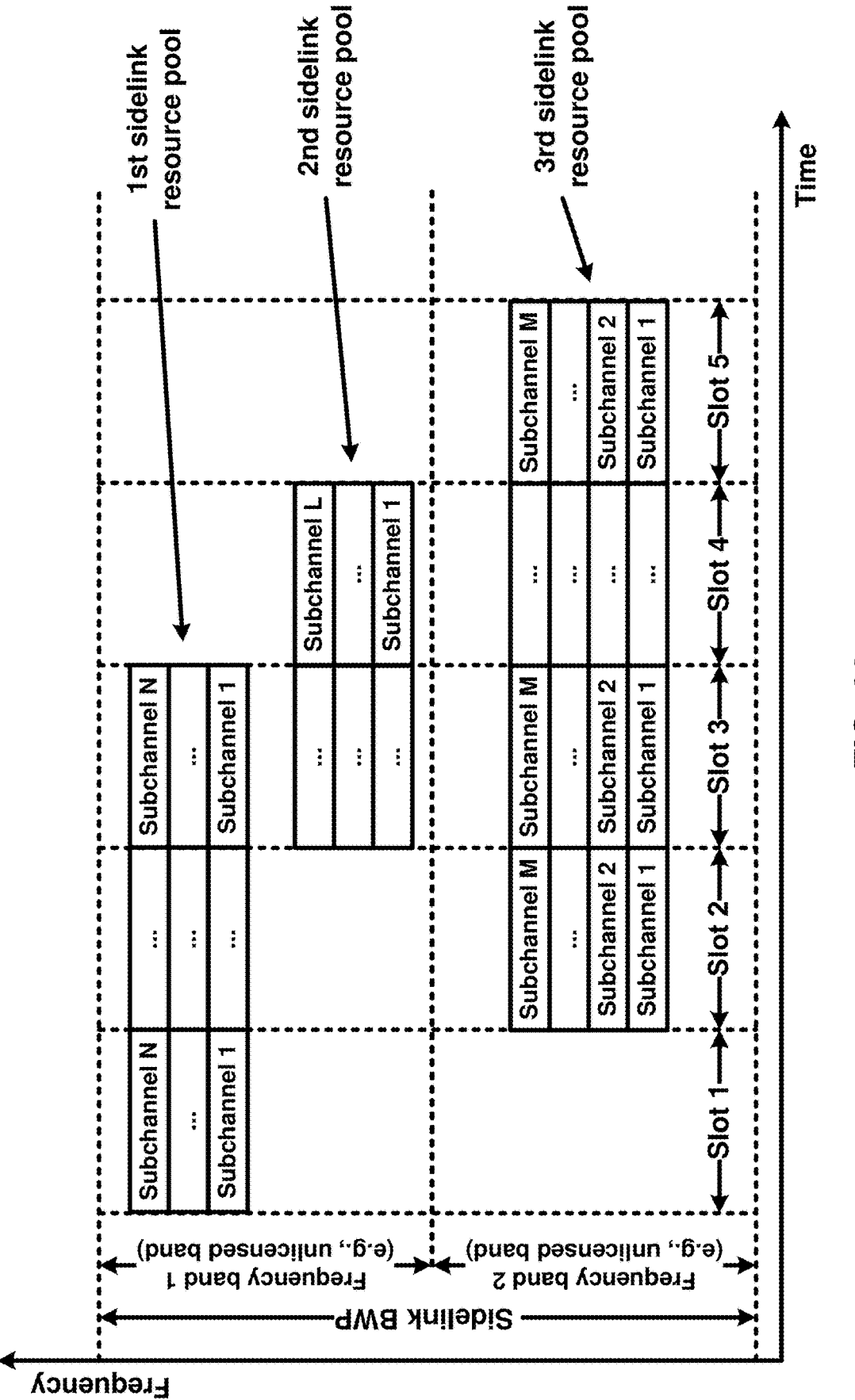
FIG. 29 illustrates an example configuration of a sidelink resource pool in a frequency band as per an aspect of an example embodiment of the present disclosure.

FIG. 29 illustrates an example configuration of a sidelink resource pool in a frequency band as per an aspect of an example embodiment of the present disclosure. In FIG. 29, a sidelink resource pool may refer to the one in FIG. 18. For example, a wireless device may receive a message (e.g., RRC message and/or a SIB) from a base station and/or another wireless device. The message may comprise configuration parameters of sidelink BWP. The configuration parameters may indicate a bandwidth (e.g., and/or frequency size) of the sidelink BWP. For example, the sidelink BWP may be a wideband sidelink BWP that has a bandwidth larger than a minimum regularized bandwidth for which the wireless device performs an LBT procedure to gain access on a channel. For example, the sidelink BWP may be larger than 20 MHz. The configuration parameters may indicate that one or more sidelink resource pools are configured in the sidelink BWP. The configuration parameters may indicate that each of the one or more sidelink resource pools is confined and/or configured in a respective frequency band (e.g., unlicensed band). In FIG. 29, three sidelink resource pools are in a sidelink BWP. The sidelink BWP may comprise a frequency band 1 (e.g., unlicensed band 1) and a frequency band 2 (e.g., unlicensed band 2). The first sidelink resource pool and the second sidelink resource pool may be confined in the frequency band 1. The third sidelink resource pool may be confined in the frequency band 2. The frequency band 1 (e.g., unlicensed band 1) and the frequency band 2 (e.g., unlicensed band 2) may require different and/or independent LBT procedures. For example, the wireless device may perform a first LBT procedure that may indicate a channel of frequency band 1 being idle in Slot 3. For example, the wireless device may transmit, in response to the channel of frequency band 1 being idle in Slot 3, a sidelink data via a sidelink resource selected from the first sidelink resource pool or the second sidelink resource pool that are configured in the frequency band 1. For example, the wireless device may not transmit, in response to the channel of frequency band 1 being idle in Slot 3, a sidelink data via a sidelink resource selected from the third sidelink resource pool that are configured in the frequency band 2. Transmitting a sidelink data via a sidelink resource selected from the third sidelink resource pool that are configured in the frequency band 2 may require a second LBT procedure.

A sidelink resource pool may be configured in a sidelink carrier. The sidelink carrier may be configured, e.g., by a base station, in an unlicensed carrier/frequency/band/spectrum. For example, the sidelink carrier may be configured for operation with shared spectrum channel access. For example, a wireless device may receive one or more RRC messages comprising configuration parameters of the sidelink carrier, and/or a serving cell associated with the sidelink carrier, for operation with shared spectrum channel access. The configuration parameters (e.g., channel access configuration parameters) may be used for channel access procedures of operation with shared spectrum channel access, e.g., one or more types of channel access procedures and/or LBT procedures. The configuration parameters may comprise an energy detection configuration/threshold; and/or COT sharing configuration.

The parameters of COT sharing configuration may indicate: a COT sharing energy detection threshold; and/or energy detection threshold offset. The parameters of COT sharing configuration may indicate that COT sharing between sidelink UEs is allowed/enabled/configured. In an example, configuration parameters of a sidelink resource pool may comprise COT sharing parameters, indicating that COT sharing is allowed/enabled/configured between wireless devices using/communicating via the resource pool.

A sidelink resource pool, configured for operation with shared spectrum channel access (unlicensed band), may be associated with sidelink resource allocation mode 1 and/or sidelink resource allocation mode 2. A UE may use channel access procedures in combination with resource allocation mode 1 and/or resource allocation mode 2. A UE may perform sidelink resource reservation by sending a SCI indicating reservation of a time-frequency resource (transmission occasion) in the resource pool.

A UE performing transmission(s) on SL-U carrier(s) and/or channel(s) and/or a UE scheduling or configuring SL transmission(s) for a UE performing transmissions on channel(s) may perform the channel access procedures to access the channels on which the transmission(s) are performed. Transmissions from a UE may be considered as separate SL transmissions, irrespective of having a gap between transmissions or not. A UE may perform channel access procedures, e.g., in dynamic channel access, unless a higher layer parameter indicates not to (e.g., if ChannelAccessMode is configured/provided and/or ChannelAccessMode='semiStatic', or if a RRC parameter indicates absence of any other technology (RAT) sharing the carrier).

A UE may access a channel on which SL transmission(s) are performed according to one of a plurality of types of channel access procedures/LBTs (e.g., Type 1 SL channel access procedure and/or Type 2 SL channel access procedure). In an example, a UE may perform Type 1 channel access procedures and/or Type 2 (2A/2B/2C) channel access procedures to access a channel for a sidelink transmission.

In a channel access procedure, the UE performs energy detection (ED). If the detected energy during a sensing period (e.g., clear channel assessment (CCA) period) is lower than an ED threshold, the UE may determine a successful LBT (e.g., idle/available channel). If the detected energy during the sensing period (e.g., CCA period) is higher than the ED threshold, the UE may determine a failed LBT or LBT failure (e.g., busy channel). The ED threshold may be configured by RRC signaling. In response to determining a successful LBT, the UE may perform the sidelink transmission. In response to determining a failed LBT (failure of the LBT procedure), the UE may not perform (e.g., drop or cancel) the sidelink transmission.

In the present disclosure, the terms LBT and channel access procedure may be used interchangeably.

Upon a successful LBT on a channel, the UE may access the channel for a period referred to as Channel Occupancy Time (COT). This is referred to as COT initiation. In an example, a UE may initiate a COT using a first type of channel access procedure, e.g., Type 1 channel access procedure or Type 1 LBT.

Upon a failed LBT on a channel, the device may start an extended CCA period (e.g., continue sensing and energy detection), in which the detected energy is again compared against the ED threshold until channel access is granted. The regulation may specify the CCA slot duration (e.g., 9 μs in the 5 GHz band, and 5 μs in the 60 GHz band), the initial and extended CCA check times (e.g., a multiple of 5 μs for initial CCA and 8+m×5 μs for extended CCA in the 60 GHz band, where m controls the backoff), and the ED threshold (e.g., −72 dBm for a 20 MHz channel bandwidth in the 5 GHz band, and −47 dBm for 40 dBm of radiated power in the 60 GHz band).

Various example LBT mechanisms/procedures may be implemented. In an example, for some signals, in some implementation scenarios, in some situations, and/or in some frequencies no LBT procedure may be performed by the transmitting entity. An LBT procedure referred in example embodiment(s) may comprise Type 1 LBT, Type 2A LBT, Type 2B LBT, and/or Type 2C LBT. A type of an LBT (e.g., Type 1 LBT, Type 2 LBT, Type 2A LBT, Type 2B LBT, and/or Type 2C LBT) may be indicated or determined by the UE.

In an example, a UE may use Type 2 channel access procedures, including Type 2A channel access procedure, Type 2B channel access procedure, and/or Type 2C channel access procedure. In Type 2 channel access procedures, the time duration spanned by the sensing slots that are sensed to be idle before a SL transmission(s) may be deterministic.

In an example, Type 2C channel access procedure (Type 2C LBT, or CAT1 LBT e.g., no LBT) may be configured for one or more sidelink signals and/or channels. For example, a channel in unlicensed/shared band may be occupied by a first device (e.g., for uplink, downlink, and/or sidelink transmissions) for a duration of a channel occupancy time (COT). The first device may share the channel (e.g., a portion of the duration of the COT) with a second device. For example, a second device may take over the channel in unlicensed/shared band for uplink, downlink, and/or sidelink transmissions, e.g., of a control signal (e.g., HARQ feedback of the uplink, downlink, and/or the sidelink transmissions) based on a Type 2C channel access procedure (e.g., without sensing the channel before the transmission). For example, the duration of the corresponding transmission may be less than a threshold (e.g., 584 micro seconds).

In an example, Type 2B channel access procedure (Type 2C LBT or CAT2 LBT that may be referred to as one-shot LBT and/or a short LBT) may be configured for one or more sidelink signals and/or channels. The Type 2B may be an LBT without random back-off. The duration of time determining that the channel is idle may be deterministic (e.g., by a regulation, e.g., 16 micro second). A transmitting device (e.g., a base station in Uu interface, a wireless device in Uu interface, and/or a transmitting device in a sidelink communication) may transmit a grant (e.g., uplink grant and/or a sidelink grant) indicating a type of LBT (e.g., Type 2 B LBT) to a receiving device (e.g., a base station in Uu interface, a wireless device in Uu interface, and/or a receiving device in a sidelink communication). For example, a channel in unlicensed/shared band may be occupied by a first device (e.g., for uplink, downlink, and/or sidelink transmissions) for a duration of a channel occupancy time (COT). The first device may share the channel (e.g., a portion of the duration of the COT) with a second device. For example, a second device may take over the channel in unlicensed/shared band for uplink, downlink, and/or sidelink transmissions, e.g., of a control signal (e.g., HARQ feedback of the uplink, downlink, and/or the sidelink transmissions) based on a Type 2B channel access procedure (e.g., with short/one-shot sensing the channel before the transmission). For example, the UE may transmit the transmission immediately after sensing the channel to be idle within a duration $T_f$ (e.g., $T_f$=16 μs), including a sensing slot that occurs within the last time interval (e.g., 9 μs) of the duration $T_f$. The channel is considered to be idle within the duration $T_f$ if the channel is sensed to be idle for total of at least 5 μs with at least 4 μs of sensing occurring in the sensing slot.

In an example, Type 2A channel access procedure (Type 2A LBT or CAT3 LBT, e.g., LBT with deterministic backoff) may be configured for one or more sidelink signals and/or channels. A UE may be indicated to perform Type 2A channel access procedure in a SL grant. For example, a channel in unlicensed/shared band may be occupied by a first device (e.g., for uplink, downlink, and/or sidelink transmissions) for a duration of a channel occupancy time (COT). The first device may share the channel (e.g., a portion of the duration of the COT) with a second device. For example, a second device may take over the channel in unlicensed/shared band for uplink, downlink, and/or sidelink transmissions, e.g., of a control signal (e.g., HARQ feedback of the uplink, downlink, and/or the sidelink transmissions) based on a Type 2A channel access procedure. For example, the UE may use Type 2A channel access procedures for a SL transmission. The UE may transmit the transmission immediately after sensing the channel to be idle for at least a sensing interval $T_{shor\_ul}$ (e.g., $T_{shor\_ul}$=25 μs), consisting of a duration $T_f$ (e.g., $T_f$=16 μs) immediately followed by one sensing slot and $T_f$ including a sensing slot at start of $T_f$. The channel is considered to be idle for $T_{shor\_ul}$ if both sensing slots of $T_{shor\_ul}$ are sensed to be idle.

In an example, Type 1 channel access procedure (Type 1 LBT or CAT4 LBT, e.g. LBT with random back-off with a contention window of variable size) may be implemented.

The time duration spanned by the sensing slots that are sensed to be idle before a SL transmission(s) based on Type 1 LBT is random. A UE may transmit a SL transmission using Type 1 channel access procedure after first sensing the channel to be idle during the slot durations of a defer duration $T_d$, and after a counter N is zero. The UE may adjust the counter N by sensing the channel for additional slot duration(s) according to the steps described below.

Type 1 channel access procedure may be applicable to SL transmissions comprising PSCCH and/or PSSCH and/or PSFCH transmission and/or SL-SSB. In an example, the SL transmission may be schedule by the base station (e.g., mode 1). In an example, the SL transmission may be determined by the UE (e.g., mode 2).

Type 2 channel access procedure (e.g., Type 2A and/or Type 2B and/or Type 2C) may be applicable to SL transmissions comprising PSCCH and/or PSSCH and/or PSFCH transmission and/or SL-SSB. In an example, the SL transmission may be schedule by the base station (e.g., mode 1). In an example, the SL transmission may be determined by the UE (e.g., mode 2).

In Type 1 channel access procedure, the transmitting device may draw/determine a random number N within a contention window (e.g., $N=N_{init}$, where $N_{init}$ is a random number uniformly distributed between 0 and $CW_p$). The size of contention window may be specified by the minimum and maximum value of N, e.g., based on a channel access priority class (CAPC) associated with the corresponding SL transmission. The transmitting device may vary the size of the contention window when drawing the random number N. The random number N may be used in the LBT procedure to determine the duration of time that the channel is sensed to be idle before the transmitting device transmits on the channel. The UE may choose to decrement the counter, e.g., set N=N −1, if N>0. The UE may sense the channel for an additional slot duration. For example, if the additional slot duration is idle, the UE may stop if N=0. For example, if the additional slot duration is idle, the UE may decrement the counter N if N>0. For example, if the additional slot duration is busy (not idle), the UE may sense the channel until either a busy slot is detected within an additional defer duration $T_d$ or all the slots of the additional defer duration $T_d$ are detected to be idle. In an example, if the channel is sensed to be idle during all the slot durations of the additional defer duration $T_d$, the UE may stop if N=0. In an example, if the channel is sensed to be idle during all the slot durations of the additional defer duration $T_d$, the UE may decrement the counter N if N>0. In an example, if the channel is sensed to be idle during all the slot durations of the additional defer duration $T_d$, the UE may sense the channel until either a busy slot is detected within an additional defer duration $T_d$ or all the slots of the additional defer duration $T_d$ are detected to be idle.

In an example, if a UE has not transmitted a SL transmission on a channel on which SL transmission(s) are performed after the above LBT procedure is stopped, the UE may transmit a transmission on the channel, if the channel is sensed to be idle at least in a sensing slot duration $T_{sl}$ when the UE is ready to transmit the transmission and/or if the channel has been sensed to be idle during all the slot durations of a defer duration $T_d$ immediately before the transmission. In an example, if the channel has not been sensed to be idle in a sensing slot duration $T_{sl}$ when the UE first senses the channel after it is ready to transmit, and/or if the channel has not been sensed to be idle during any of the sensing slot durations of a defer duration $T_d$ immediately before the intended transmission, the UE resets the counter (e.g., set $N=N_{init}$) after sensing the channel to be idle during the slot durations of a defer duration $T_d$.

In an example, the defer duration $T_d$ may consists of duration $T_f=16$ μs immediately followed by $m_p$ (m_p) consecutive slot durations, where each slot duration is $T_{sl}=9$ μs, and $T_f$ includes an idle slot duration $T_{sl}$ at start of $T_f$. The value of $m_p$ may depend on a channel access priority class of the corresponding SL transmission.

In an example, the value/size of the contention window $CW_p$ may be determined/adjusted based on a channel access priority class (CAPC) of the corresponding SL transmission, e.g., $CW_{min,p} \leq CW_p \leq CW_{max,p}$, where $CW_{min,p}$ and $CW_{max,p}$ are based on the CAPC. In an example, $CW_{min,p}$ and $CW_{max,p}$ are chosen before the channel access procedure. In an example, $m_p$, $CW_{min,p}$, and $CW_{max,p}$ are based on a channel access priority class (CAPC p) as shown in the Table of FIG. 30.

FIG. 30 shows an example of channel access priority classes for SL channel access procedure. The channel access priority class (CAPC p) may be signaled to the UE by the base station and/or another UE. The CAPC may be provided by the higher layers (e.g., MAC or RRC layer). In an example, the UE may determine the CAPC, e.g., based on one or more priorities (e.g., PHY priority and/or logical channel priority) of one or more SL transmissions (e.g., the corresponding SL transmission). The table in FIG. 30 shows the allowed values of contention window size for a CAPC p. The table in FIG. 30 further shows values of $T_{slm,cot,p}$ for a CAPC p, which indicates a maximum duration for a channel occupancy time (COT) obtained by the channel access procedure based on the corresponding CAPC p.

A UE may obtain/initiate a channel occupancy time (COT) in response to successful LBT, e.g., a successful Type 1 channel access procedure, performed for a sidelink transmission. A maximum duration of the COT may be based on the CAPC of the sidelink transmission based on which the UE performed the LBT/Type 1 channel access procedure, as shown in FIG. 30. The COT may comprise one or more transmissions and/or receptions by the UE, e.g., SL and/or UL and/or DL transmissions. The UE may share the COT with one or more other UEs and/or the base station. For example, one or more second transmission by the one or more other UEs and/or the base station may follow the sidelink transmission that initiated the COT. The total Channel Occupancy Time of transmission(s) obtained by the channel access procedure, e.g., including the following DL/UL transmission and/or SL transmissions by other UEs if the UE sets 'COT sharing indication' in SCI/MAC-CE to '1', may not exceed $T_{slmcot,p}$ (T_slm cot,p).

In an example, a transmission burst(s) may comprise a continuous (unicast, multicast, broadcast, and/or combination thereof) transmission on a carrier component (CC). A first transmission burst(s) may be a continuous transmission from a first device (e.g., a base station in Uu interface, a wireless device in Uu interface, and/or a transmitting device in a sidelink communication) to a second device (e.g., a base station in Uu interface, a wireless device in Uu interface, and/or a receiving device in a sidelink communication) on the channel of the CC in an unlicensed/shared band. A second transmission burst(s) may be a continuous transmission from the second device (e.g., a base station in Uu interface, a wireless device in Uu interface, and/or a transmitting device in a sidelink communication) to the first device (e.g., a base station in Uu interface, a wireless device in Uu interface, and/or a receiving device in a sidelink communication) on the channel of the CC in the unlicensed/shared band. In an example, the first transmission burst(s)

and the second transmission burst(s) on the channel in the unlicensed/shared band may be scheduled in a TDM manner over the same unlicensed/shared band. Switching between the first transmission burst and the second transmission burst(s) may require a channel access procedure (e.g., Type 1 LBT, Type 2 LBT, Type 2A LBT, Type 2B LBT, and/or Type 2C LBT). For example, an instant in time may be part of the first transmission burst or the second transmission burst.

COT sharing may comprise a mechanism by which one or more devices share a channel, in an unlicensed/shared band, that is sensed as idle by at least one of the one or more devices. For example, one or more first devices may occupy the channel based on a first type of channel access procedure (e.g., Type 1 LBT: the channel is sensed as idle based on a Type 1 LBT, or a successful Type 1 channel access procedure). The one or more first devices may initiate the COT for a duration which is shorter and or equal to a maximum COT duration (MCOT limit). The maximum COT duration may be based on a CAPC of the first type channel access procedure used for initiating the COT. One or more second devices may use and/or share, for a transmission of the one or more second devices, the channel using a second type of channel access procedure (e.g., Type 2/2A/2B/2C LBT) within the duration of the COT.

In an example, Type 1 channel access procedure may be used to initiate a COT. In an example, Type 2 channel access procedure (Type 2A LBT, Type 2B LBT, and/or Type 2C LBT) may be used for transmissions within a duration of the COT. For example, Type 2 channel access procedure may be used by the COT initiator UE for the following transmissions after the COT is initiated. For example, Type 2 channel access procedure may be used by the COT sharing UE(s) for the following transmissions based on COT sharing.

In an example, various types of LBT/channel access procedures may be employed for Channel occupancy time (COT) sharing. A transmitting device (e.g., a base station in Uu interface, a wireless device in Uu interface, and/or a transmitting device in a sidelink communication) may transmit a grant (e.g., uplink grant and/or a sidelink grant) to a receiving device (e.g., a base station in Uu interface, a wireless device in Uu interface, and/or a receiving device in a sidelink communication). For example, the grant (e.g., uplink grant and/or a sidelink grant) may comprise an indication of the COT sharing and/or a type of LBT (e.g., Type 2 LBT, Type 2A LBT, Type 2B LBT, and/or Type 2C LBT) to be used for the receiving device (e.g., COT sharing device) during the COT acquired and/or shared by the transmitting device.

In an example, a regulation of certain region(s), e.g., Europe and Japan may prohibit continuous transmission in the unlicensed band and may impose limits on the COT, e.g., the maximum continuous time a device may use the channel. The maximum continuous time in which the device gains an access based on LBT procedure and uses the channel may be referred to as a maximum channel occupancy time (MCOT). The MCOT in the 5 GHz band may be limited to a certain period, e.g., 2 ms, 4 ms, or 6 ms, depending on the channel access priority class, and it may be increased up to 8-10 ms.

The MCOT in the 60 GHz band may be 9 ms. For example, the regulation (e.g., for the 5 GHz and 60 GHz bands) may allow the device (e.g., a wireless device of a Uu interface and/or a transmitting wireless device in a sidelink communication) to share the COT with the associated devices. For example, the associated device may be a wireless device and/or a base station in the Uu interface. For example, the associated device may be a wireless device of the sidelink (e.g., unicast, multicast, and/or broadcast) communication. For example, the device may get an (e.g., initial) access to the channel through the LBT procedure, e.g., for COT (or MCOT). The device may transmit, to the associated device, a control message and/or a control signal indicating sharing the COT (or MCOT) with the associated device and/or remaining duration of the COT, and starting/ending times (e.g., in terms of symbol(s), slot(s), SFN(s), and/or a combination thereof) of the shared COT that the associated device can use/share the channel. The associated device may skip (e.g., may not perform) the CCA check and/or may perform Type 2C LBT procedure on the channel during the shared COT. The associated wireless device may transmit data via the channel during the shared COT based on a particular LBT type. The particular LBT type may comprise Type 2A, Type 2B, and/or Type 2C. For example, the MCOT may be defined and/or configured per priority class, logical channel priority, and/or device specific.

In an example, a first device may gain an access to a channel through a channel access procedure for a first (e.g., UL, DL, and/or sidelink) transmission in an unlicensed band. The channel access procedure may be based on a first type of channel access procedure (e.g., Type 1 LBT/channel access procedure). The first device may initiate a COT duration if the channel access procedure is successful and/or indicates an idle channel. If the first device shares, with a second device, the COT, the second device may perform a second (e.g., UL, DL, and/or sidelink) transmission with a dynamic grant and/or a configured grant (e.g., Type 1 and/or Type 2) based on a second channel access procedure that the second device performs on the channel shared by a first device. The second channel access procedure may be based on a second type of channel access procedure (e.g., Type 2/2A/2B/2C LBT/channel access procedure). The second device may use and/or occupy, e.g., by performing UL, DL, and/or sidelink transmission, the channel during a remainder duration of the shared COT. For example, the first device performing the first transmission based on a configured grant (e.g., Type 1, Type 2 SL) may transmit a control information (e.g., DCI, UCI, SCI, and/or MAC CE) indicating the COT sharing. The COT sharing may comprise switching, within a (M)COT, from the first transmission (e.g., UL, DL, and/or sidelink transmission) of the first device to the second transmission (e.g., UL, DL, and/or sidelink transmission) of the second device. A starting and/or ending time of the second transmission in the COT sharing, e.g., triggered by the first device, may be indicated in one or more ways. For example, one or more parameters in the control information may indicate the starting time of the COT sharing at which the second device starts to access the channel and/or an ending time of the COT sharing at which the second device terminates/ends to use the channel. For example, resource configuration(s) of configured grant(s) may indicate the starting time and/or the ending time.

Figure 31:
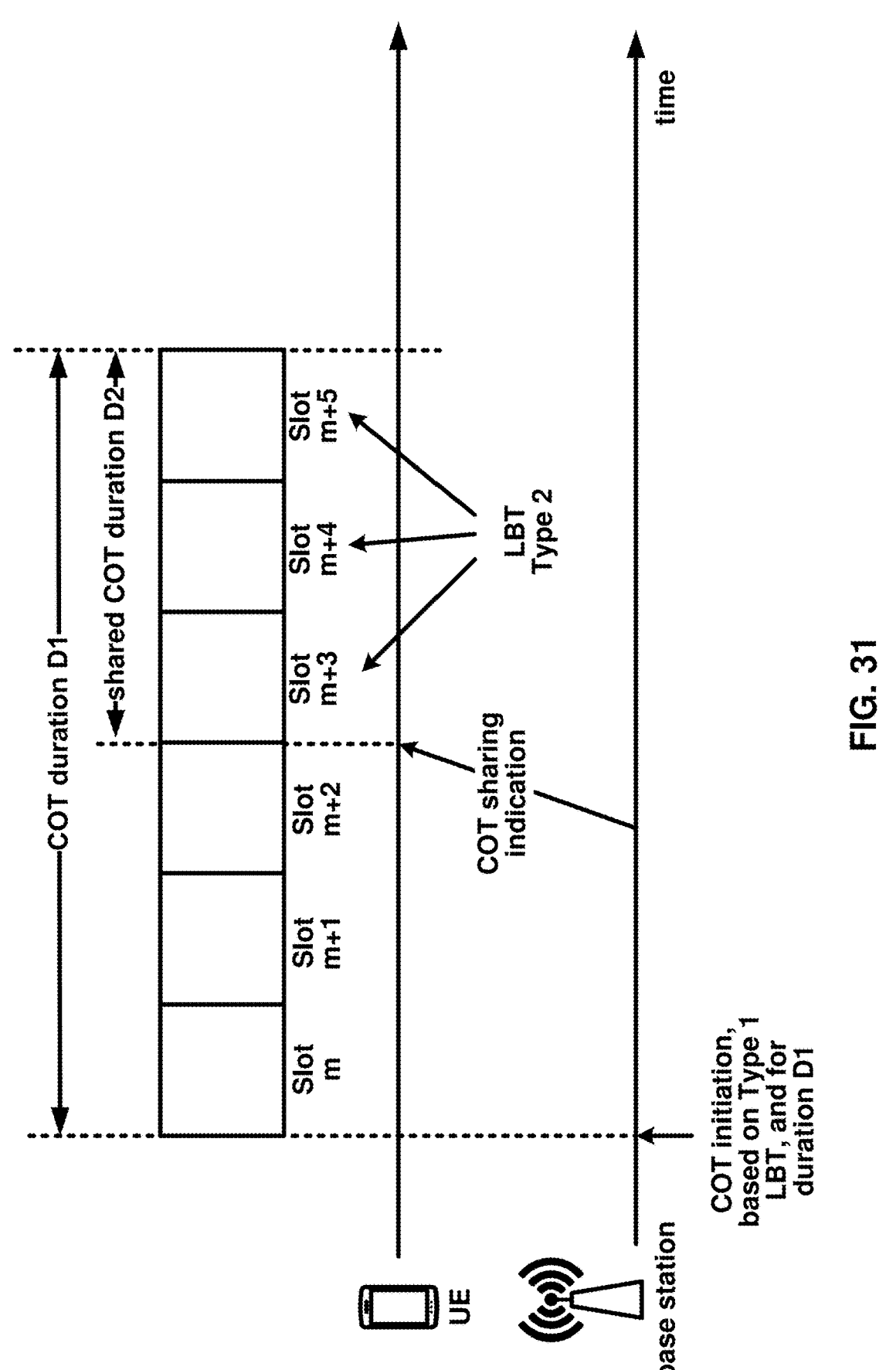
FIG. 31 shows an example of COT sharing between a base station and a wireless device.

FIG. 31 shows an example of COT sharing between a base station and a wireless device. The base station may perform a first LBT based on a first type of LBT (e.g., Type 1 LBT) on a channel before a first transmission (e.g., a DL transmission) via the channel in slot m. The first LBT may be based on a CAPC associated with the first transmission. The base station may transmit the first transmission if the first LBT on the channel is successful. The base station may initiate a COT/COT duration based on the first LBT. A duration of the COT (D1 in FIG. 31) may be less than or equal to a maximum COT (MCOT) duration. The MCOT duration may be based on the CAPC of the first transmission. In the example, of FIG. 31, MCOT for the corresponding CAPC may be 6 slots. The base station may have access to the channel for the (M)COT duration. In this example, the base station may transmit via the channel during slot m and slot m+1 and slot m+2. The base station may perform a second LBT based on a second type of LBT (e.g., Type 2/2A/2B/2C LBT) on the channel before one or more second transmissions, following the first transmission, in slot m+1 and slot m+2. The base station may share the access to the channel during the remainder of the (M)COT duration. In the example of FIG. 31, the base station may determine the remainder duration of the COT, e.g., 3 slots of slot m+3 to slot m+5, as a duration of the shared COT, D2. For example, the base station may transmit a signal, e.g., control signal/DCI/MAC-CE, to a wireless device, indicating COT sharing. The signal may comprise the COT sharing information. For example, the signal may indicate to the wireless device that the channel is shared with the wireless device for the shared COT duration, D2. The COT sharing information may indicate the shared COT duration and/or a starting time of the shared COT (e.g., beginning/a first symbol of slot m+3) and/or an ending time of the shared COT (e.g., end/a last symbol of slot m+5). The UE may transmit one or more third transmissions (e.g., UL and/or SL transmissions) on the channel within the shared COT duration. The UE may perform one or more third LBTs based on one or more second types of LBT (e.g., Type 2/2A/2B/2C LBT) on the channel before the one or more third transmissions. The second type of LBT may require shorter/no sensing compared to the first type, and thus, result in more chance of LBT success within the (shared) COT duration. The UE or the base station may not transmit any transmissions based on the second type of LBT that goes beyond the MCOT duration limit. The UE may determine the MCOT limit based on the CAPC indicated in the COT sharing information.

A UE may be configured with sidelink resource allocation mode 1, comprising dynamic grant, Type 1 configured grants and/or Type 2 configured grants, for sidelink operation in a shared carrier, subject to applicable regional regulations. In operation with shared spectrum channel access (e.g., at least in dynamic channel access), SL UE performs Type 1 LBT and/or one of the Type 2 LBTs (e.g., Type 2A/Type 2B/Type 2C) before a SL transmission using the allocated resource(s), in compliance with transmission gap and LBT sensing idle time requirements.

A UE may be configured with sidelink resource allocation mode 2, comprising dynamic grant, Type 1 configured grants and/or Type 2 configured grants, for sidelink operation in a shared carrier, subject to applicable regional regulations. In operation with shared spectrum channel access (e.g., at least in dynamic channel access), SL UE performs Type 1 LBT and/or one of the Type 2 LBTs (e.g., Type 2A/Type 2B/Type 2C) before a SL transmission using the selected and/or reserved resources, in compliance with transmission gap and LBT sensing idle time requirements.

In SL resource allocation mode 1, the UE may use a type of channel access procedure, from the plurality of types of channel access procedures (e.g., Type 1 LBT, Type 2 LBT, Type 2A LBT, Type 2B LBT, and/or Type 2C LBT) for a sidelink transmission, that is indicated in a SL grant scheduling the sidelink transmission (e.g., via DCI or SCI). In SL resource allocation mode 2, the UE may use a first type of channel access procedure (e.g., Type 1 LBT) from the plurality of types of channel access procedures, for a sidelink transmission (e.g., via PSSCH, PSCCH, and/or PSFCH) unless one or more conditions are met. A UE may use a first type of LBT (e.g., Type 1 channel access procedures) for transmitting transmissions in a sidelink resource pool, including PSSCH transmission and/or PSCCH transmission and/or PSFCH transmission, unless one or more conditions are met.

For example, the UE may perform Type 1 channel access procedure for a sidelink transmission (e.g., via PSSCH/PSCCH) unless the sidelink transmission is within a duration of a COT. For example, the UE may perform Type 2 channel access procedure (e.g., Type 2A/Type 2B/Type 2C) for a sidelink transmission (e.g., via PSSCH/PSCCH) that is within the duration of the COT. In an example, the COT may be initiated by the UE. In an example, the COT may be a shared COT. For example, a second UE may share the COT with the UE. For example, the UE may receive a signal (e.g., a first stage SCI and/or a second stage SCI and/or a MAC-CE) indicating a shared COT, e.g., a starting/ending time and/or duration of the COT in time domain. The UE may be an intended recipient/destination of the signal.

A UE may initiate a COT, based on a Type 1 LBT/channel access procedure, with a first duration which is limited by a maximum COT (MCOT) duration. The MCOT duration is based on a CAPC of the Type 1 LBT/channel access procedure. The UE may share a portion/subset of the COT duration, e.g., remainder of the COT duration referred to as a shared COT duration, with one or more second UEs. For example, the UE may share a first portion of the remainder of the COT as a first shared COT duration with a first UE. For example, the UE may share a second portion of the remainder of the COT as a second shared COT duration with a second UE. For example, the UE may share a third portion of the remainder of the COT as a third shared COT duration with a third UE, and so forth. In an example, the UE may share a fourth portion of the remainder of the COT as a fourth shared COT duration with a group of UEs (e.g., based on groupcast/multicast/broadcast signaling and/or based on multiple unicast signaling). The duration of the COT may comprise one or more durations, each corresponding to a shared COT. In an example, durations of two shared COTs, associated with a same COT, may not overlap in time (e.g., shared COTs may be disjoint). In an example, durations of two shared COTs, associated with a same COT, may be contiguous (e.g., no gap beyond a threshold (e.g., 16 μs or 25 μs) between the shared COTs). In an example, durations of two shared COTs, associated with a same COT, may overlap in time (e.g., shared COTs may not be disjoint).

For example, the UE may perform Type 1 channel access procedure for a transmission that is not within a duration of a COT. For example, the UE may perform Type 1 channel access procedure for a first transmission on a channel. In response to a successful LBT result, the UE may initiate a COT. A duration of the COT may be associated with the parameters of the Type 1 channel access procedure that was used to initiate the COT (e.g., the CAPC).

Type 2A channel access procedure may be applicable to transmission(s) by a UE following transmission(s) by another UE, for a gap≥25 μs, in a shared channel occupancy (shared COT). Type 2B channel access procedure may be applicable to transmission(s) by a UE following transmission(s) by another UE at least when the gap is 16 μs in a shared channel occupancy. Type 2C channel access procedure may be applicable to transmission(s) by a UE following transmission(s) by another UE for a gap 16 μs in a shared channel occupancy and/or when the duration of the corresponding transmission is at most 584 μs.

Multi-consecutive slots transmission (MCSt) may be used for Mode 1 and/or Mode 2 resource allocation in SL-unlicensed (SL-U) operations. MCSt may help to maintain an acquired/initiated COT easily, by back-to-back transmissions.

UE-to-UE COT sharing may be configured for sidelink operation in a shared channel (SL-U). For example, a UE may receive RRC message(s), from the base station and/or another UE, comprising SL configuration parameters indicating that UE-to-UE COT sharing is enabled for a sidelink carrier/BWP/resource pool/channel/signal. One or more SL channels and/or signals (e.g., PSCCH/PSSCH, PSFCH, S-SSB) may be applicable for shared COT access. For example, a UE may be allowed to share a COT with another UE, who sends the COT sharing indication, only if the UE (e.g., responding/COT sharing UE) has a PSCCH and/or PSSCH and/or PSFCH and/or S-SSB transmission within the shared COT (e.g., immediately after the COT is shared).

In an example of UE-to-UE COT sharing, a responding SL UE may use/utilize a COT shared by a COT initiating UE when the responding SL UE is a target receiver of the at least COT initiating UE's PSSCH data transmission in the COT. In an example of UE-to-UE COT sharing, a responding SL UE may use/utilize a COT shared by a COT initiating UE when the responding SL UE is a target receiver of the COT initiating UE's transmission in the COT. The responding UE may use the shared COT for its transmission that has an equal or smaller CAPC value than the CAPC value indicated in a shared COT/COT sharing information. The CAPC value indicated in the COT sharing information may be the CAPC of a first transmission, by the COT initiator UE, based on which the COT is initiated. The CAPC value indicated in the COT sharing information may be a highest CAPC of transmissions performed or allowed within the duration of the COT. In an example, when a responding UE uses a shared COT for its transmission(s), the COT initiating UE is a target receiver of the responding UE's transmission(s).

In an example, a base station may initiate a COT and share a portion/remainder of the COT duration with the UE for operation in sidelink. For example, the base station may transmit a control signal/message (e.g., DCI and/or MAC-CE) to the UE, comprising the COT sharing indication/information. The COT may comprise time/frequency resources of a resource pool in a sidelink BWP/carrier.

In an example, a first UE may only be allowed to share a COT if the COT is initiated by a PSSCH transmission and/or PSCCH transmission and/or S-SSB transmission and/or PSFCH transmission. In an example, a second/responding UE may only be allowed to share the indicated COT if the second/responding UE's (first) transmission within the shared COT is a PSSCH transmission and/or PSCCH transmission and/or S-SSB transmission and/or PSFCH transmission.

In an example, a base station may relay/forward a UE initiated COT to another UE. In an example, a Mode 1 UE may report a COT and/or related information to a base station for aiding Mode 1 resource allocation/scheduling.

In an example, a UE may perform/use CP extension (CPE) for NR sidelink operation in a shared channel, e.g., to fill a gap within a (shared) COT, and/or between the end of the LBT procedure and the start of the SL transmission to retain channel access.

Throughout this disclosure, COT sharing may refer to sending/transmitting signal(s) by a device/station, who has initiated or acquired or obtained a COT on a channel, to another device(s)/station(s), to indicate that a portion/remainder of the COT is shared with the other device(s)/station(s). The signal may be referred to as or may comprise COT sharing information. A SCI (e.g., first stage SCI and/or second stage SCI) and/or a MAC-CE may comprise the signal indicating the COT sharing information.

The COT sharing information may comprise a field/parameter indicating whether a COT is shared or not. In an example, a first value of the field/parameter may indicate that the COT is shared with the UE. In an example, a second value of the field/parameter may indicate that the COT is not shared with the UE. The COT sharing information may comprise a second field indicating a duration of the shared COT. The second field may indicate a duration of (the remainder/portion of) a COT initiated by the COT initiator UE. For example, the duration may be shared/provided to the responding/COT sharing UE for its access to the channel. The duration may be/comprise one or more (SL) slots and/or one or more (SL) symbols. For example, the second field may indicate a first number of (consecutive) SL slots and/or a second number of (consecutive) SL symbols, within the initiated/acquired/obtained COT, to be shared with the responding/COT sharing UE(s). In an example, the second field may indicate the duration in milli/micro seconds. In an example, the second field may indicate a first number of (consecutive) slots and/or a second number of (consecutive) symbols, comprising SL slots/symbols. For example, the responding/COT sharing UE may determine the duration of the shared COT based on intersection of the indicated slots/symbols and SL slot/symbols. The COT sharing information may comprise a third field indicating a starting time/location of the shared COT. For example, the third field may indicate an offset (e.g., a number of slots/symbols) from a reference point/time to the starting time of the shared COT. The reference point/time a be a slot/symbol when the SCI/MAC-CE/signal comprising the COT indication information is received/detected. The second/responding/COT sharing UE may determine a location/starting time/ending time/duration of the shared COT based on reference point/time and/or the indicated duration of the shared COT. For example, the second/responding/COT sharing UE may determine the starting time of the shared COT by applying the indicated offset to the end of the slot where the COT sharing information is detected. The Cot sharing may be used after the determined starting time, e.g., for the duration of the shared COT. In an example, the duration of the shared COT may be pre-defined (e.g., always x slots, x=1,2, . . . ). In an example, an RRC/SIB message, received from the base station/wireless device, may comprise a parameter indicating the duration of the shared COT.

The shared COT may refer to a portion/subset of a COT (initiated/acquired/obtained by a first UE) that is shared, e.g., by the first UE, with one or more second UE. The one or more second UEs may have access to the shared (portion/subset of the) COT. The one or more second UEs may transmit one or more SL/UL transmissions within a duration of the shared (portion/subset of the) COT.

For unlicensed sidelink operation (e.g., SL-U), the existing COT sharing mechanism may no longer work, e.g., due to the hidden node problem. In fact, in sidelink, especially sidelink operation mode 2, as opposed to Uu link, there is no centralized scheduler of the network (as a base station) that coordinate the COT sharing between wireless devices, and the resource allocation is performed based on sensing and reservation. However, since the sensing and reservation mechanism is operable within a sensing/communication range of a device, there is always the issue of hidden node, whose transmissions/reservations may not be detected by a wireless device initiating COT sharing and/or receiving a shared COT. This may result in interruption of a COT and/or a shared COT. Such problem doesn't exist in the existing technologies of centralized COT sharing.

Figure 32:
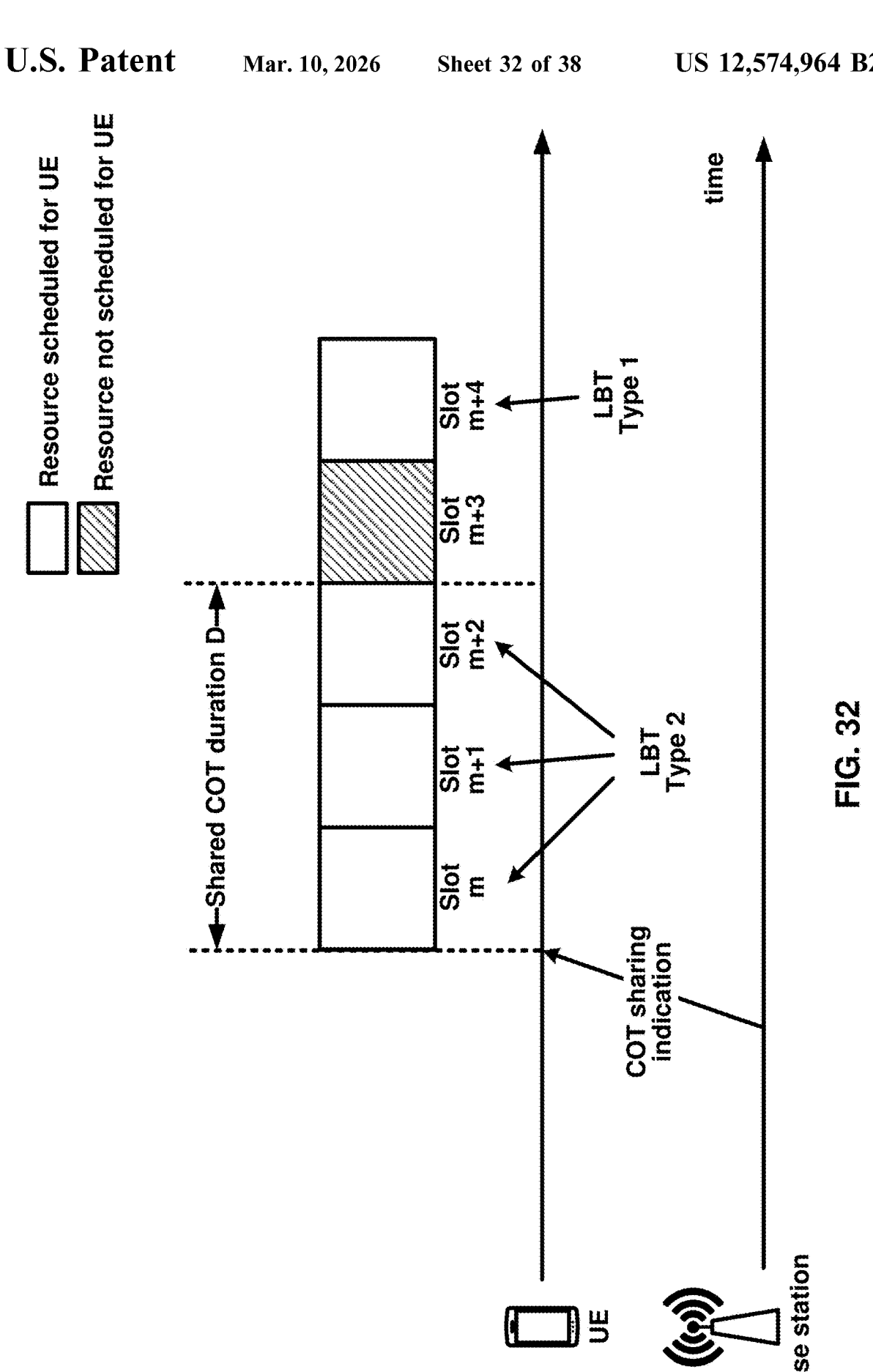
FIG. 32 shows an example of COT sharing between a base station and a UE.

FIG. 32 shows an example of COT sharing between a base station and a UE. As shown in this example, the base station, initiating a COT, may transmit a signal (e.g., DCI/MAC-CE) to the UE comprising a COT sharing indication. For example, the signal may indicate COT sharing information for the UE. The COT sharing indication/information may indicate a shared COT duration, D (e.g., portion/duration of the COT that is shared with the UE). In this example, D is 3 slots. For example, the UE may determine (a location of) the shared COT, based on the COT sharing indication, to be over slot m, slot m+1, and slot m+2. Based on the existing technology, the UE may transmit transmissions (e.g., SL and/or UL) within the duration of the (shared) COT, e.g., in slot m to slot m+2, using a particular type of channel access procedure (Type 2 LBT/channel access procedure). The UE may determine, e.g., based on starting time and/or duration indicated by the COT sharing information, that the shared COT expires/ends at the end of slot m+2. The UE may have a second transmission after the expiration/end of the (shared) COT, e.g., in slot m+4. Based on the existing technology, the UE may transmit the second transmission, outside the duration of the (shared) COT, using another type of channel access procedure (Type 1 LBT/channel access procedure).

The above-mentioned COT sharing with the UE may work without problems, basically because the base station is the scheduler of the network and can guarantee the resources within the shared COT to be available for transmission by the UE. For example, as shown in FIG. 32, transmissions occasions/resources within the shared COT, e.g., in slot m, slot m+1 and slot m+2, are allocated to the UE. For example, the base station may send control signals indicating that resources in the slot m, slot m+1 and slot m+2 are scheduled for the UE's transmissions. Thus, no transmission by other UEs may interrupt the shared COT. In the example of FIG. 32, the resource in slot m+3 is not allocated to/scheduled for the UE, e.g., the base station may schedule a second UE's transmission/reception in slot m+3. However, the base station can guarantee that the seconds UE's transmission/reception is located outside the shared COT of this UE, e.g., does not overlap with the duration of the shard COT. However, in unlicensed sidelink operation, a COT initiator UE may not be able to guarantee this, e.g., due to the hidden node problem.

Figure 33:
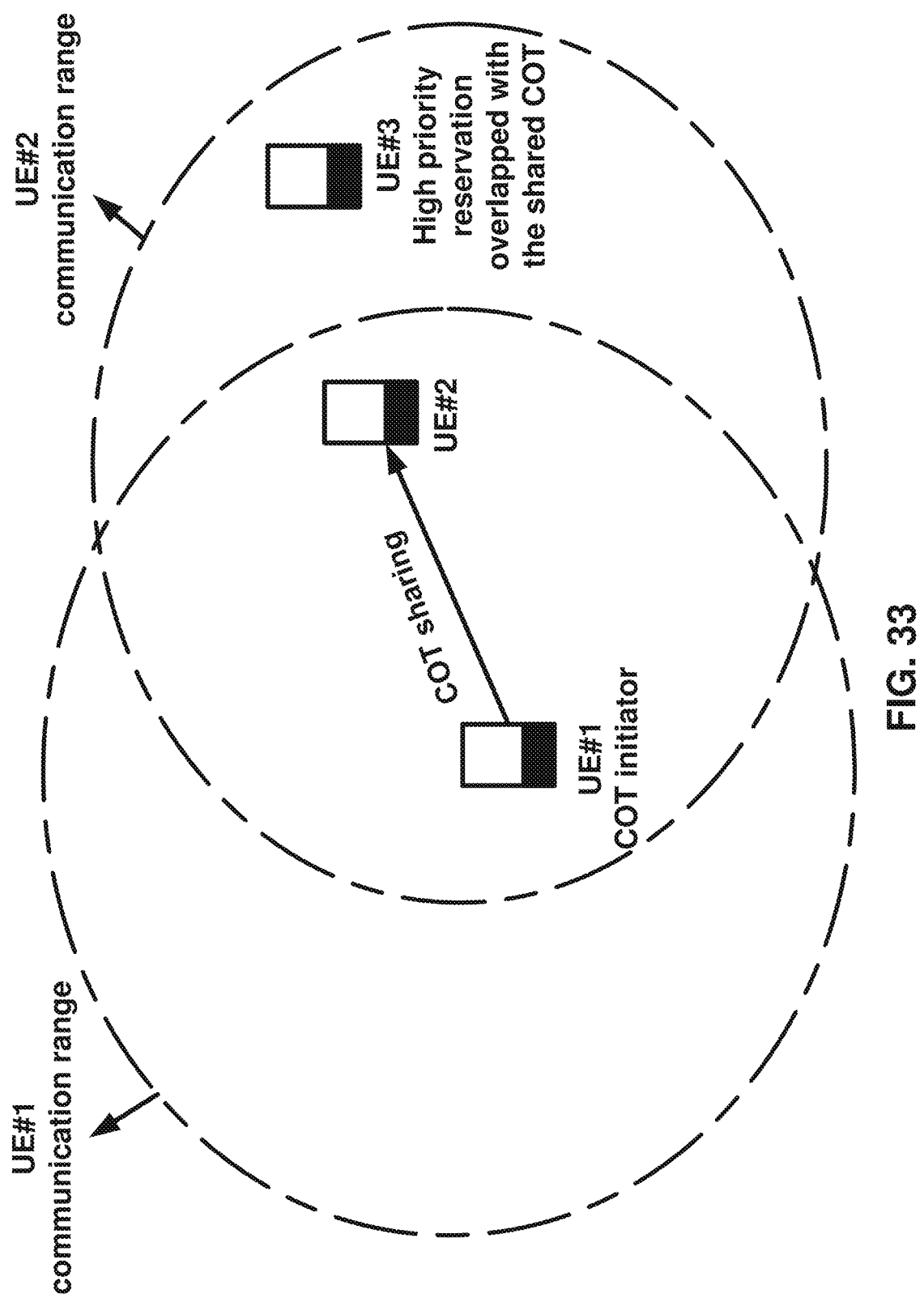
FIG. 33 shows an example of sidelink UEs operating in unlicensed spectrum.

FIG. 33 shows an example of sidelink UEs operating in unlicensed spectrum. As shown in the figure, UE #1 may initiate a COT and share it with UE #2. UE #2 may be within a communication and/or sensing range of UE #1. For example, UE #1 may be able to detect reservations of UE #2 and vice versa. For example, UE #1 may be able to transmit/receiver signals to/from UE #2. Therefore, UE #1 and UE #2 may be able to gain/retain access to a same channel based on COT sharing, e.g., during a mutual/shared channel occupancy time. However, as shown in the example, UE #3 is outside/not within the communication and/or sensing range of UE #1. For example, UE #1 may be able to detect reservations of UE #3 and vice versa. For example, UE #1 may be able to transmit/receiver signals to/from UE #3. Therefore, UE #3 may be a hidden node to UE #1, and UE #1 and UE #3 may not be able to gain/retain access to a same channel based on COT sharing. Nevertheless, as shown in FIG. 33, UE #3 in within the communication/sensing range of UE #2. For example, UE #2 may be able to detect reservations of UE #3 and vice versa. For example, UE #2 may be able to transmit/receiver signals to/from UE #3. For example, transmissions from UE #3 may interfere transmissions or receptions of UE #2.

In the example of FIG. 33, if UE #1 shares a COT with UE #2, based on the existing technologies, the shared COT duration may overlap with a reservation/transmission of UE #3. This may happen because UE #3 is outside the communication/sensing range of UE #1, and UE #1 is not able to detect the reservation by UE #3. However, since UE #3 is within the communication/sensing range of UE #2, UE #2 may detect the reservation of UE #3 that overlaps with the shared COT received from UE #1. However, based on the existing technology, UE #2 may not transmit during/via the resource that is reserved by UE #3. For example, the reservation by UE #3 may have a higher priority than UE #2 transmission. As a result, UE #2 may pre-empt/not transmit via a slot within the shared COT. This results in a long gap (e.g., longer than the threshold for retaining a COT consistency) within the duration of the COT. Thus, the COT will be interrupted or lost. This issue may impact the sidelink operation in unlicensed spectrum.

Based on the existing technology, a UE may perform a particular type of LBT/channel access procedure (e.g., Type 2/2A/2B/2C LBT) for a transmission within a duration of a COT/shared COT. This short LBT is allowed based on the regulations, as long as the COT consistency/continuity is retained and there is no gap larger than a pre-defined/configured threshold (e.g., 16 μs or 25 μs). In the existing technology, the COT consistency/continuity can be guaranteed because of a centralized scheduling mechanism, however, in SL-U, the COT consistency/continuity cannot be guaranteed because of a decentralized scheduling mechanism. Therefore, a initiated/shared COT duration may be interrupted or lost at some point due to hidden node, or to a overriding of a higher priority transmission by another UE (not sharing the COT). However, the responding/COT sharing UE (e.g., UE #2 in FIG. 33) may have another transmission after the interruption and within the indicated duration of the shared COT. The existing technology fails to address the type of LBT that should be used for such transmission.

Figure 34:
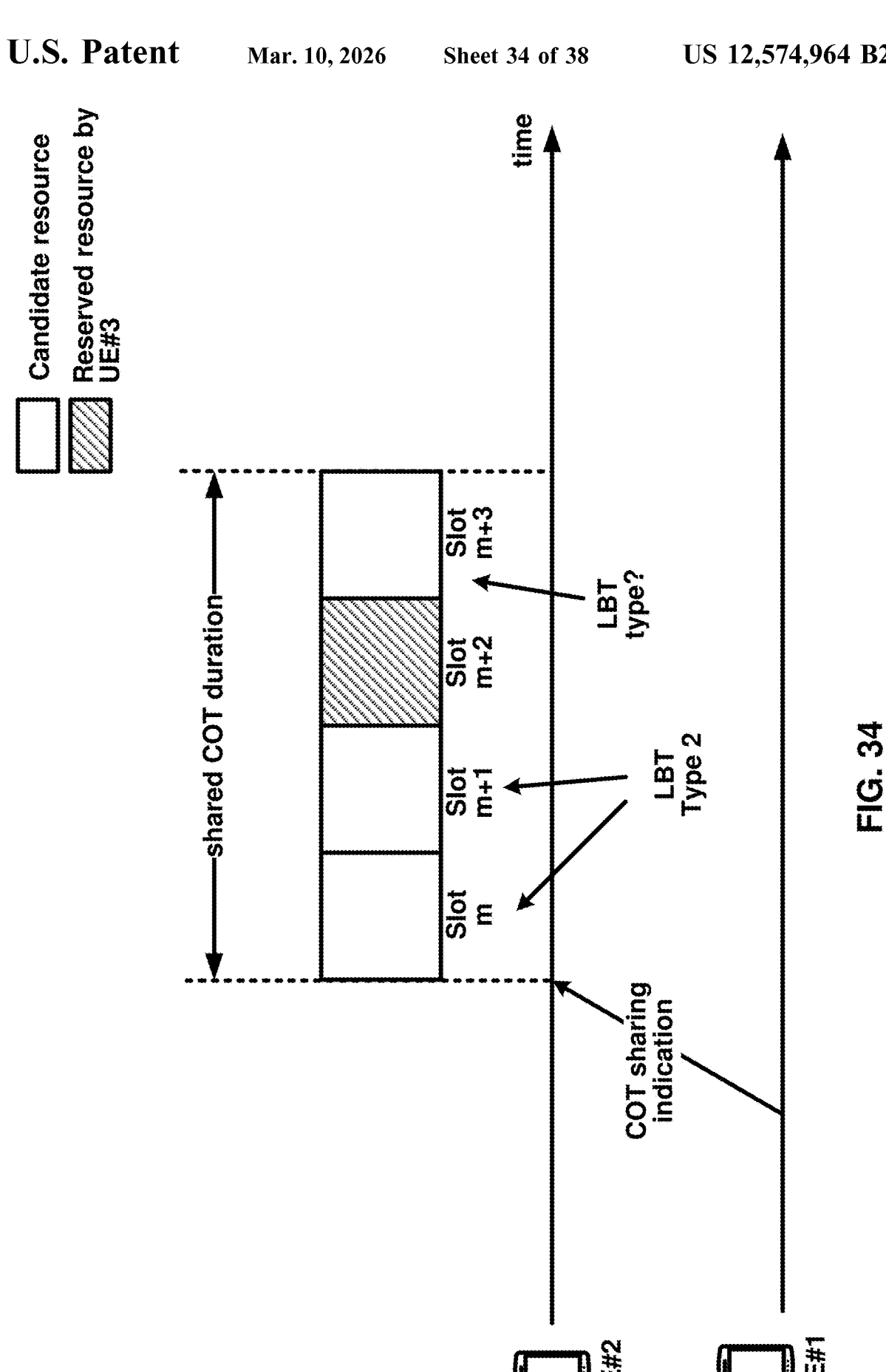
FIG. 34 shows an example of UE-to-UE COT sharing in SL-U.

FIG. 34 shows an example of UE-to-UE COT sharing in SL-U. As shown in this example, a first UE (UE #1), initiating a COT, may transmit a signal (e.g., SCI/MAC-CE) to a second UE (UE #2) comprising a COT sharing indication. For example, the signal may indicate COT sharing information for the second UE. The COT sharing indication/information may indicate a shared COT duration (e.g., portion/duration of the COT that is shared with the second UE). In this example, the shared COT duration is 4 slots. For example, the second UE may determine (a location of) the shared COT, based on the COT sharing indication, to be over slot m, slot m+1, slot m+2, and slot m+3. For example, the second UE may have selected and/or indicated reservation of resources in slot m, slot m+1, slot m+2, and slot m+3. Based on the existing technology, the second UE may transmit transmissions (e.g., SL and/or UL) within the duration of the (shared) COT, e.g., in slot m to slot m+3, using a particular type of channel access procedure (Type 2 LBT/channel access procedure). The second UE may determine, e.g., based on starting time/location and/or duration indicated by the COT sharing information, that the shared COT expires/ends at the end of slot m+3. In an example, the second UE may determine a reservation of a resource in slot m+2. For example, the second UE may detect a SCI from a third UE (UE #3) indicating reservation of the resource in slot m+2. For example, the reservation may indicate a higher PHY priority than the second UE's intended transmission in slot m+2. Based on the existing technology, the second UE may pre-empt and/or not transmit via slot m+2. However, the second UE may determine that the resource in slot m+3 is available for transmission. Based on the existing technology, since the transmission occasion in slot m+3 in within the shared COT duration, the second UE may perform a Type 2 LBT/channel access procedure to transmit in slot m+3. However, due to the interruption caused by the third UE in slot m+2, the shared COT may be lost due to the time gap/discontinuity. Using Type 2 LBT for a transmission in slot m+3 (that is after the gap/discontinuity) is against regulations of unlicensed spectrum. Therefore, following the existing technology in such scenario may result in violation of the unlicensed spectrum regulations. Because, none of UE #1 or UE #2 is using the channel in slot m+2, and, e.g., a Wi-Fi node or NR-U/LAA UE may start their transmission in slot 2. To be fair to that Wi-Fi node or NR-U/LAA UE, the SL-U UE must perform Type 1 LBT/channel access procedure after the gap in slot m+2.

The same problem may happen if the second UE initiated the COT, and later detected the reservation by the third UE which results in the interruption of the COT.

As shown in FIG. 34, the COT interruption may result in an ambiguity of LBT/channel access type determination and/or violation of the unlicensed spectrum regulations. Embodiments propose mechanisms to address such ambiguity for LBT/channel access type determination for a transmission within a duration of a COT/shared COT, such that violation of the unlicensed spectrum regulations is avoided.

In an embodiment, a UE may determine a type of LBT procedure, among a plurality of types of LBT procedures, for a first transmission (e.g., SL transmission) via a resource/transmission occasion within a duration of a COT (e.g., initiated COT and/or shared COT), based on its sensing results and/or detected resource reservations (e.g., detected reserved resources within the COT). For example, detected reserved resources may overlap with the duration of the COT/shared COT.

In an embodiment, a UE may determine a type of LBT procedure, among a plurality of types of LBT procedures, for a first transmission (e.g., SL transmission) via a resource/transmission occasion within a duration of a COT (e.g., initiated COT and/or shared COT), based on a set of candidate resources available for intended transmission(s) within the COT, e.g., based on an intersection of the set of candidate resources and the COT/shared COT. For example, if there is a resource excluded/pre-empted from the candidate resource set that overlaps with the COT/shared COT, and the first transmission is/starts/occurs after that excluded/pre-empted resource (interrupted COT), a first type of LBT/channel access procedure (Type 1 channel access procedure) is used. For example, if there is a resource excluded/pre-empted from the candidate resource set that overlaps with the COT/shared COT, and the first transmission is/starts/occurs before that excluded/pre-empted resource (interrupted COT), a second type of LBT/channel access procedure (Type 2 channel access procedure) is used.

In an embodiment, the UE may determine a type of LBT procedure, among a plurality of types of LBT procedures, for a first transmission (e.g., SL transmission) via a resource/transmission occasion within a duration of a COT (e.g., initiated COT and/or shared COT), based on relative location and/or timing (e.g., starting time and/or ending time) of the resource/transmission occasion and a detected reserved resource. The reserved resource may be within the duration of the COT. The resource/transmission occasion for the first transmission may be within the duration of the COT. For example, the UE may detect a SCI indicating a reserved resource within the duration of the COT. In an embodiment, the UE may determine a first type of LBT/channel access procedure (e.g., Type 2 LBT/channel access procedure) for the first transmission, if the resource/transmission occasion is/occurs/starts/ends before (a first/last symbol of) the reserved resource. In an embodiment, the UE may determine a second type of LBT/channel access procedure (e.g., Type 1 LBT/channel access procedure) for the first transmission, if the resource/transmission occasion is/occurs/starts/ends after (a first/last symbol of) the reserved resource.

In an embodiment, the determination of the type of LBT/channel access procedure may be based on a comparison of a first priority of a second transmission and a second priority of the detected resource reservation. The second transmission may be an intended transmission of the UE via a second resource/transmission occasion that overlaps with (e.g., is in a same slot/mini-slot as) the reserved resource. The second transmission may be an earliest transmission within the COT that initiated the COT. The second transmission may be an earliest transmission within the shared COT (e.g., shared portion of the COT). The second transmission may be a transmission within the COT with a highest (or lowest) priority. In an embodiment, the determination of the type of LBT/channel access procedure may be based on a comparison of a first priority of the COT/shared COT and a second priority of the detected resource reservation. For example, the COT may be associated with a (PHY) priority. In an example, the COT sharing indication/information may indicate the first priority of the COT. In an example, the UE may determine the first priority of the COT (e.g., initiated by the UE or shared with the UE) based on the priority of an earliest transmission upon initiation of the COT and within the COT. In an example, the UE may determine the first priority of the COT (e.g., initiated by the UE or shared with the UE) based on the priority of a transmission within the COT that has the highest priority of transmissions within the COT. The first priority may be the highest/lowest priority allowed for a transmission within the COT.

For example, the UE may determine the first type of LBT/channel access procedure (e.g., Type 2 LBT/channel access procedure) for the first transmission, if the first resource/transmission occasion is/occurs/starts/ends after (a first/last symbol of) the reserved resource and the first priority is higher than and/or equal to the second priority of the detected resource reservation. For example, the UE may determine the second type of LBT/channel access procedure (e.g., Type 1 LBT/channel access procedure) for the first transmission, if the first resource/transmission occasion is/occurs/starts/ends after (a first/last symbol of) the reserved resource and the first priority is lower than and/or equal to the second priority of the detected resource reservation. In such cases, the COT may not be interrupted due to higher priority of the COT/second transmission.

In an embodiment, the determination of the type of LBT/channel access procedure may be based on whether the COT is shared with a third UE who has signaled the resource reservation within the COT. The UE may detect a SCI, transmitted by a third UE, indicating the resource reservation. In an example, the UE may receive the COT sharing indication/information indicating that the COT is shared with the third UE (e.g., the COT sharing indication/information may indicate the source/destination ID of the third UE as a COT recipient). In an example, the UE may determine to share the COT with the third UE. Such COT sharing may avoid the interruption of the COT, and thus, Type 2 LBT/channel access procedure may be used for a transmission after the detected reservation.

For example, the UE may determine the first type of LBT/channel access procedure (e.g., Type 2 LBT/channel access procedure) for the first transmission, if the first resource/transmission occasion is/occurs/starts/ends after (a first/last symbol of) the reserved resource and COT is shared with the third UE. For example, the UE may determine the second type of LBT/channel access procedure (e.g., Type 1 LBT/channel access procedure) for the first transmission, if the first resource/transmission occasion is/occurs/starts/ends after (a first/last symbol of) the reserved resource and COT is not shared with the third UE.

In an embodiment, the determination of the type of LBT/channel access procedure may be based on whether the UE is a destination UE of an intended transmission by the third UE via the reserved resource. For example, the UE may determine the first type of LBT/channel access procedure (e.g., Type 2 LBT/channel access procedure) for the first transmission, if the resource reservation indicated the UE as a destination UE. In this case, the COT may not be interrupted. For example, the UE may determine the second type of LBT/channel access procedure (e.g., Type 1 LBT/channel access procedure) for the first transmission, if the resource reservation does not indicate the U E as a destination UE. In this case, the COT may be interrupted.

In an embodiment, a UE may determine a length/duration of a COT (e.g., initiated by the UE and/or shared with the UE), based on its sensing results and/or detected resource reservations (e.g., detected reserved resources within the COT). For example, detected reserved resources may overlap with the duration of the COT/shared COT and may result in interruption of the COT, and thus shorted duration of the COT.

In an embodiment, the UE may receive a COT sharing indication indicating a first duration of the shared COT. In an embodiment, the UE may initiate a COT and determine a first duration for the COT, e.g., based on the corresponding CAPC. For example, the first duration may be equal to a (remainder of the) maximum COT (MCOT) duration. In an embodiment, the UE may perform a COT validation procedure. For example, the UE may determine whether the first duration of the COT/shared COT is valid or not. For example, the UE may determine a second duration of the COT/shared COT, based on the first duration and its sensing results and/or detected resource reservations (e.g., detected reserved resources within the COT). For example, the UE may determine that the first duration of the COT is not valid and/or overlaps (e.g., fully or partially in time) with a reserved/excluded resource. The UE may determine the second duration of the COT, as a portion of the first duration (second duration=<first duration), such that the second duration is valid (e.g., not interrupted) and/or does not overlap (e.g., fully or partially in time) with a reserved/excluded resource.

In an embodiment, a UE may determine the second duration of the COT (e.g., initiated COT and/or shared COT), based on a set of candidate resources available for intended transmission(s) within the COT, e.g., based on an intersection of the set of candidate resources and the COT/shared COT. For example, if there is a resource excluded/pre-empted/reserved by another UE from the candidate resource set that overlaps with the first duration of the COT/shared COT, the UE determines the second duration as a portion/subset of the first duration that does not comprise/overlap with the excluded/pre-empted/reserved resource.

In an embodiment, the UE may determine the second duration of the COT, based on a location and/or timing (e.g., starting time and/or ending time) of a detected reserved resource. The reserved resource may be within the first duration of the COT. For example, the UE may detect a SCI indicating a reserved resource within the first duration of the COT. In an embodiment, the UE may determine a second duration of the COT that ends before (a first/earliest/last symbol of) the reserved resource. In an embodiment, the UE may determine the second duration of the COT that starts after (a first/earliest/last symbol of) the reserved resource.

In an embodiment, the determination of the valid duration of the COT may be based on a comparison of a first priority of a second transmission and a second priority of the detected resource reservation. The second transmission may be an intended transmission of the UE via a second resource/transmission occasion that overlaps with (e.g., is in a same slot/mini-slot as) the reserved resource. The second transmission may be an earliest transmission within the COT that initiated the COT. The second transmission may be an earliest transmission within the shared COT (e.g., shared portion of the COT). The second transmission may be a transmission within the COT with a highest (or lowest) priority. In an embodiment, the determination of the valid duration of the COT may be based on a comparison of a first priority of the COT/shared COT and a second priority of the detected resource reservation. For example, the COT may be associated with a (PHY) priority. In an example, the COT sharing indication/information may indicate the first priority of the COT. In an example, the UE may determine the first priority of the COT (e.g., initiated by the UE or shared with the UE) based on the priority of an earliest transmission upon initiation of the COT and within the COT. In an example, the UE may determine the first priority of the COT (e.g., initiated by the UE or shared with the UE) based on the priority of a transmission within the COT that has the highest priority of transmissions within the COT. The first priority may be the highest/lowest priority allowed for a transmission within the COT.

For example, the UE may determine the second duration excluding/avoiding overlap with the reserved resource, if the second priority of the detected resource reservation is higher than and/or equal to the first priority of the COT or a first transmission within the COT. For example, the UE may determine the second duration including/overlapping with the reserved resource, if the second priority of the detected resource reservation is lowers than and/or equal to the first priority of the COT or a first transmission within the COT.

In an embodiment, the determination of the second/valid duration of the COT may be based on whether the COT is shared with a third UE who has signaled the resource reservation within the COT. The UE may detect a SCI, transmitted by a third UE, indicating the resource reservation, wherein the reserved resource overlaps with the first duration of the COT. The UE may determine to share a portion of the first duration of the COT with the third UE. For example, the UE may have initiated the COT. For example, the UE may have shared the COT with a first UE. For example, the UE may receive an indication of the COT sharing from a first UE. The COT sharing indication may indicate the first duration of the COT. The COT sharing indication may indicate that the COT is shared with the UE and with the third UE (e.g., the COT sharing indication/information may indicate the source/destination ID of the third UE as a COT recipient). Based on determining that the COT is shared with the third UE, the UE may determine the valid/second duration of the COT such that it comprises/ overlaps/includes the reserved resource, by the third UE, that is within the first duration of the COT. Based on determining that the COT is not shared with the third UE, the UE may determine the valid/second duration of the COT such that it excludes/does not comprises/overlaps with the reserved resource, by the third UE, that is within the first duration of the COT.

In an embodiment, the determination of the second/valid duration of the COT may be based on whether the UE is a destination UE of an intended transmission by the third UE via the reserved resource which is within the first duration of the COT. For example, the second/valid duration of the COT may comprise/include/overlap with the reserved resource, if the resource reservation indicated the UE as a destination UE. In this case, the COT may not be interrupted. For example, the second/valid duration of the COT may exclude/ not comprise/not overlap with the reserved resource, if the resource reservation does not indicate the UE as a destination UE. In this case, the COT may be interrupted.

Figure 35:
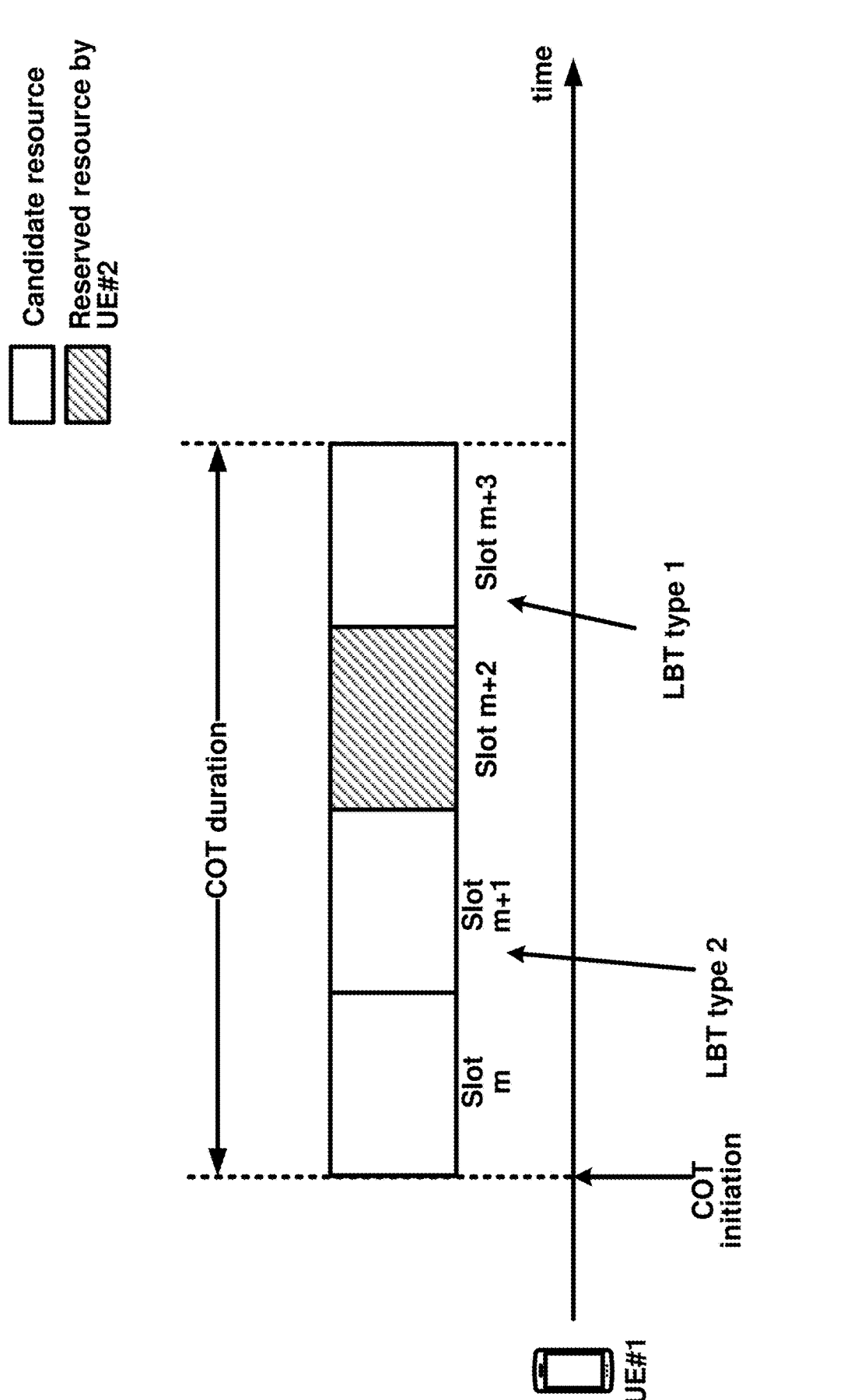
FIG. 35 shows an example COT duration in sidelink operating with shared spectrum channel access.

FIG. 35 shows an example COT duration in sidelink operating with shared spectrum channel access. As shown in this example, a first UE (e.g., UE #1) may determine a COT, e.g., in a sidelink resource pool configured in an unlicensed sidelink carrier. The first UE may determine a starting point/time/slot/symbol and a duration for the COT (e.g., COT duration). For example, the first UE may determine that the COT starts in a first symbol of slot m, and has a duration of four slots, comprising slot m to slot m+3.

As shown in the example of FIG. 35, the first UE may initiate the COT, e.g., upon a successful first LBT operation/ channel access procedure indicating an idle channel. The first channel access procedure may be based on a first type of LBT, e.g., Type 1 LBT/channel access procedure. The first UE may perform the first channel access procedure before a first symbol of slot m, for a first transmission via a first transmission occasion/resource in slot m. The first transmission may be PSCCH and/or PSSCH and/or PSFCH and/or S-SSB transmission. The first transmission may be associated with a first priority (e.g., PHY priority). The first UE may determine a CAPC for the first channel access procedure associated with the first transmission. For example, the CAPC may be based on the first priority. For example, the CAPC may be highest or lowest CAPC allowed/defined/configured for the first transmission. The first UE may determine the duration of the COT, e.g., based on a MCOT associated with the determined CAPC (e.g., referring to FIG. 30). For example, the duration of the COT may be smaller than or equal to the corresponding MCOT duration.

The first UE may determine one or more transmissions (e.g., control signals and/or transport blocks) via transmission occasions/resources in slots m to m+3. For example, the first UE may determine a first transmission via a first transmission occasion/resource in slot m. The first UE may have transmitted a SCI indicating reservation of the first resource. For example, the first UE may determine a second transmission via a second transmission occasion/resource in slot m+1. The first UE may have transmitted a SCI indicating reservation of the second resource. For example, the first UE may determine a third transmission via a third transmission occasion/resource in slot m+2. The first UE may have transmitted a SCI indicating reservation of the third resource. For example, the first UE may determine a fourth transmission via a fourth transmission occasion/resource in slot m+3. The first UE may have transmitted a SCI indicating reservation of the fourth resource.

The first UE may detect a signal, e.g., a SCI, from a second UE (e.g., UE #2) indicating a resource reservation. For example, the SCI may indicate that the transmission occasion/resource in slot m+2 is reserved for a fifth transmission of the second UE. The SCI may indicate a second priority of the resource reservation and/or the fifth transmission. The first UE may determine that the reserved resource, indicated by the SCI, overlaps/collides with the third transmission occasion/resource in slot m+2. The first UE may determine that the third transmission is associated with a first priority. The first UE may determine a power threshold based on the first priority of the third transmission and the second priority detected in the SCI. The first UE may determine whether a reference signal received power (RSRP) of the SCI is above or below the power threshold. The first UE may determine that the third transmission occasion/resource is not available for the third transmission, e.g., if the RSRP of the SCI is above the power threshold and/or the second priority in the SCI is greater than the first priority of the third transmission. The first UE may determine to exclude the third transmission occasion/resource from a set of candidate/available resources for the third transmission.

The first UE may determine that the reserved resource, indicated by the SCI, overlaps/collides with the duration of the COT (e.g., is within the COT duration) in slot m+2. The first UE may determine that the COT is associated with a first priority. In an example, the first priority may be associated with the first transmission in the earliest slot/resource/ occasion of the COT, e.g., in slot m. In an example, the first priority may be a highest/lowest priority of the transmissions within the COT. In an example, the first priority may be a highest/lowest priority allowed in the COT.

The first UE may determine a power threshold based on the first priority and the second priority detected in the SCI. The first UE may determine whether a reference signal received power (RSRP) of the SCI is above or below the power threshold. The first UE may determine that the third transmission occasion/resource is not available for the third transmission, e.g., if the RSRP of the SCI is above the power threshold and/or the second priority in the SCI is greater than the first priority. The first UE may determine to exclude the third transmission occasion/resource from a set of candidate/ available resources for the third transmission. The first UE may consider the third transmission occasion/resource as a reserved resource. The first UE may determine that the resource reservation indicated by the SCI interrupts the COT. The first UE may determine that the COT duration is expired/finished/ended at the first symbol of slot m+2 in response to the resource reservation indicated by the SCI.

The first UE may determine that the second transmission occasion/resource in slot m+1 is within the duration of the COT, e.g., because no interruption/gap occurs before this transmission. The first UE may perform a second type of channel access procedure (LBT) (e.g., Type 2/2A/2B/2C) prior to the second transmission in slot m+1. The first UE may transmit the second transmission in response to the channel access procedure, performed based on the second type of channel access procedure, indicating an idle channel (successful LBT).

The first UE may determine that the fourth transmission occasion/resource in slot m+3 is outside (not within) the duration of the COT, e.g., because of the interruption/gap, caused by the second UE reserved resource in slot m+2, occurring before this transmission. The first UE may perform the first type of channel access procedure (LBT) (e.g., Type 1) prior to the fourth transmission in slot m+3. The first UE may transmit the fourth transmission in response to the channel access procedure, performed based on the first type of channel access procedure, indicating an idle channel (successful LBT). In an example, the first UE may initiate a second COT via the fourth transmission in slot m+3, based on the successful Type 1 channel access procedure.

In an embodiment, the UE may initiate the COT before detecting the SCI/control signal indicating the resource reservation within the duration of the COT. In an embodiment, the UE may initiate the COT after the detecting the SCI/control signal indicating the resource reservation within the duration of the COT. In an example, the UE may detect the SCI/control signal indicating the resource reservation within the duration of the COT, after the COT is initiated and/or used.

Figure 36:
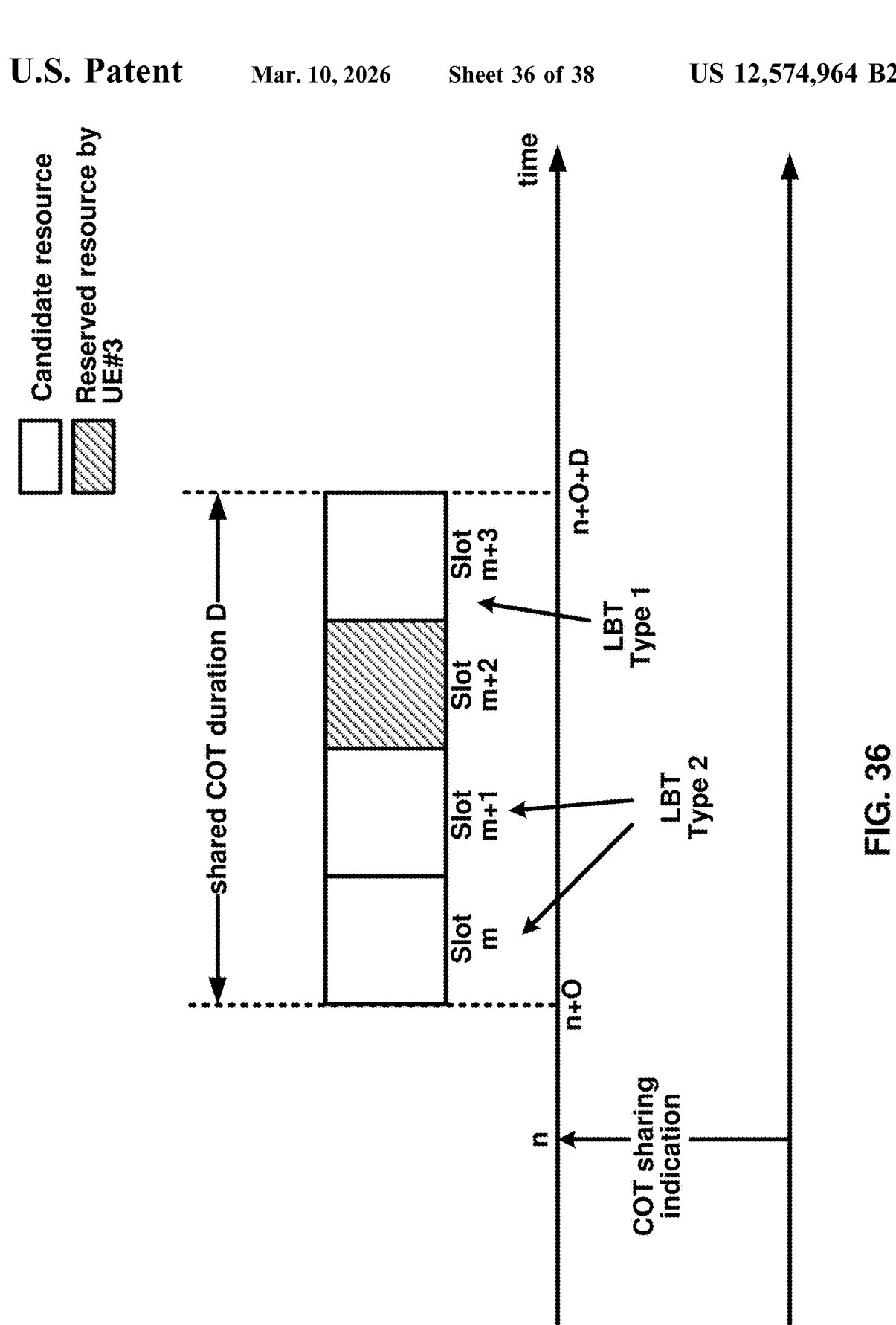
FIG. 36 shows another example COT duration in sidelink operating with shared spectrum channel access.

FIG. 36 shows another example COT duration in sidelink operating with shared spectrum channel access. As shown in this example, a second UE (e.g., UE #2) may determine a shared COT, e.g., in a sidelink resource pool configured in an unlicensed sidelink carrier. The second UE may determine a starting point/time/slot/symbol and a duration for the COT (e.g., shared COT duration). For example, the second UE may determine that the COT starts in a first symbol of slot m, and has a duration of four slots, comprising slot m to slot m+3.

As shown in the example of FIG. 36, a first UE (UE #1) may initiate a COT, e.g., upon a successful first LBT operation/channel access procedure indicating an idle channel. The first channel access procedure may be based on a first type of LBT, e.g., Type 1 LBT/channel access procedure. The first UE may perform the first channel access procedure before a first symbol of a slot, e.g., slot m-i (i=1, 2, . . . ), for a transmission via a transmission occasion/resource in slot m-i. The transmission may be PSCCH and/or PSSCH and/or PSFCH and/or S-SSB transmission. The transmission may be associated with a first priority (e.g., PHY priority). The first UE may determine a CAPC for the first channel access procedure associated with the transmission. For example, the CAPC may be based on the first priority. For example, the CAPC may be highest or lowest CAPC allowed/defined/configured for the first transmission. The first UE may determine the total duration of the COT, e.g., based on a MCOT associated with the determined CAPC (e.g., referring to FIG. 30). For example, the total duration of the COT may be smaller than or equal to the corresponding MCOT duration.

The first UE may share the COT with the second UE (UE #2). For example, the first UE may transmit a signal, e.g., a control signal (SCI and/or MAC-CE), indicating COT sharing indication with the second UE. For example, the control signal and/or the COT sharing indication may indicate a destination ID of the second UE as a recipient of the shared COT.

In an embodiment, a base station may initiate the COT and share it with the second UE. For example, the base station may transmit a signal/message, e.g., a control signal/message (DCI and/or MAC-CE), indicating COT sharing indication with the second UE. For example, the control signal and/or the COT sharing indication may be addressed to (e.g., scrambled by a RNTI of) the second UE as a recipient of the shared COT.

Referring to FIG. 36, the second UE may receive the COT sharing indication in slot n. The COT sharing indication may indicate a reference slot/timing for determining a location of the COT. In an example, the reference slot/time may be slot n where the COT sharing indication is detected. The COT sharing indication may comprise a field indicating a time/ slot/symbol offset, O. The second UE may determine a starting time of the shared COT, e.g., the portion of the total COT duration that is shared with the second UE, e.g., for the second UE's transmissions. The second UE may determine the starting time of the shared COT based on the time/slot/symbol offset 0 and/or the reference time/slot. For example, the starting time of the shared COT may be at time/in slot n+0, as shown in FIG. 36. For example, the shared COT may start at the beginning (e.g., before a first symbol of) slot n+O. For example, the shared COT may start at the end (e.g., after a last symbol of) slot n+0. The COT sharing indication may comprise a field indicating a duration of the shared COT, D (e.g., in ms or slots/symbols). The second UE may determine the duration of the shared COT, starting from the determined starting time (n+O). In the example of FIG. 36, the second UE may determine the duration of the shared COT to be four slots, starting from slot m to slot m+3. The COT sharing indication may comprise a field indicating an end of the shared COT. The second UE may determine the end of the shared COT, e.g., after D ms/slot/symbols from the determined starting time (n+O), e.g., at time n+O+D.

The second UE may determine one or more transmissions (e.g., control signals and/or transport blocks) via transmission occasions/resources in slots m to m+3. For example, the second UE may determine a first transmission via a first transmission occasion/resource in slot m. The second UE may have transmitted a SCI indicating reservation of the first resource. For example, the second UE may determine a second transmission via a second transmission occasion/resource in slot m+1. The second UE may have transmitted a SCI indicating reservation of the second resource. For example, the second UE may determine a third transmission via a third transmission occasion/resource in slot m+2. The second UE may have transmitted a SCI indicating reservation of the third resource. For example, the second UE may determine a fourth transmission via a fourth transmission occasion/resource in slot m+3. The second UE may have transmitted a SCI indicating reservation of the fourth resource.

The second UE may detect a signal, e.g., a SCI, from a third UE (e.g., UE #3) indicating a resource reservation. For example, the SCI may indicate that the transmission occasion/resource in slot m+2 is reserved for a fifth transmission of the third UE. The SCI may indicate a second priority of the resource reservation and/or the fifth transmission. The second UE may determine that the reserved resource, indicated by the SCI, overlaps/collides with the third transmission occasion/resource in slot m+2. The second UE may determine that the third transmission is associated with a first priority. The first UE may determine a power threshold based on the first priority of the third transmission and the second priority detected in the SCI. The second UE may determine whether a reference signal received power (RSRP) of the SCI is above or below the power threshold. The second UE may determine that the third transmission occasion/resource is not available for the third transmission, e.g., if the RSRP of the SCI is above the power threshold and/or the second priority in the SCI is greater than the first priority of the third transmission. The second UE may determine to exclude the third transmission occasion/resource from a set of candidate/available resources for the third transmission.

The second UE may determine that the reserved resource, indicated by the SCI, overlaps/collides with the duration of the shared COT (e.g., is within the shared COT duration) in slot m+2. The second UE may determine that the shared COT is associated with a first priority. In an example, the COT sharing indication may indicate the first priority of the COT/shared COT. In an example, the SCI/control signal indicating the COT sharing indication may indicate the first priority.

The second UE may determine a power threshold based on the first priority and the second priority detected in the SCI comprising resource reservation. The second UE may determine whether a reference signal received power (RSRP) of the SCI comprising resource reservation is above or below the power threshold. The second UE may determine that the third transmission occasion/resource is not available for the third transmission, e.g., if the RSRP of the SCI is above the power threshold and/or the second priority in the SCI comprising resource reservation is greater than the first priority. The second UE may determine to exclude the third transmission occasion/resource from a set of candidate/available resources for the third transmission. The second UE may consider the third transmission occasion/resource as a reserved resource. The second UE may determine that the resource reservation indicated by the SCI interrupts the shared COT. The second UE may determine that the shared COT duration is expired/finished/ended at the first symbol of slot m+2 in response to the resource reservation indicated by the SCI.

The second UE may determine that the second transmission occasion/resource in slot m+1 is within the duration of the shared COT, e.g., because no interruption/gap occurs before this transmission. The second UE may perform a second type of channel access procedure (LBT) (e.g., Type 2/2A/2B/2C) prior to the second transmission in slot m+1. The second UE may transmit the second transmission in response to the channel access procedure, performed based on the second type of channel access procedure, indicating an idle channel (successful LBT).

The second UE may determine that the fourth transmission occasion/resource in slot m+3 is outside (not within) the duration of the shared COT, e.g., because of the interruption/gap, caused by the third UE reserved resource in slot m+2, occurring before this transmission. The second UE may perform the first type of channel access procedure (LBT) (e.g., Type 1) prior to the fourth transmission in slot m+3. The second UE may transmit the fourth transmission in response to the channel access procedure, performed based on the first type of channel access procedure, indicating an idle channel (successful LBT). In an example, the second UE may initiate a second COT via the fourth transmission in slot m+3, based on the successful Type 1 channel access procedure.

In an embodiment, the UE may detect the first control signal (e.g., SCI and/or MAC-CE) indicating the COT sharing indication/information before the second SCI/control signal indicating the resource reservation within the duration of the shared COT. In an embodiment, the UE may detect the first control signal (e.g., SCI and/or MAC-CE) indicating the COT sharing indication/information after the second SCI/control signal indicating the resource reservation within the duration of the shared COT. In an example, the UE may detect the second SCI/control signal indicating the resource reservation within the duration of the shared COT, after the COT is shared (e.g., after the shared COT is started).

A reserved resource, by another UE, may be a resource that the UE determines to exclude from the set of candidate/available resources based on the parameters of the COT/shared COT (e.g., priority of the COT/shared COT) and/or based on its sensing results and/or detected resource reservations. Reserved resources may interrupt a COT (e.g., by overlapping resources within the duration of the COT), and may result in termination/expiration of the original duration of the COT. A UE using/sharing a COT may determine to shorten/terminate a COT earlier than the original duration, if the reserved resource interrupts the COT. A UE using/sharing the COT may switch/fall back to Type 1 LBT/channel access procedure after detecting the reserved resource interrupting the COT.

A reserved resource may be a pre-empted/re-evaluated resource. For example, the UE using/sharing a COT, may determine to re-evaluate and/or pre-empt the resource/transmission occasion based on the detected reservation and/or a priority of the COT. For example, the detected reservation may have a higher priority than the COT. For example, the reservation may be detected based on a RSRP threshold, wherein the RSRP threshold is determined based on the priority of the COT.

Referring to FIG. 35 and FIG. 36, the UE (e.g., UE #1 in FIG. 35 and UE #2 in FIG. 36) may determine a first type of (e.g., Type 2/2A/2B/2C) LBT/channel access procedure for a first transmission in slot m+1, within the duration of the COT, based on a first/earliest symbol of the transmission occasion/resource of the first transmission starting before a first/earliest symbol of the reserved resource. The UE may determine the first type (e.g., Type 2/2A/2B/2C) of LBT/channel access procedure for the first transmission in slot m+1, within the duration of the COT, based on a last symbol of the transmission occasion/resource of the first transmission being/ending before a first/earliest symbol of the reserved resource.

Referring to FIG. 35 and FIG. 36, the UE (e.g., UE #1 in FIG. 35 and UE #2 in FIG. 36) may determine a second type of (e.g., Type 1) LBT/channel access procedure for a second transmission in slot m+3, within the duration of the COT, based on a first/earliest symbol of the transmission occasion/resource of the second transmission starting after a first/earliest symbol of the reserved resource. The UE may determine the second type (e.g., Type 1) of LBT/channel access procedure for the second transmission in slot m+3, within the duration of the COT, based on a last symbol of the reserved resource being/ending before a first/earliest symbol of the transmission occasion/resource of the second transmission.

In the example of FIG. 35, the UE (UE #1) may determine that the COT is not shared with the second UE (UE #2). In the example of FIG. 36, the UE (UE #2) may determine that the COT is not shared with the third UE (UE #3). The UE may determine the second type of LBT/channel access procedure (Type 1) for a transmission within the COT duration and after a detected resource reservation, based on the UE reserving the resource not sharing the COT. The UE may determine the first type of LBT/channel access procedure (Type 2/2A/2B/2C) for the transmission within the COT duration and after a detected resource reservation, based on the UE reserving the resource sharing the COT.

In the example of FIG. 35, the UE (UE #1) may determine that the transmission of the detected reserved resource is destined for the UE, e.g., the UE's destination ID may match the destination ID associated with the detected reservation of the resource. In the example of FIG. 36, the UE (UE #2) may determine that that the transmission of the detected reserved resource is destined for the UE, e.g., the UE's destination ID may match the destination ID associated with the detected reservation of the resource. The UE may determine the second type of LBT/channel access procedure (Type 1) for a transmission within the COT duration and after a detected resource reservation, based on the UE being a destination UE of the transmission via the reserved resource. The UE may determine the first type of LBT/channel access procedure (Type 2/2A/2B/2C) for the transmission within the COT duration and after a detected resource reservation, based on the UE being a destination UE of the transmission via the reserved resource.

In an embodiment, the COT sharing indication may be a unicast signal/message. For example, the shared COT may be dedicated to the UE (e.g., to UE #2 in FIG. 36). In an embodiment, the COT sharing indication may be a multicast/broadcast signal/message. For example, the shared COT may be common to the multiple UEs comprising the UE (e.g., to UE #2 in FIG. 36).

Figure 37:
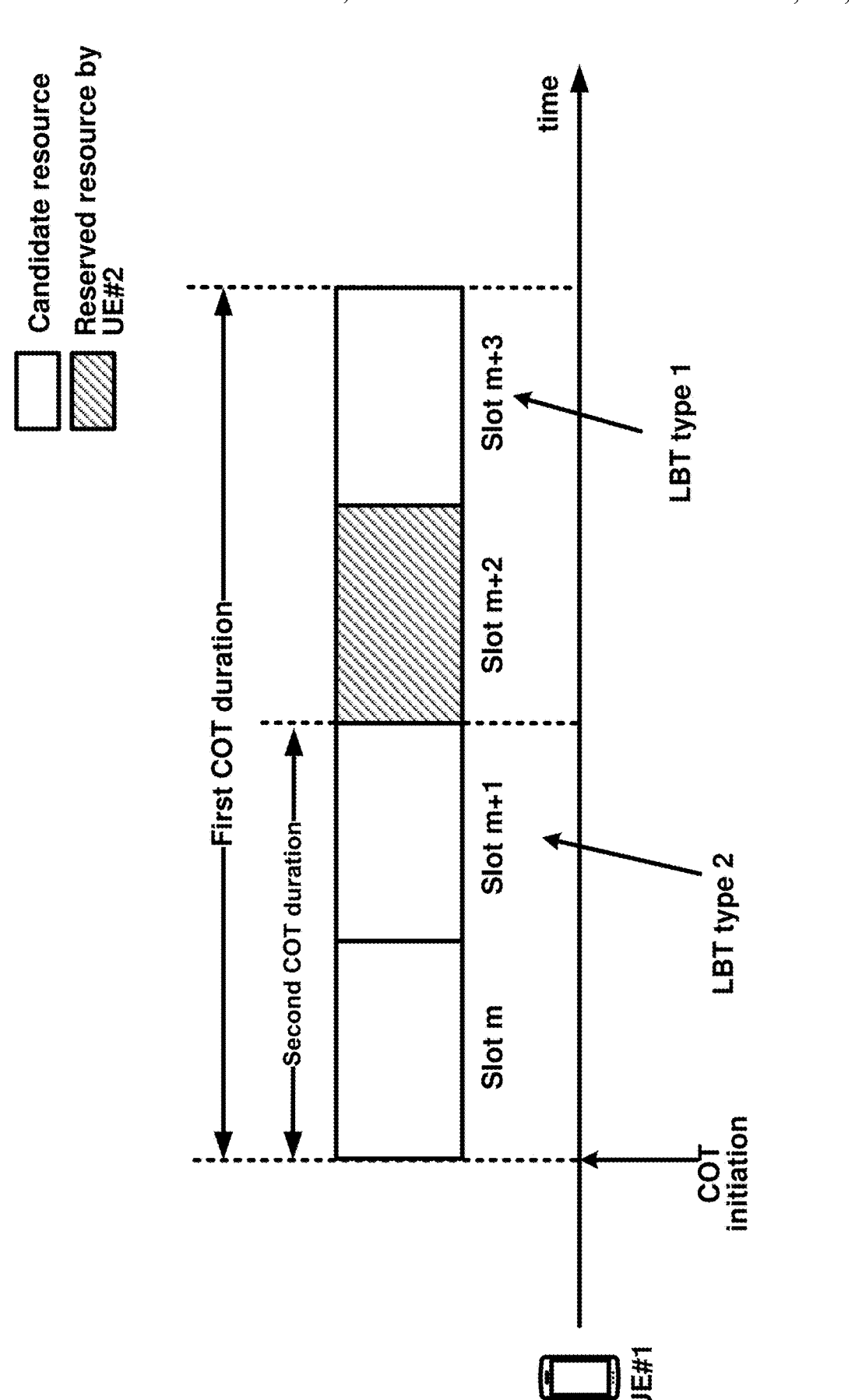
FIG. 37 shows an example COT duration in sidelink operating with shared spectrum channel access.

FIG. 37 shows an example COT duration in sidelink operating with shared spectrum channel access. As shown in this example, a first UE (e.g., UE #1) may determine a COT, e.g., in a sidelink resource pool configured in an unlicensed sidelink carrier. The first UE may determine a starting point/time/slot/symbol and a first duration for the COT (e.g., first COT duration). For example, the first UE may determine that the COT starts in a first symbol of slot m, and has a first duration of four slots, comprising slot m to slot m+3.

As shown in the example of FIG. 37, the first UE may initiate the COT, e.g., upon a successful first LBT operation/channel access procedure indicating an idle channel. The first channel access procedure may be based on a first type of LBT, e.g., Type 1 LBT/channel access procedure. The first UE may perform the first channel access procedure before a first symbol of slot m, for a first transmission via a first transmission occasion/resource in slot m. The first transmission may be PSCCH and/or PSSCH and/or PSFCH and/or S-SSB transmission. The first transmission may be associated with a first priority (e.g., PHY priority). The first UE may determine a CAPC for the first channel access procedure associated with the first transmission. For example, the CAPC may be based on the first priority. For example, the CAPC may be highest or lowest CAPC allowed/defined/configured for the first transmission. The first UE may determine the first duration of the COT, e.g., based on a MCOT associated with the determined CAPC (e.g., referring to FIG. 30). For example, the first duration of the COT may be smaller than or equal to the corresponding MCOT duration.

The first UE may determine one or more transmissions (e.g., control signals and/or transport blocks) via transmission occasions/resources in slots m to m+3. For example, the first UE may determine a first transmission via a first transmission occasion/resource in slot m. The first UE may have transmitted a SCI indicating reservation of the first resource. For example, the first UE may determine a second transmission via a second transmission occasion/resource in slot m+1. The first UE may have transmitted a SCI indicating reservation of the second resource. For example, the first UE may determine a third transmission via a third transmission occasion/resource in slot m+2. The first UE may have transmitted a SCI indicating reservation of the third resource. For example, the first UE may determine a fourth transmission via a fourth transmission occasion/resource in slot m+3. The first UE may have transmitted a SCI indicating reservation of the fourth resource.

The first UE may detect a signal, e.g., a SCI, from a second UE (e.g., UE #2) indicating a resource reservation. For example, the SCI may indicate that the transmission occasion/resource in slot m+2 is reserved for a fifth transmission of the second UE. The SCI may indicate a second priority of the resource reservation and/or the fifth transmission. The first UE may determine that the reserved resource, indicated by the SCI, overlaps/collides with the third transmission occasion/resource in slot m+2. The first UE may determine that the third transmission is associated with a first priority. The first UE may determine a power threshold based on the first priority of the third transmission and the second priority detected in the SCI. The first UE may determine whether a reference signal received power (RSRP) of the SCI is above or below the power threshold. The first UE may determine that the third transmission occasion/resource is not available for the third transmission, e.g., if the RSRP of the SCI is above the power threshold and/or the second priority in the SCI is greater than the first priority of the third transmission. The first UE may determine to exclude the third transmission occasion/resource from a set of candidate/available resources for the third transmission.

The first UE may determine that the reserved resource, indicated by the SCI, overlaps/collides with the first duration of the COT (e.g., is within the first COT duration) in slot m+2. The first UE may determine that the COT is associated with a first priority. In an example, the first priority may be associated with the first transmission in the earliest slot/resource/occasion of the COT, e.g., in slot m. In an example, the first priority may be a highest/lowest priority of the transmissions within the COT. In an example, the first priority may be a highest/lowest priority allowed in the COT.

The first UE may determine a power threshold based on the first priority and the second priority detected in the SCI. The first UE may determine whether a reference signal received power (RSRP) of the SCI is above or below the power threshold. The first UE may determine that the third transmission occasion/resource is not available for the third transmission, e.g., if the RSRP of the SCI is above the power threshold and/or the second priority in the SCI is greater than the first priority. The first UE may determine to exclude the third transmission occasion/resource from a set of candidate/available resources for the third transmission. The first UE may consider the third transmission occasion/resource as a reserved resource. The first UE may determine that the resource reservation indicated by the SCI interrupts the COT. The first UE may determine that the first COT duration is expired/finished/ended/terminated at the first symbol of slot m+2 in response to the resource reservation indicated by the SCI. the first UE may determine that the first duration of the COT is not valid/available, due to the interruption/overlap of the reserved resource.

The first UE may determine a second/valid duration of the COT, in response to detecting the resource reservation interrupting/overlapping with the first duration of the COT. For example, the second duration may be/comprise a portion/subset (e.g., contiguous portion/subset) of the first duration, excluding the reserved resource. For example, the second duration of the COT may start at the starting time/position/slot/symbol of the COT. For example, the first UE may determine a second ending slot/symbol/position/timing of the COT based on the reserved resource. For example, the second ending slot/symbol/position/timing of the COT may be (immediately) before a first/earliest symbol/slot of the reserved resource. Referring to FIG. 37, the first UE may determine the second duration of the COT from the starting time/slot/symbol of the COT (at the beginning of slot m) to the second ending slot/symbol/position/timing of the COT. For example, the first UE may determine the second duration of the COT from the starting time/slot/symbol of the COT (at the beginning of slot m) to the end of a last slot/symbol before the beginning of the reserved resource (not overlapping with the reserved resource).

In an example, the second duration may be equal to the first duration. In an example, the second duration may be equal to zero. In an example, the second duration may be less/shorter than the first duration.

In example of FIG. 37, the transmission occasion/resource in slot m+3 may be outside (not within) the second/valid duration of the COT. The first UE may perform a Type 1 LBT/channel access procedure for the transmission in slot m+3, based on the second duration of the COT.

In an embodiment, the UE may initiate the COT before detecting the SCI/control signal indicating the resource reservation within the duration of the COT. In an embodiment, the UE may initiate the COT after the detecting the SCI/control signal indicating the resource reservation within the duration of the COT. In an example, the UE may detect the SCI/control signal indicating the resource reservation within the duration of the COT, after the COT is initiated and/or used.

Figure 38:
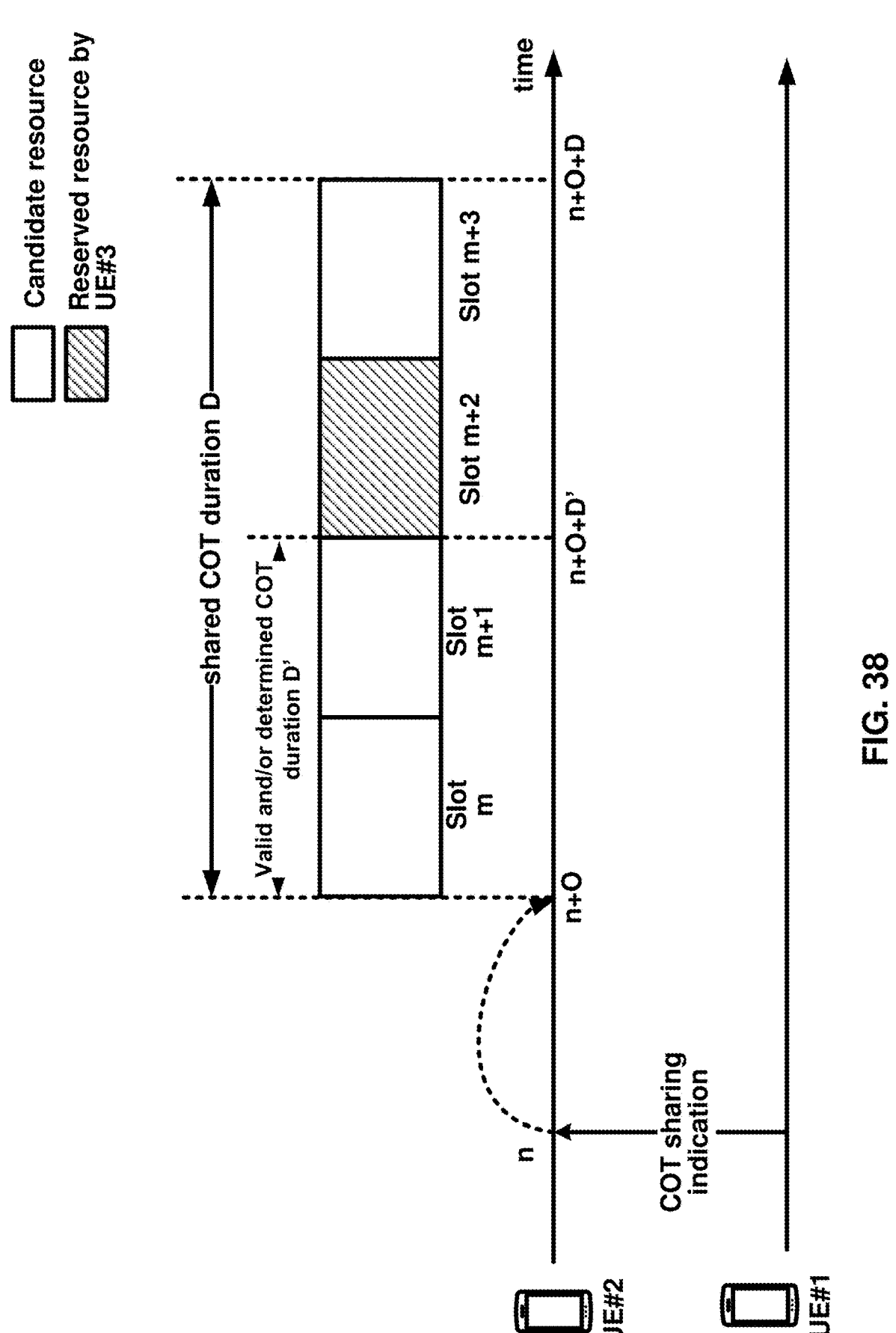
FIG. 38 shows another example COT duration in sidelink operating with shared spectrum channel access.

FIG. 38 shows another example COT duration in sidelink operating with shared spectrum channel access. As shown in this example, a second UE (e.g., UE #2) may determine a shared COT, e.g., in a sidelink resource pool configured in an unlicensed sidelink carrier. The second UE may receive/detect a control signal (e.g., SCI and/or MAC-CE) comprising a field indicating a starting time/slot/symbol and/or a first duration of the shared COT. The second UE may determine the starting point/time/slot/symbol and the first duration for the COT (e.g., shared COT duration). For example, the second UE may determine that the COT starts in a first symbol of slot m, and has a first duration of four slots, comprising slot m to slot m+3.

As shown in the example of FIG. 38, a first UE (UE #1) may initiate a COT, e.g., upon a successful first LBT operation/channel access procedure indicating an idle channel. The first channel access procedure may be based on a first type of LBT, e.g., Type 1 LBT/channel access procedure. The first UE may perform the first channel access procedure before a first symbol of a slot, e.g., slot m-i (i=1, 2, . . . ), for a transmission via a transmission occasion/resource in slot m-i. The transmission may be PSCCH and/or PSSCH and/or PSFCH and/or S-SSB transmission. The transmission may be associated with a first priority (e.g., PHY priority). The first UE may determine a CAPC for the first channel access procedure associated with the transmission. For example, the CAPC may be based on the first priority. For example, the CAPC may be highest or lowest CAPC allowed/defined/configured for the first transmission. The first UE may determine the total duration of the COT, e.g., based on a MCOT associated with the determined CAPC (e.g., referring to FIG. 30). For example, the total duration of the COT may be smaller than or equal to the corresponding MCOT duration.

The first UE may share the COT with the second UE (UE #2). For example, the first UE may transmit a signal, e.g., a control signal (SCI and/or MAC-CE), indicating COT sharing indication with the second UE. For example, the control signal and/or the COT sharing indication may indicate a destination ID of the second UE as a recipient of the shared COT.

The COT sharing indication may indicate the first duration as a portion of the total duration of the COT that is shared with the second UE and/or available for access (e.g., based on a Type 2 LBT/channel access procedure) to the second UE.

Referring to FIG. 38, the second UE may receive the COT sharing indication in slot n. The COT sharing indication may indicate a reference slot/timing for determining a location of the COT. In an example, the reference slot/time may be slot n where the COT sharing indication is detected. The COT sharing indication may comprise a field indicating a time/slot/symbol offset, O. The second UE may determine a starting time of the shared COT, e.g., the portion of the total COT duration that is shared with the second UE, e.g., for the second UE's transmissions. The second UE may determine the starting time of the shared COT based on the time/slot/symbol offset 0 and/or the reference time/slot. For example, the starting time of the shared COT may be at time/in slot n+0, as shown in FIG. 36. For example, the shared COT may start at the beginning (e.g., before a first symbol of) slot n+O. For example, the shared COT may start at the end (e.g., after a last symbol of) slot n+0. The COT sharing indication may comprise a field indicating a first duration of the shared COT, D (e.g., in ms or slots/symbols). The second UE may determine the first duration of the shared COT, starting from the determined starting time (n+0). In the example of FIG. 36, the second UE may determine the first duration of the shared COT to be four slots, starting from slot m to slot m+3. The COT sharing indication may comprise a field indicating an end of the shared COT. The second UE may determine the end of the shared COT, e.g., after D ms/slot/symbols from the determined starting time (n+O), e.g., at time n+O+D.

The second UE may determine one or more transmissions (e.g., control signals and/or transport blocks) via transmission occasions/resources in slots m to m+3. For example, the second UE may determine a first transmission via a first transmission occasion/resource in slot m. The second UE may have transmitted a SCI indicating reservation of the first resource. For example, the second UE may determine a second transmission via a second transmission occasion/resource in slot m+1. The second UE may have transmitted a SCI indicating reservation of the second resource. For example, the second UE may determine a third transmission via a third transmission occasion/resource in slot m+2. The second UE may have transmitted a SCI indicating reservation of the third resource. For example, the second UE may determine a fourth transmission via a fourth transmission occasion/resource in slot m+3. The second UE may have transmitted a SCI indicating reservation of the fourth resource.

The second UE may detect a signal, e.g., a SCI, from a third UE (e.g., UE #3) indicating a resource reservation. For example, the SCI may indicate that the transmission occasion/resource in slot m+2 is reserved for a fifth transmission of the third UE. The SCI may indicate a second priority of the resource reservation and/or the fifth transmission. The second UE may determine that the reserved resource, indicated by the SCI, overlaps/collides with the third transmission occasion/resource in slot m+2. The second UE may determine that the third transmission is associated with a first priority. The first UE may determine a power threshold based on the first priority of the third transmission and the second priority detected in the SCI. The second UE may determine whether a reference signal received power (RSRP) of the SCI is above or below the power threshold. The second UE may determine that the third transmission occasion/resource is not available for the third transmission, e.g., if the RSRP of the SCI is above the power threshold and/or the second priority in the SCI is greater than the first priority of the third transmission. The second UE may determine to exclude the third transmission occasion/resource from a set of candidate/available resources for the third transmission.

The second UE may determine that the reserved resource, indicated by the SCI, overlaps/collides with the first duration of the shared COT (e.g., is within the shared COT duration) in slot m+2. The second UE may determine that the shared COT is associated with a first priority. In an example, the COT sharing indication may indicate the first priority of the COT/shared COT. In an example, the SCI/control signal indicating the COT sharing indication may indicate the first priority.

The second UE may determine a power threshold based on the first priority and the second priority detected in the SCI comprising resource reservation. The second UE may determine whether a reference signal received power (RSRP) of the SCI comprising resource reservation is above or below the power threshold. The second UE may determine that the third transmission occasion/resource is not available for the third transmission, e.g., if the RSRP of the SCI is above the power threshold and/or the second priority in the SCI comprising resource reservation is greater than the first priority. The second UE may determine to exclude the third transmission occasion/resource from a set of candidate/available resources for the third transmission. The second UE may consider the third transmission occasion/resource as a reserved resource. The second UE may determine that the resource reservation indicated by the SCI interrupts the shared COT. The second UE may determine that the shared COT duration is expired/finished/ended/terminated at the first symbol of slot m+2 in response to the resource reservation indicated by the SCI. the second UE may determine that the first duration of the shared COT is invalid/unavailable for COT sharing.

The second UE may determine a second/valid duration (D' in FIG. 38) of the shared COT, in response to detecting the resource reservation interrupting/overlapping with the first duration (D in FIG. 38) of the shared COT. For example, the second duration may be/comprise a portion/subset (e.g., contiguous portion/subset) of the first duration, excluding the reserved resource (e.g., D'=<D). For example, the second duration of the shared COT may start at the starting time/position/slot/symbol of the shared COT, indicated by the COT sharing indication/information. For example, the second UE may determine a second ending slot/symbol/position/timing of the shared COT based on the reserved resource. For example, the second ending slot/symbol/position/timing of the shared COT may be (immediately) before a first/earliest symbol/slot of the reserved resource. Referring to FIG. 38, the second UE may determine the second duration of the shared COT from the starting time/slot/symbol of the shared COT (at time n+0) to the second ending slot/symbol/position/timing of the shared COT (time n+O+D'). For example, the second UE may determine the second duration of the COT from the starting time/slot/symbol of the COT (n+O) to the end of a last slot/symbol before the beginning of the reserved resource (not overlapping with the reserved resource, at n+O+D').

In an example, the second duration may be equal to the first duration. In an example, the second duration may be equal to zero. In an example, the second duration may be less/shorter than the first duration.

In example of FIG. 38, the transmission occasion/resource in slot m+3 may be outside (not within) the second/valid duration of the COT. The second UE may perform a Type 1 LBT/channel access procedure for the transmission in slot m+3, based on the second duration of the COT.

In an embodiment, the UE may receive/detect the COT sharing indication before detecting the SCI/control signal indicating the resource reservation within the duration of the shared COT. In an embodiment, the UE may receive/detect the COT sharing indication after the detecting the SCI/control signal indicating the resource reservation within the duration of the shared COT. In an example, the UE may detect the SCI/control signal indicating the resource reservation within the duration of the shared COT, after the COT is shared and/or used.

In an embodiment, the UE may detect the first control signal (e.g., SCI and/or MAC-CE) indicating the COT sharing indication/information before the second SCI/control signal indicating the resource reservation within the duration of the shared COT. In an embodiment, the UE may detect the first control signal (e.g., SCI and/or MAC-CE) indicating the COT sharing indication/information after the second SCI/control signal indicating the resource reservation within the duration of the shared COT. In an example, the UE may detect the second SCI/control signal indicating the resource reservation within the duration of the shared COT, after the COT is shared (e.g., after the shared COT is started).

A reserved resource, by another UE, may be a resource that the UE determines to exclude from the set of candidate/available resources based on the parameters of the COT/shared COT (e.g., priority of the COT/shared COT) and/or based on its sensing results and/or detected resource reservations. Reserved resources may interrupt a COT (e.g., by overlapping resources within the duration of the COT), and may result in termination/expiration of the original duration of the COT. A UE using/sharing a COT may determine to shorten/terminate a COT earlier than the original duration, if the reserved resource interrupts the COT. A UE using/sharing the COT may switch/fall back to Type 1 LBT/channel access procedure after detecting the reserved resource interrupting the COT.

A reserved resource may be a pre-empted/re-evaluated resource. For example, the UE using/sharing a COT, may determine to re-evaluate and/or pre-empt the resource/transmission occasion based on the detected reservation and/or a priority of the COT. For example, the detected reservation may have a higher priority than the COT. For example, the reservation may be detected based on a RSRP threshold, wherein the RSRP threshold is determined based on the priority of the COT.

Referring to FIG. 35 and FIG. 36, the UE (e.g., UE #1 in FIG. 35 and UE #2 in FIG. 36) may determine a first type of (e.g., Type 2/2A/2B/2C) LBT/channel access procedure for a first transmission in slot m+1, within the duration of the COT, based on a first/earliest symbol of the transmission occasion/resource of the first transmission starting before a first/earliest symbol of the reserved resource. The UE may determine the first type (e.g., Type 2/2A/2B/2C) of LBT/channel access procedure for the first transmission in slot m+1, within the duration of the COT, based on a last symbol of the transmission occasion/resource of the first transmission being/ending before a first/earliest symbol of the reserved resource.

Referring to FIG. 35 and FIG. 36, the UE (e.g., UE #1 in FIG. 35 and UE #2 in FIG. 36) may determine a second type of (e.g., Type 1) LBT/channel access procedure for a second transmission in slot m+3, within the duration of the COT, based on a first/earliest symbol of the transmission occasion/resource of the second transmission starting after a first/earliest symbol of the reserved resource. The UE may determine the second type (e.g., Type 1) of LBT/channel access procedure for the second transmission in slot m+3, within the duration of the COT, based on a last symbol of the reserved resource being/ending before a first/earliest symbol of the transmission occasion/resource of the second transmission.

In the example of FIG. 35, the UE (UE #1) may determine that the COT is not shared with the second UE (UE #2). In the example of FIG. 36, the UE (UE #2) may determine that the COT is not shared with the third UE (UE #3). The UE may determine the second type of LBT/channel access procedure (Type 1) for a transmission within the COT duration and after a detected resource reservation, based on the UE reserving the resource not sharing the COT. The UE may determine the first type of LBT/channel access procedure (Type 2/2A/2B/2C) for the transmission within the COT duration and after a detected resource reservation, based on the UE reserving the resource sharing the COT.

In the example of FIG. 35, the UE (UE #1) may determine that the transmission of the detected reserved resource is destined for the UE, e.g., the UE's destination ID may match the destination ID associated with the detected reservation of the resource. In the example of FIG. 36, the UE (UE #2) may determine that that the transmission of the detected reserved resource is destined for the UE, e.g., the UE's destination ID may match the destination ID associated with the detected reservation of the resource. The UE may determine the second type of LBT/channel access procedure (Type 1) for a transmission within the COT duration and after a detected resource reservation, based on the UE being a destination UE of the transmission via the reserved resource. The UE may determine the first type of LBT/channel access procedure (Type 2/2A/2B/2C) for the transmission within the COT duration and after a detected resource reservation, based on the UE being a destination UE of the transmission via the reserved resource.

In an embodiment, the COT sharing indication may be a unicast signal/message. For example, the shared COT may be dedicated to the UE (e.g., to UE #2 in FIG. 36). In an embodiment, the COT sharing indication may be a multicast/broadcast signal/message. For example, the shared COT may be common to the multiple UEs comprising the UE (e.g., to UE #2 in FIG. 36).

For a transmission starting in a first symbol, the UE performs the LBT/channel access procedure in an immediately preceding symbol of the first symbol (e.g., the previous adjacent symbol). The UE may transmit CP extension (CPE) to fill the gap, if any, between a successful LBT and the beginning of the transmission in the first symbol.

In an embodiment, the UE may select/determine a type of LBT/channel access procedure, for a transmission after a detected resource reservation within the duration of the COT, based on the cast type of the signal comprising the COT sharing indication/information. For example, the UE may perform Type 2 LBT/channel access procedure, for a transmission after a detected resource reservation within the duration of the COT, if the cast type of the signal comprising the COT sharing indication/information is multicast/groupcast/broadcast. For example, the UE may perform Type 1 LBT/channel access procedure, for a transmission after a detected resource reservation within the duration of the COT, if the cast type of the signal comprising the COT sharing indication/information is unicast.

In an embodiment, the COT sharing indicator may indicate discontinuous allocation/sharing of the COT with the UE, implying that the other UE's reservation is not an interruption to the COT, and that LBT Type 2 may be used within the indicated duration of the shared COT.

Throughout this disclosure, a transmission occasion/resource, e.g., for PSCCH/PSSCH transmission, may be slot based (e.g., comprising 12 or 13 or 14 symbols of a slot). For example, a slot may comprise one transmission occasion/resource. Throughout this disclosure, a transmission occasion/resource, e.g., for PSCCH/PSSCH transmission, may be mini-slot based (e.g., comprising 6 or 7 symbols of a slot). For example, a slot may comprise two or more transmission occasions/resources.

A first UE may receive, from a second UE, a first sidelink control information (SCI) indicating a duration of a channel occupancy time (COT). The first UE may receive, device from a third UE, a second SCI indicating a reserved resource within the duration of the COT. The first UE may perform a first type of channel access procedure, among a plurality of types of channel access procedure, for a first sidelink transmission that is within the duration of the COT and starts before the reserved resource. The first UE may determine a second type of channel access procedure, of the plurality of types of channel access procedure, to be used for a second sidelink transmission within the duration of the COT, wherein the determining is based on the sidelink transmission starting after the reserved resource. The first UE may transmit the second sidelink transmission using the second type of channel access procedure.

A UE may receive a sidelink control information indicating a reserved resource within a channel occupancy time (COT). The UE may transmit a sidelink transmission, within the COT, using a type of channel access procedure, among a plurality of types of channel access procedure, based on a relative location/position/timing/starting time of the reserved resource and the sidelink transmission.

A UE may receive a sidelink control information (SCI) indicating a reserved resource within a duration of a channel occupancy time (COT). Based on a first sidelink transmission, within the duration of the COT, starting before the reserved resource, the UE may transmit the first sidelink transmission using a first type of channel access procedure of a plurality of types of channel access procedure. Based on a second sidelink transmission, within the duration of the COT, starting after the reserved resource, the UE may transmit the second sidelink transmission using a second type of channel access procedure of a plurality of types of channel access procedure.

The UE may receive a second SCI, from a second UE, indicating the duration of the COT. The duration of the COT may be a remaining duration of the COT. The COT may be initiated by the second UE, and the remaining duration of the COT may be shared with the UE. The second SCI may comprise a COT sharing indicator for the UE. The UE may be a target receiver of a transmission of the second UE within the COT. The UE may be a destination of a transport block transmitted within the COT. The second SCI may further indicate a starting symbol and/or slot of the duration of the COT. The UE may determine, based on the second SCI, a time interval of a shared COT, with the duration and starting from the starting symbol and/or slot. The second SCI may further indicate a first priority associated with the COT.

The UE may initiate the COT based on a third sidelink transmission. The UE may determine the duration of the COT based on a channel access priority class of the third sidelink transmission. The UE may determine a time interval of the COT, with the duration and starting from a starting symbol and/or slot. The UE may determine a first priority associated with the COT. The first priority may be a priority of the third sidelink transmission. The UE may determine to share a remaining of the duration of the COT with a second UE.

The UE may use the first type of channel access procedure within the duration of the COT. The UE may use the second type of channel access procedure outside the duration of the COT.

The UE may receive the SCI from a third UE. The UE may determine the reserved resource based on a reference signal received power (RSRP) measurement of the SCI being higher than a threshold. The UE may determine the threshold based on a value of a priority field in the SCI. The UE may determine the threshold based on a first priority of the first sidelink transmission or the second sidelink transmission. The UE may determine the threshold based on a first priority associated with the COT. The UE may determine the reserved resource based on a resource reservation period field, in the SCI, indicating a resource reservation interval. The reserved resource may overlap with at least one symbol of the duration of the COT. The UE may determine that (duration of) the COT is not shared with the third UE.

The UE may determine the first type of channel access procedure for the first sidelink transmission, based on the first sidelink transmission starting before a first symbol of the reserved resource. The first type of channel access procedure may be/comprise a Type 2 channel access procedure. The first symbol may be an earliest symbol of the reserved resource. The first sidelink transmission may end before the first symbol of the reserved resource. The UE may determine the second type of channel access procedure for the second sidelink transmission, based on the second sidelink transmission starting after a first symbol of the reserved resource. The second type of channel access procedure may be/comprise a Type 1 channel access procedure. The first symbol may be an earliest symbol of the reserved resource. The first symbol may be a last symbol of the reserved resource.

The UE may transmit the first sidelink transmission using the first type of channel access procedure.

A first UE may receive, from a second UE, a first sidelink control information (SCI) indicating a first duration of a channel occupancy time (COT). The first UE may receive, from a third UE, a second SCI indicating a reserved resource within the first duration of the COT. The first UE may determine, within the first duration, a second duration of the COT, based on a timing of the reserved resource, wherein the second duration excludes the reserved resource. The first UE may determine a first type of channel access procedure, among a plurality of types of channel access procedure, for a first sidelink transmission, wherein the determining the first type of channel access procedure is based on the first sidelink transmission being: within the first duration of the COT; and within the second duration of the COT. The first UE may transmit the first sidelink transmission using the first type of channel access procedure. The first UE may determine a second type of channel access procedure, of the plurality of types of channel access procedure, for a second sidelink transmission, wherein the determining the second type of channel access procedure is based on the second sidelink transmission being: within the first duration of the COT; and outside the second duration of the COT. The first UE may transmit the second sidelink transmission using the second type of channel access procedure. The first UE may determine a termination or an expiry of the COT at the end of the second duration.

What is claimed is:

1. A first wireless device comprising:
one or more processors; and
memory storing instructions that, when executed by the one or more processors, cause the first wireless device to:
receive, from a base station, one or more radio resource control (RRC) messages comprising one or more sidelink configuration parameters indicating an energy detection threshold for channel occupancy sharing;
receive, from a second wireless device, a first sidelink control information comprising one or more parameters indicating a reserved resource for a second sidelink transmission;
initiate a channel occupancy for a first sidelink transmission before the reserved resource, wherein initiating the channel occupancy is based on:
a first type of channel access procedure, among a plurality of types of channel access procedures, being used; and
the energy detection threshold;
transmit, to the second wireless device, a second sidelink control information indicating sharing the channel occupancy with the second wireless device for the second sidelink transmission in the channel occupancy; and
transmit, using a second type of channel access procedure among the plurality of types of channel access procedures and based on sharing the channel occupancy with the second wireless device, a third sidelink transmission within the channel occupancy and after the second sidelink transmission.

2. The first wireless device of claim 1, wherein the first type of channel access procedure is a Type 1 sidelink channel access procedure.

3. The first wireless device of claim 1, wherein the instructions further cause the first wireless device to determine the reserved resource based on a reference signal received power (RSRP) measurement, of the first sidelink control information, being higher than a threshold.

4. The first wireless device of claim 1, wherein the instructions further cause the first wireless device to transmit the first sidelink transmission in a first slot before the reserved resource.

5. The first wireless device of claim 4, wherein the instructions further cause the first wireless device to select a resource in the first slot for the first sidelink transmission.

6. The first wireless device of claim 1, wherein the instructions further cause the first wireless device to determine a duration of the channel occupancy based on a channel access priority class (CAPC) of the first sidelink transmission.

7. The first wireless device of claim 1, wherein the second type of channel access procedure is a Type 2 sidelink channel access procedure.

8. The first wireless device of claim 1, wherein the second sidelink control information comprises a field indicating a remaining duration of the channel occupancy.

9. The first wireless device of claim 1, wherein the second sidelink control information comprises a destination identifier of the second wireless device.

10. The first wireless device of claim 1, wherein the first sidelink transmission comprises a physical sidelink shared channel.

11. A method comprising:

receiving, by a first wireless device from a base station, one or more radio resource control (RRC) messages comprising one or more sidelink configuration parameters indicating an energy detection threshold for channel occupancy sharing;

receiving, from a second wireless device, a first sidelink control information comprising one or more parameters indicating a reserved resource for a second sidelink transmission;

initiating a channel occupancy for a first sidelink transmission before the reserved resource, wherein the initiating is based on:

using a first type of channel access procedure among a plurality of types of channel access procedures; and the energy detection threshold;

transmitting, to the second wireless device, a second sidelink control information indicating sharing the channel occupancy with the second wireless device for the second sidelink transmission in the channel occupancy; and transmitting, using a second type of channel access procedure among the plurality of types of channel access procedures and based on sharing the channel occupancy with the second wireless device, a third sidelink transmission within the channel occupancy and after the second sidelink transmission.

12. The method of claim 11, wherein the first type of channel access procedure is a Type 1 sidelink channel access procedure.

13. The method of claim 11, further comprising determining the reserved resource based on a reference signal received power (RSRP) measurement, of the first sidelink control information, being higher than a threshold.

14. The method of claim 11, further comprising transmitting the first sidelink transmission in a first slot before the reserved resource.

15. The method of claim 14, further comprising selecting a resource in the first slot for the first sidelink transmission.

16. The method of claim 11, further comprising determining a duration of the channel occupancy based on a channel access priority class (CAPC) of the first sidelink transmission.

17. The method of claim 11, wherein the second type of channel access procedure is a Type 2 sidelink channel access procedure.

18. The method of claim 11, wherein the second sidelink control information comprises a field indicating a remaining duration of the channel occupancy.

19. The method of claim 11, wherein the second sidelink control information comprises a destination identifier of the second wireless device.

20. A non-transitory computer-readable medium comprising instructions that, when executed by one or more processors of a first wireless device, cause the first wireless device to:

receive, from a base station, one or more radio resource control (RRC) messages comprising one or more sidelink configuration parameters indicating an energy detection threshold for channel occupancy sharing;

receive, from a second wireless device, a first sidelink control information comprising one or more parameters indicating a reserved resource for a second sidelink transmission;

initiate a channel occupancy for a first sidelink transmission before the reserved resource, wherein initiating the channel occupancy is based on:

a first type of channel access procedure, among a plurality of types of channel access procedures, being used; and the energy detection threshold;

transmit, to the second wireless device, a second sidelink control information indicating sharing the channel occupancy with the second wireless device for the second sidelink transmission in the channel occupancy; and transmit, using a second type of channel access procedure among the plurality of types of channel access procedures and based on sharing the channel occupancy with the second wireless device, a third sidelink transmission within the channel occupancy and after the second sidelink transmission.

* * * * *